(12) United States Patent　　(10) Patent No.: US 10,078,797 B1
Almorshedi　　(45) Date of Patent: Sep. 18, 2018

(54) STEM EJECTABLE COMPONENT ASSEMBLY

(71) Applicant: Almora, LLC, Pikesville, MD (US)

(72) Inventor: Adel Almorshedi, Sana'a (YE)

(73) Assignee: Almora, LLC, Pikesville, MD (US)

( * ) Notice: Subject to any disclaimer, the term of this patent is extended or adjusted under 35 U.S.C. 154(b) by 0 days.

(21) Appl. No.: 15/855,493

(22) Filed: Dec. 27, 2017

Related U.S. Application Data

(63) Continuation-in-part of application No. 15/681,403, filed on Aug. 20, 2017, now Pat. No. 9,886,654.

(51) Int. Cl.
| | |
|---|---|
| *H01R 13/635* | (2006.01) |
| *G06K 13/08* | (2006.01) |
| *G06K 7/00* | (2006.01) |
| *G06K 13/067* | (2006.01) |

(52) U.S. Cl.
CPC ....... *G06K 13/0825* (2013.01); *G06K 7/0052* (2013.01); *G06K 13/0831* (2013.01); *G06K 13/0862* (2013.01); *G06K 7/0043* (2013.01); *G06K 13/067* (2013.01)

(58) Field of Classification Search
CPC ................ H01R 13/635; H01R 13/633; H01R 23/7005; G06K 13/0806; G06K 13/08; G06F 1/184; G06F 1/181; G06F 1/187; G06F 1/1616; G06F 1/1656
USPC ...... 439/159, 160; 361/679.31, 679.01, 727; 360/99.06
See application file for complete search history.

(56) References Cited

U.S. PATENT DOCUMENTS

| | | | | |
|---|---|---|---|---|
| 5,357,385 | A * | 10/1994 | Shimizu | G11B 15/67536 360/85 |
| 6,061,320 | A * | 5/2000 | Tsai | G11B 17/056 720/607 |
| 7,731,538 | B2 | 6/2010 | Kiryu et al. | |
| 8,308,514 | B1 | 11/2012 | Su et al. | |
| 8,568,174 | B2 | 10/2013 | Liu | |
| 8,961,207 | B2 * | 2/2015 | Lim | H01R 13/6335 439/159 |
| 9,819,105 | B2 * | 11/2017 | Chen | H01R 12/7058 |
| 9,886,654 | B1 * | 2/2018 | Almorshedi | G06K 13/0831 |
| 2001/0010984 | A1 | 8/2001 | Bricaud et al. | |
| 2007/0087600 | A1 | 4/2007 | Chen et al. | |
| 2011/0080699 | A1 * | 4/2011 | Wang | H04M 1/026 361/679.01 |
| 2014/0078682 | A1 * | 3/2014 | Jenks | G11B 17/00 361/727 |

(Continued)

*Primary Examiner* — Gary Paumen
(74) *Attorney, Agent, or Firm* — Rahman LLC

(57) ABSTRACT

A stem ejectable component assembly for electronic devices does not use a pin or needle to eject the tray holder. The assembly includes a receiving housing coupled to a SIM/MMC tray, a front plate, and a stem. The front plate incorporates slider pins that slide out to engage with recesses in the support frame of the electronic device to lock the assembly. The slider pins have inner ends that abut the stem and hold the stem in a pushed-in position. The slider pins also incorporate profiled protrusions that engage with ball pins fixed to the receiving housing. When the front plate is pushed inward, the profiled protrusions cause the slider pins to move outwards and release the stem to project out of the front plate. Pulling the stem causes the slider pins to slide in and disengage from the recesses in the support frame to enable withdrawal of the assembly.

20 Claims, 64 Drawing Sheets

(56) References Cited

U.S. PATENT DOCUMENTS

| | | | |
|---|---|---|---|
| 2014/0099805 A1* | 4/2014 | Kutchery | H04B 1/3816 |
| | | | 439/76.1 |
| 2014/0113495 A1 | 4/2014 | Lim et al. | |
| 2014/0154903 A1 | 6/2014 | Wang et al. | |
| 2015/0079847 A1 | 3/2015 | Liu et al. | |
| 2015/0207284 A1 | 7/2015 | Liu | |
| 2015/0311630 A1* | 10/2015 | Lei | G06K 13/0831 |
| | | | 439/310 |
| 2016/0036143 A1* | 2/2016 | Motohashi | H01R 13/635 |
| | | | 439/160 |

\* cited by examiner

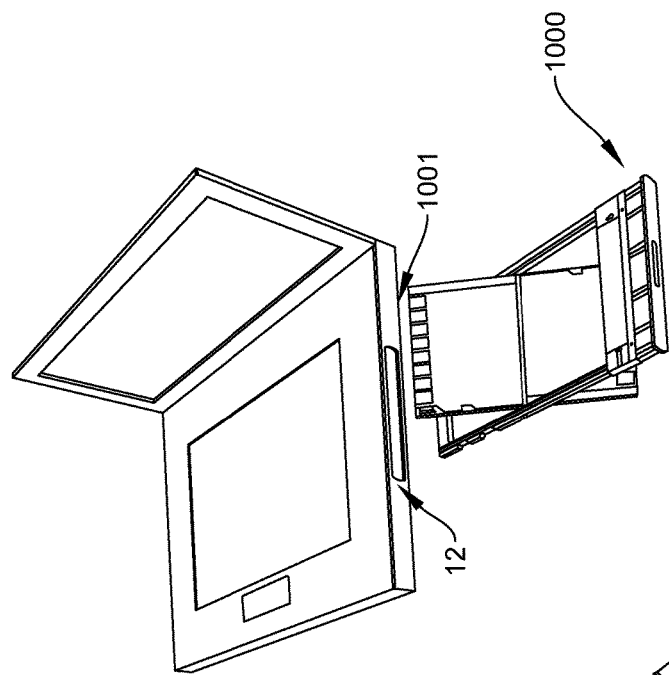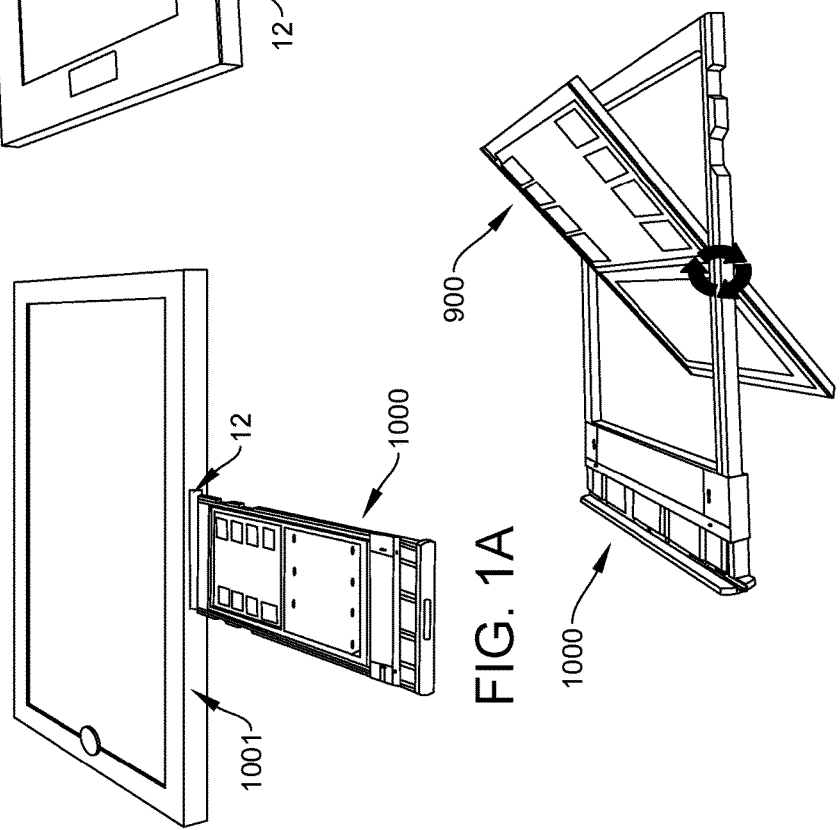

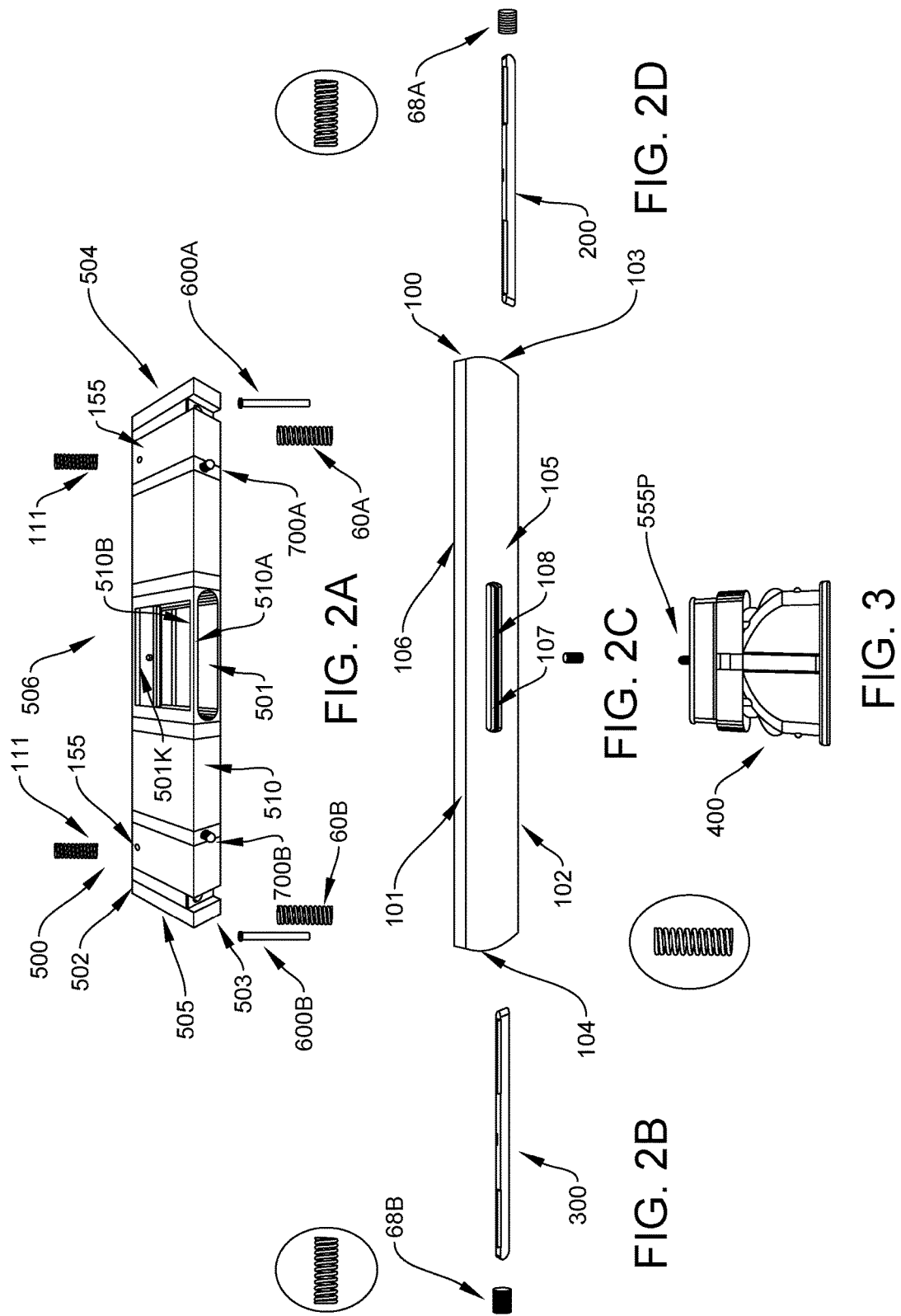

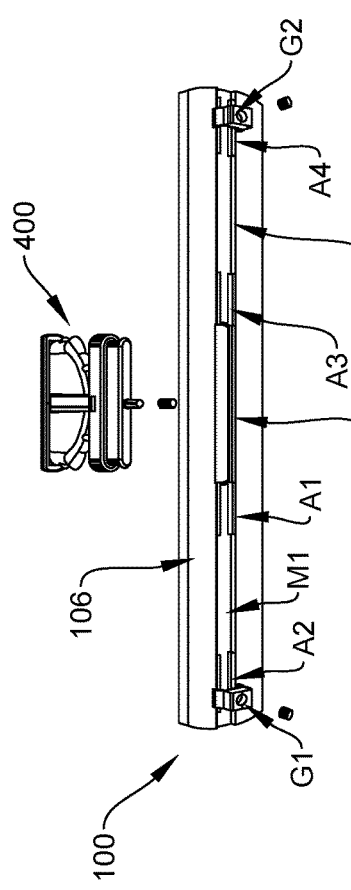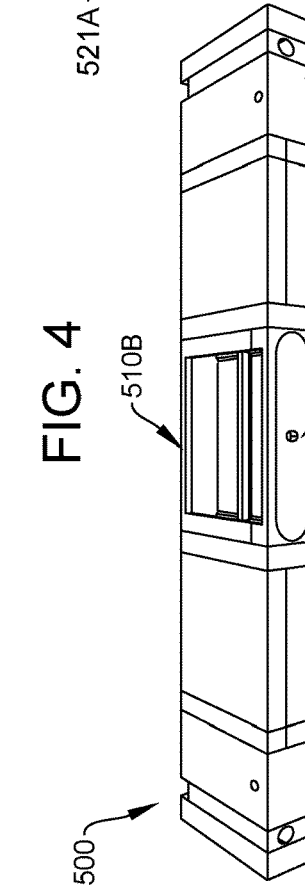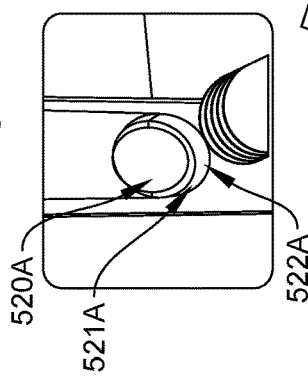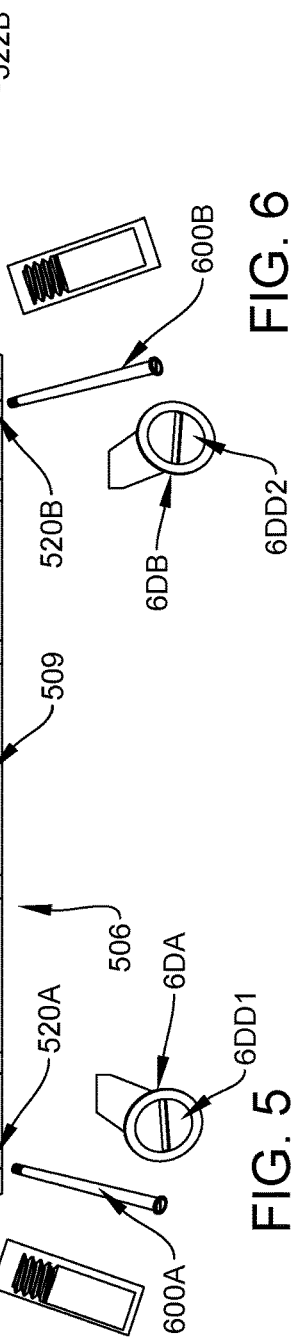

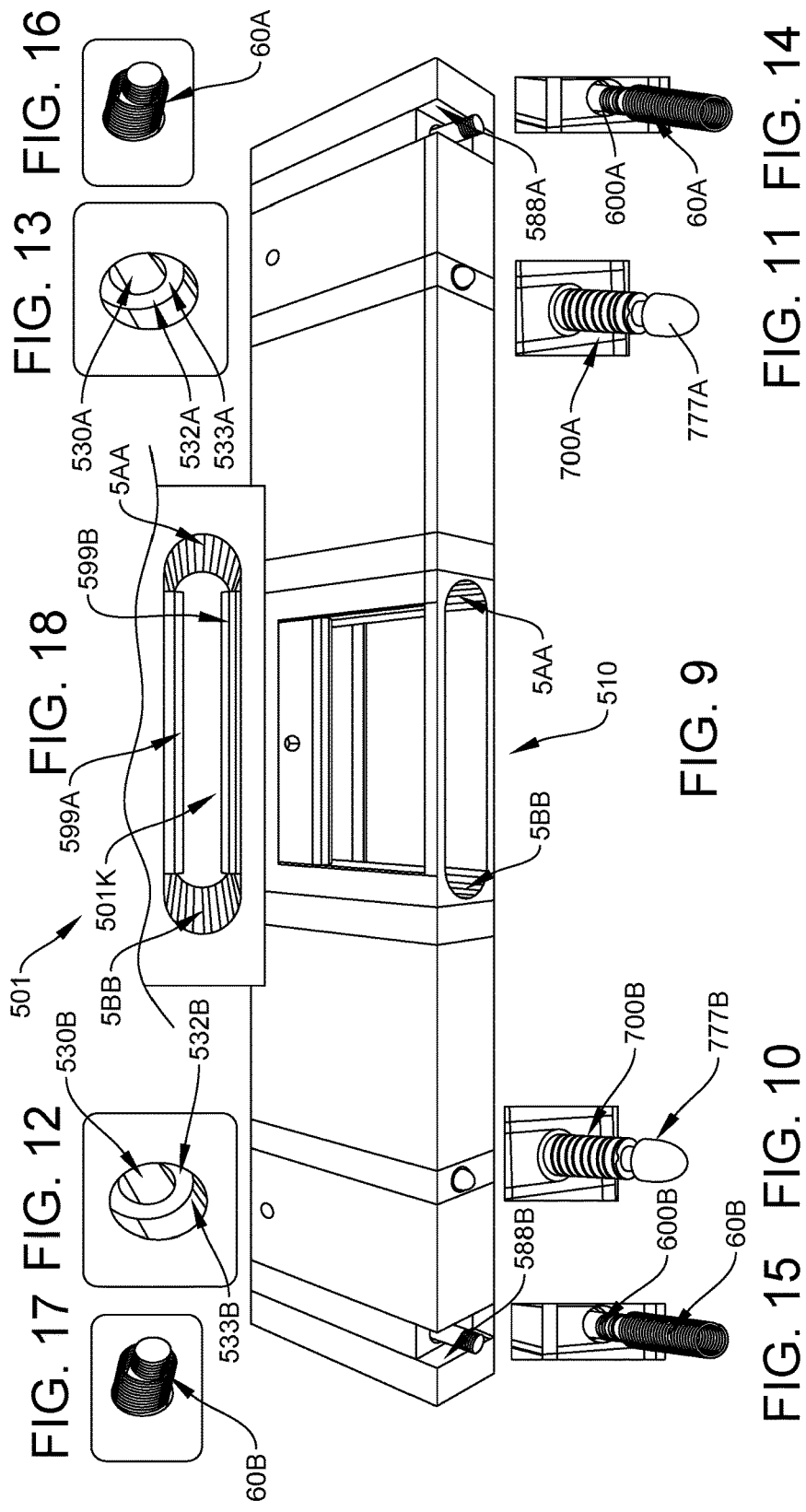

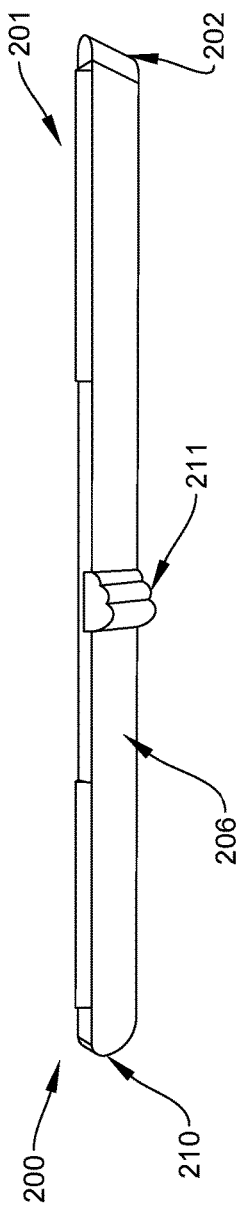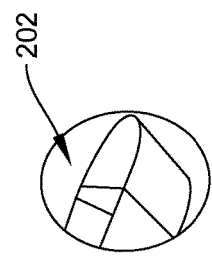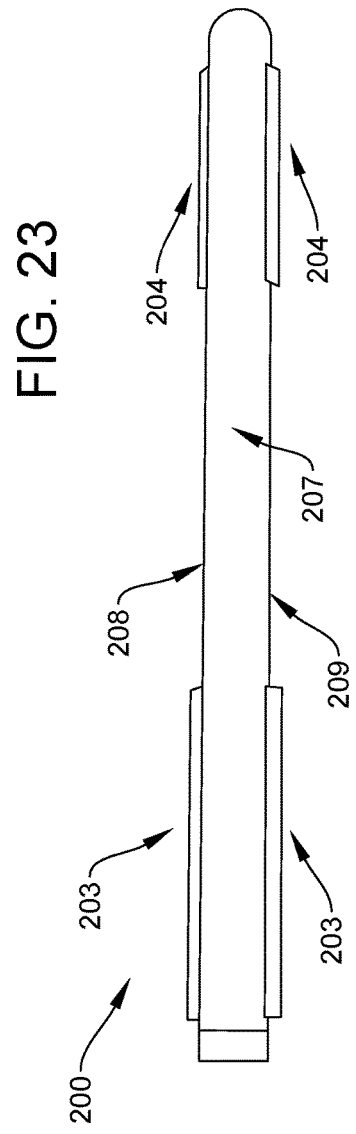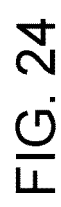
FIG. 21
FIG. 22
FIG. 23
FIG. 24

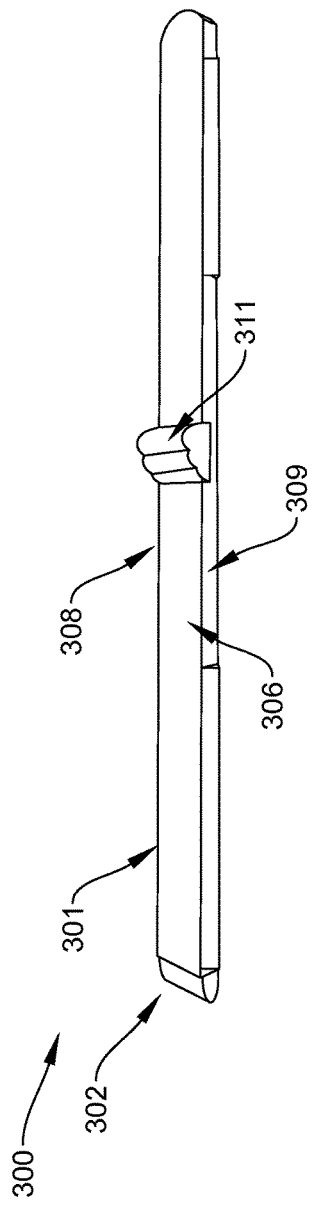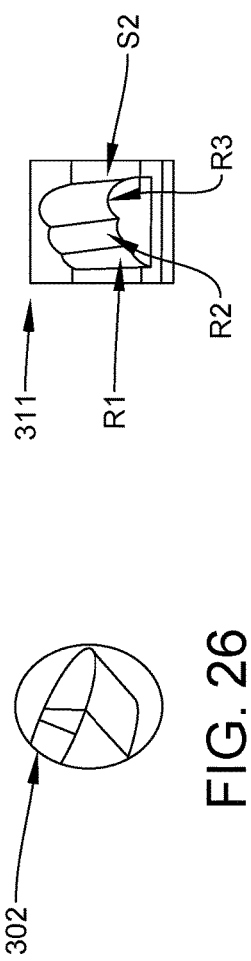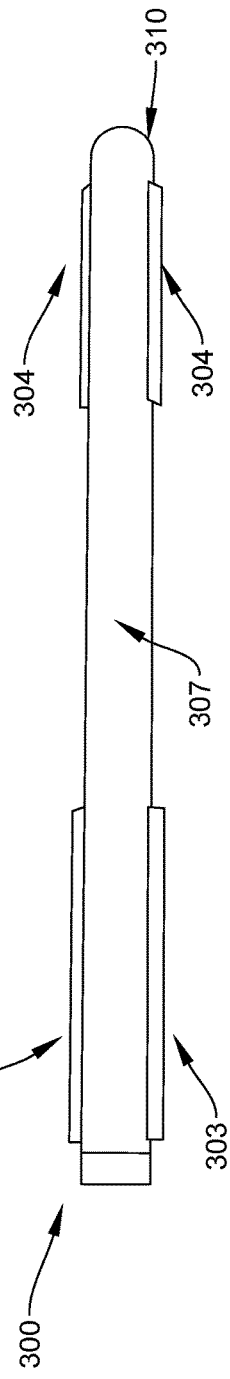
FIG. 25
FIG. 26
FIG. 27
FIG. 28

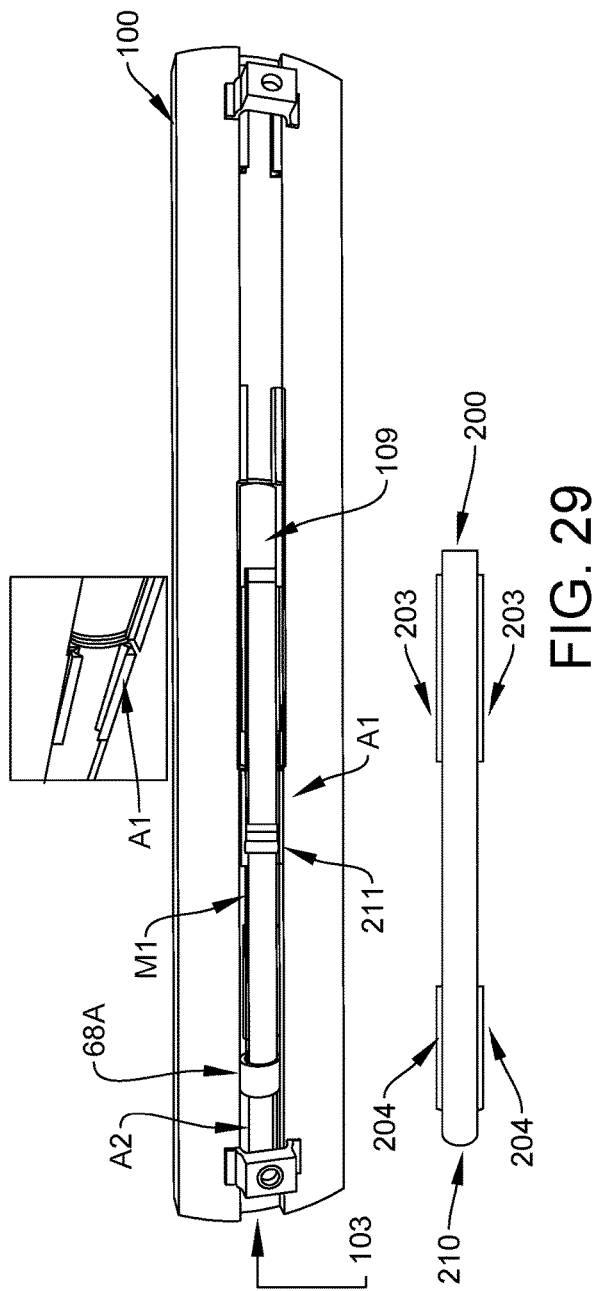
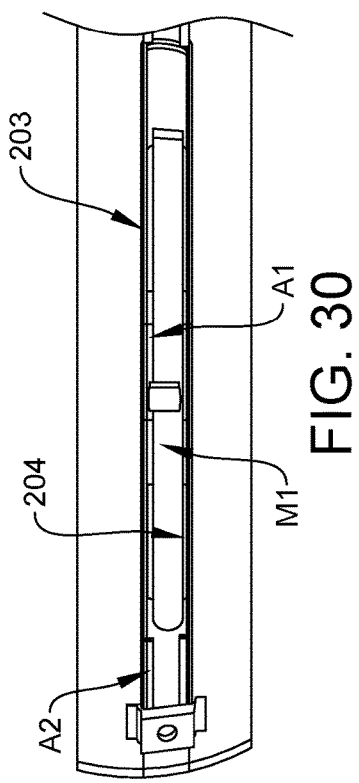
FIG. 29
FIG. 30

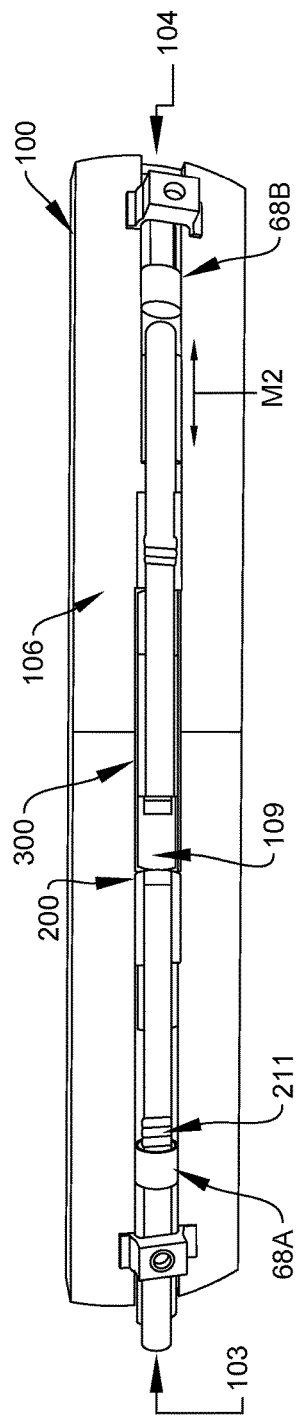
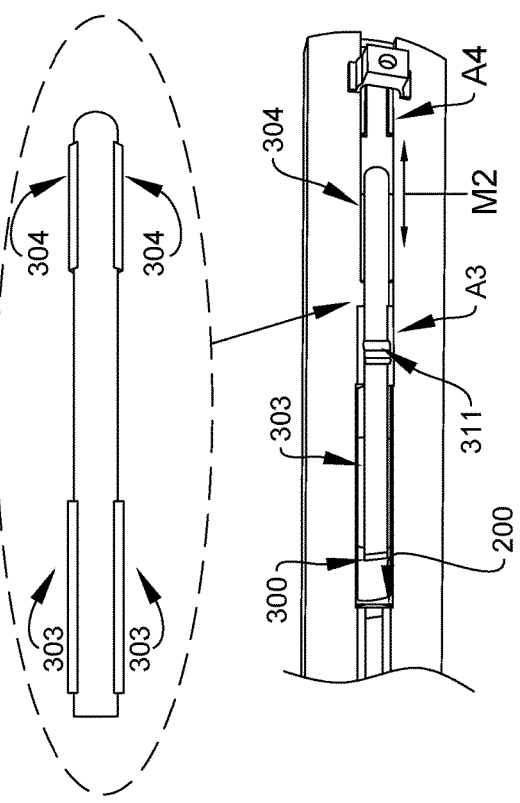
FIG. 34
FIG. 35

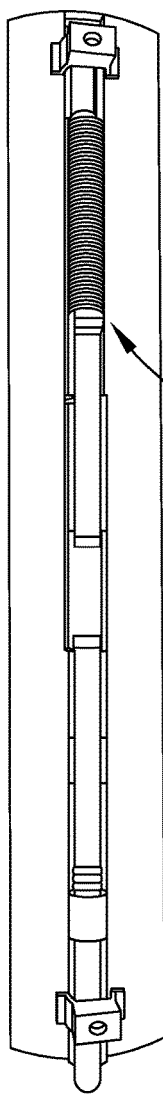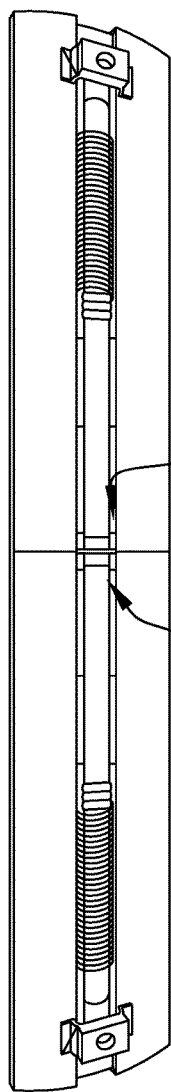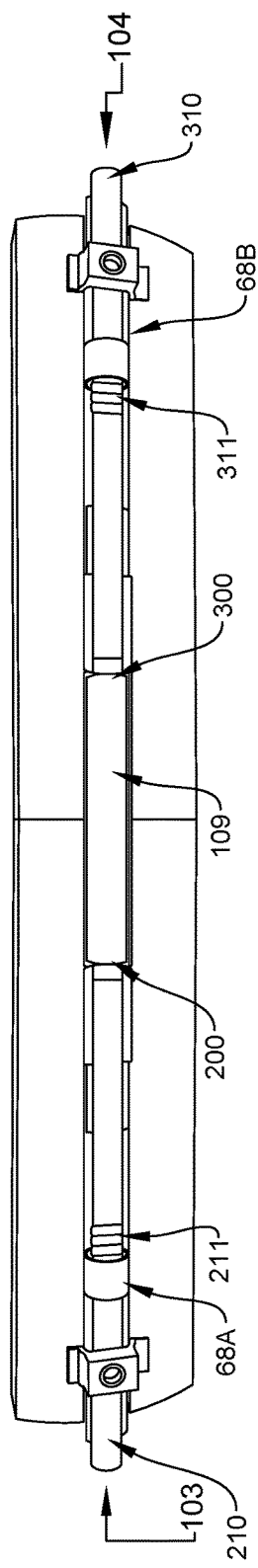

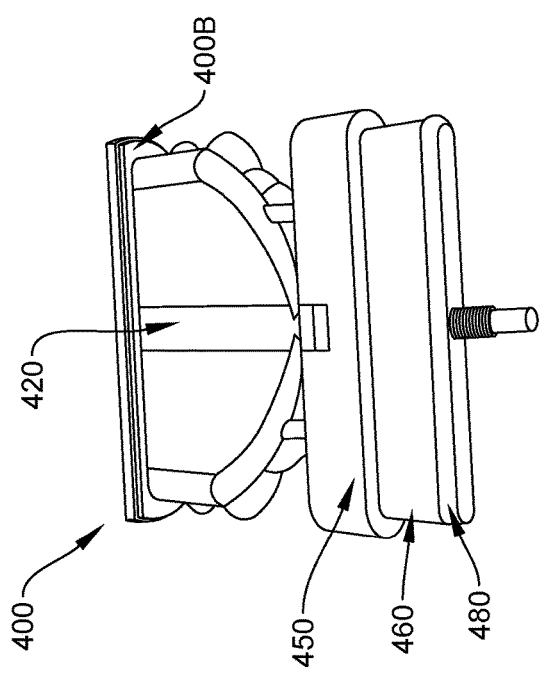
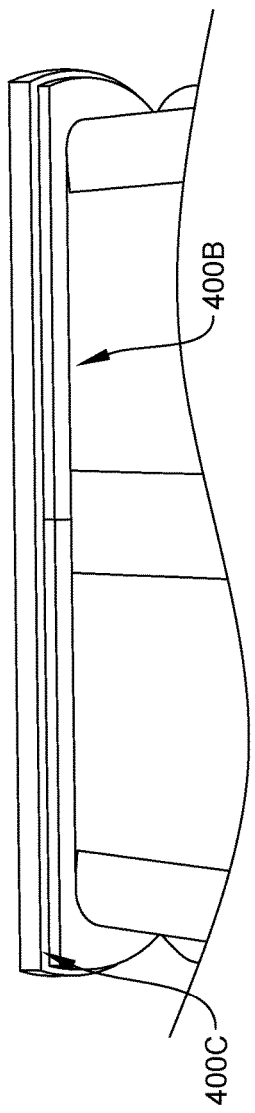

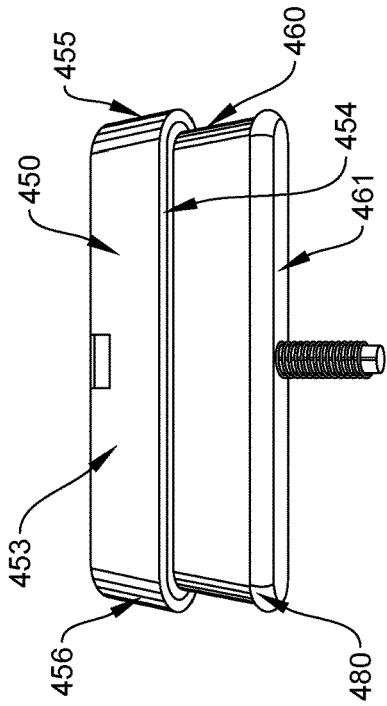
FIG. 43
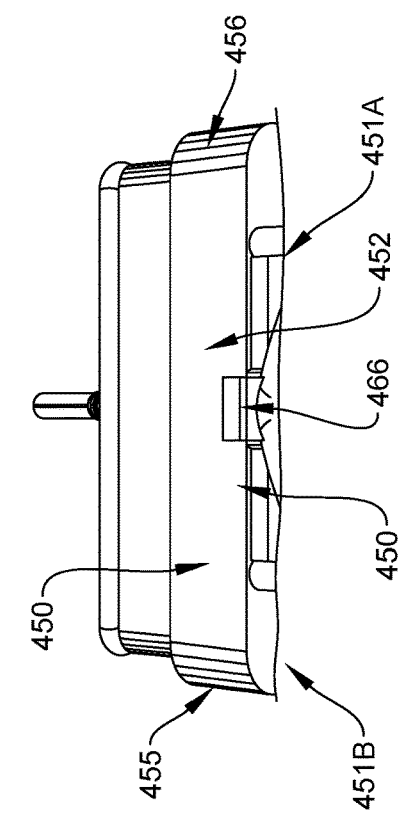
FIG. 42
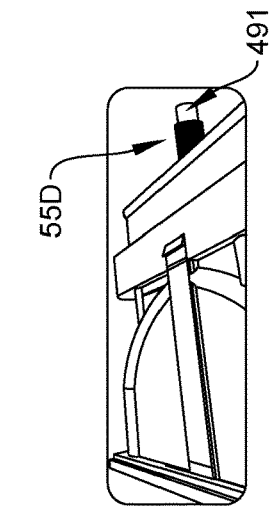
FIG. 47
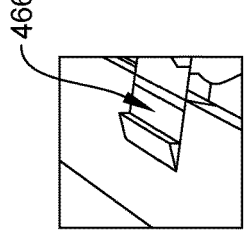
FIG. 46
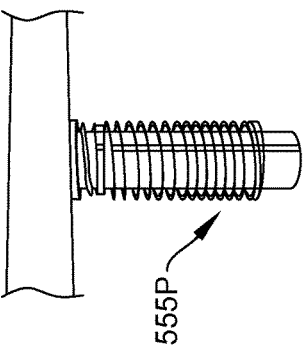
FIG. 45
FIG. 44

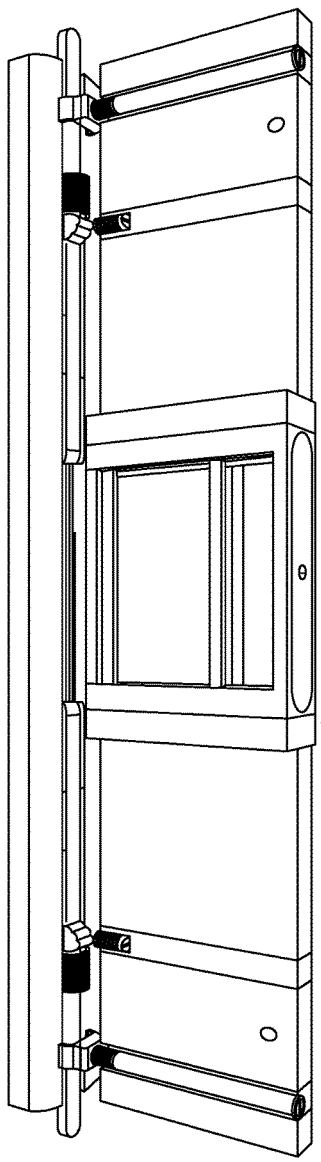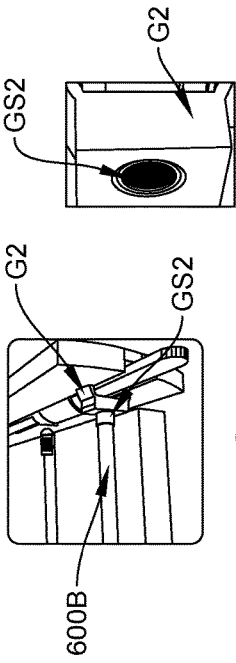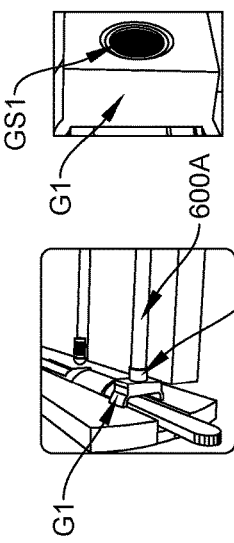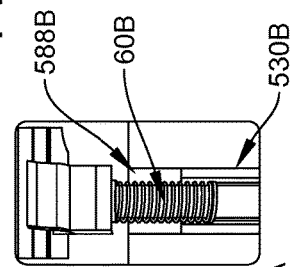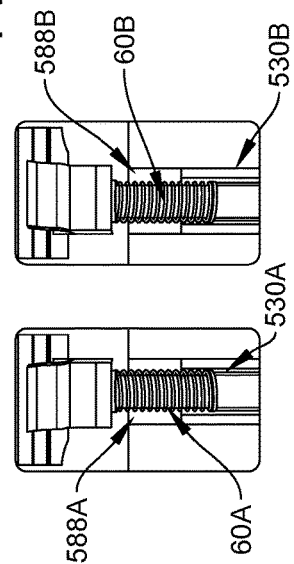
FIG. 48
FIG. 49
FIG. 50
FIG. 51
FIG. 52
FIG. 53
FIG. 54

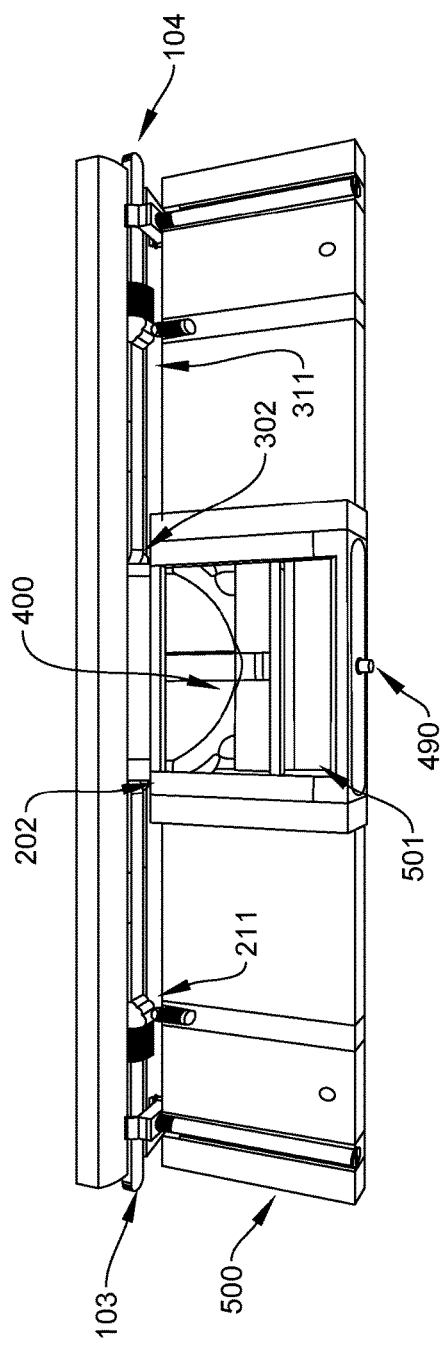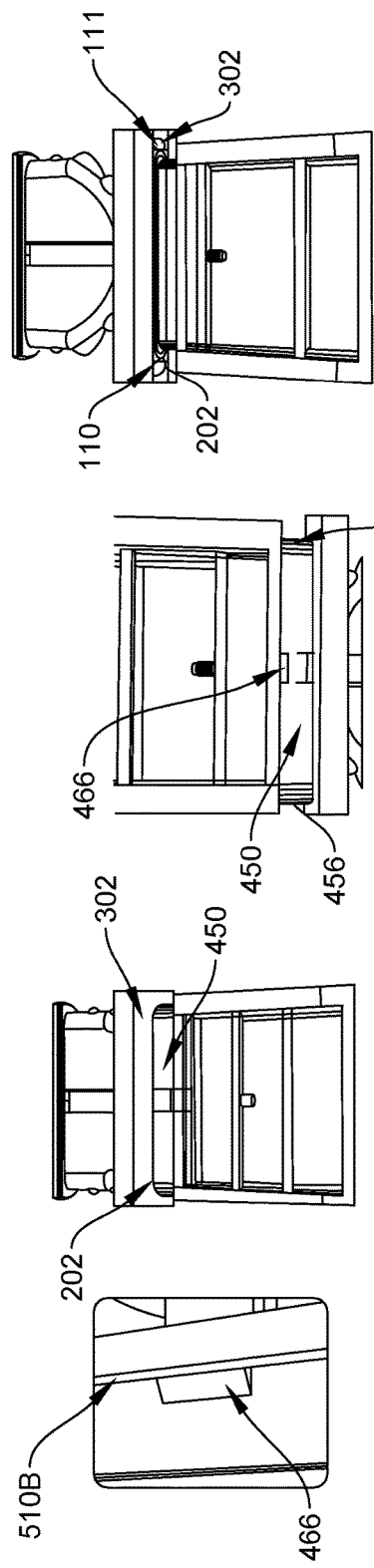

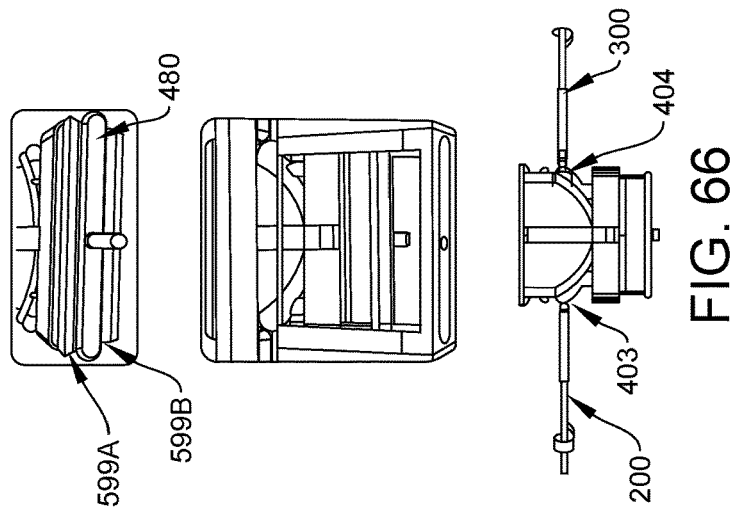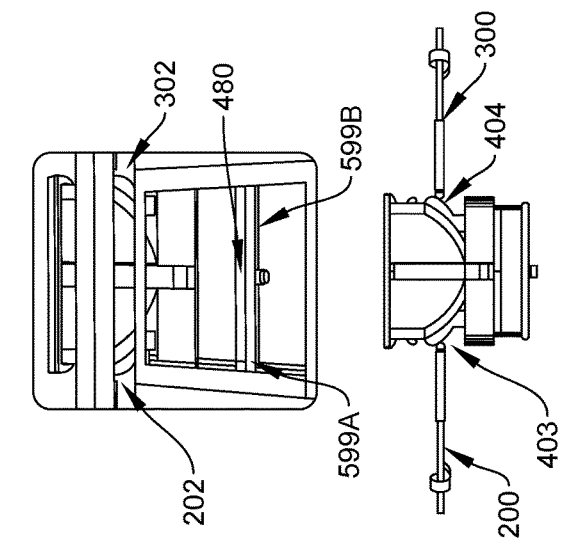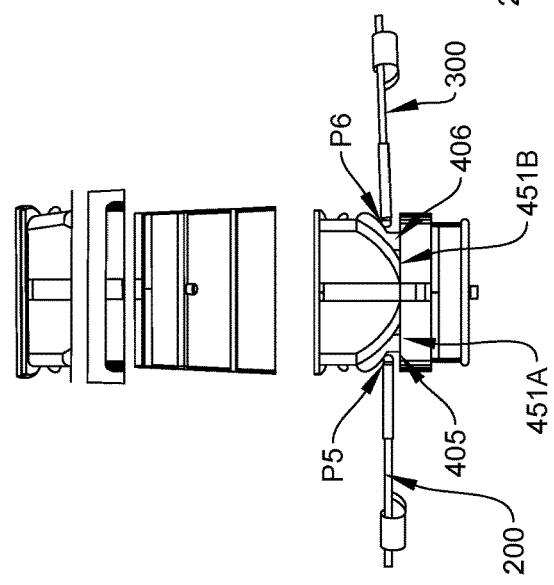

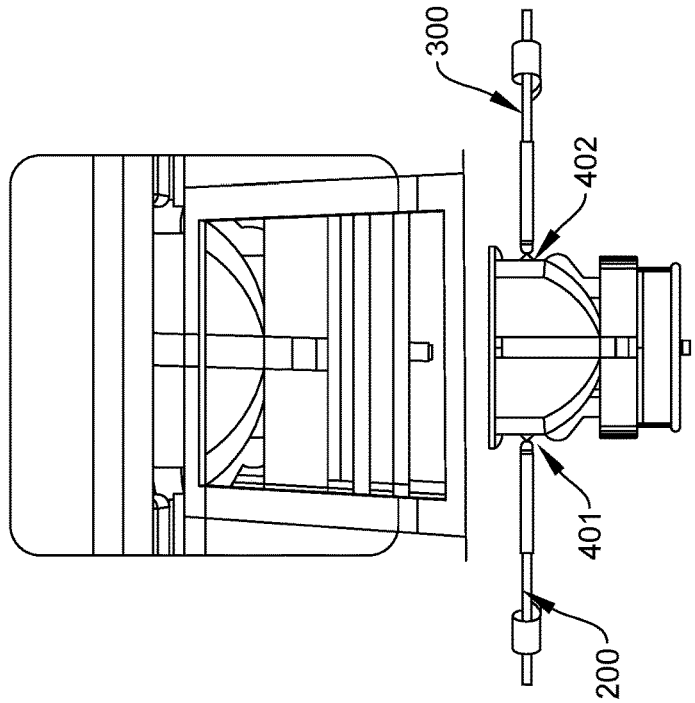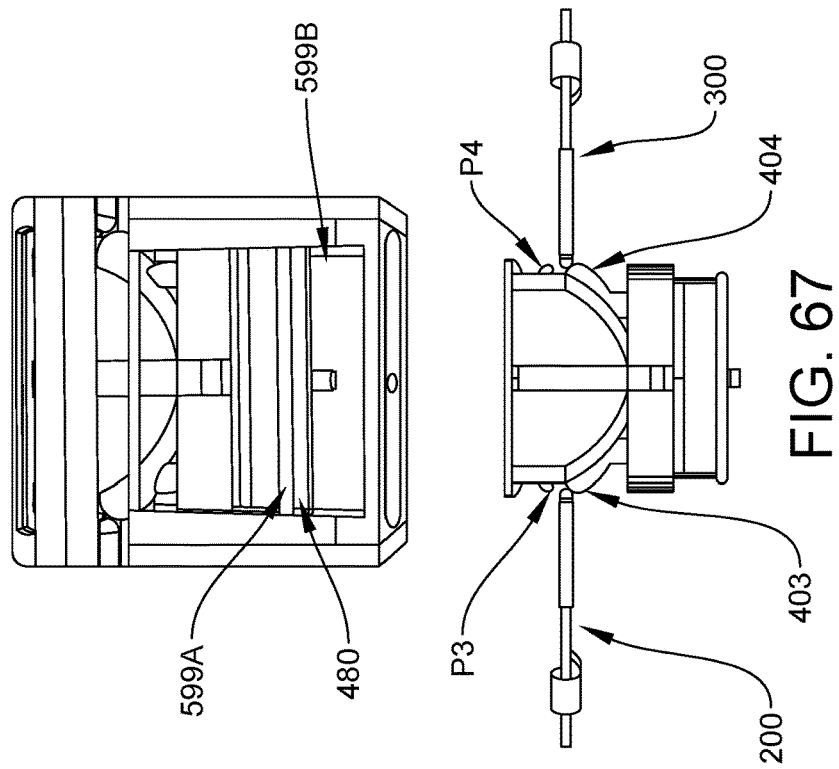

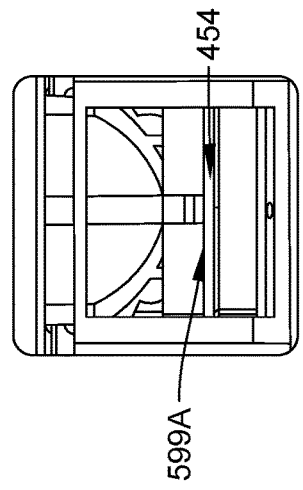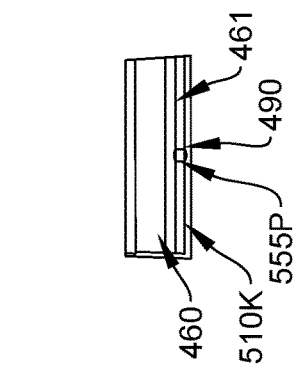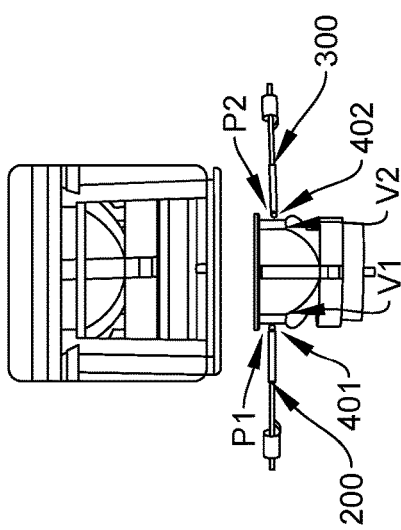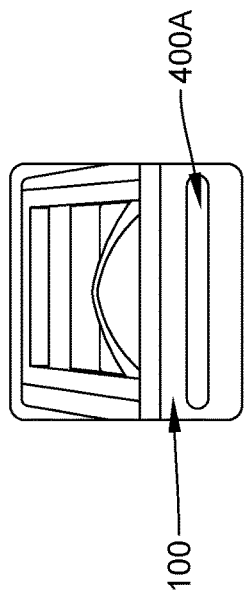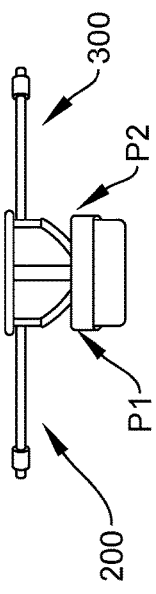

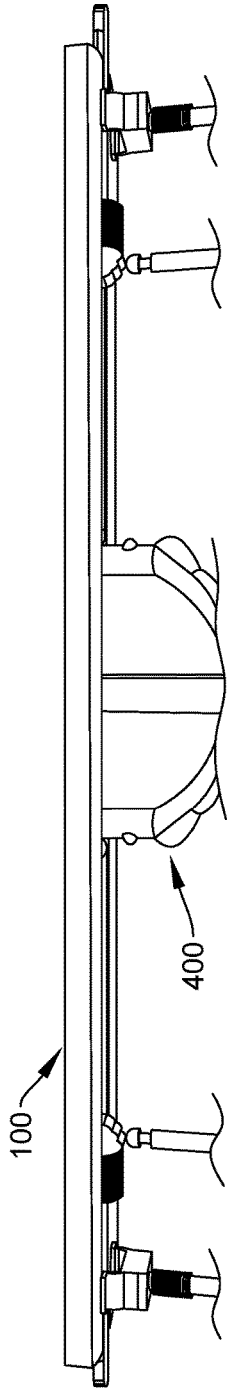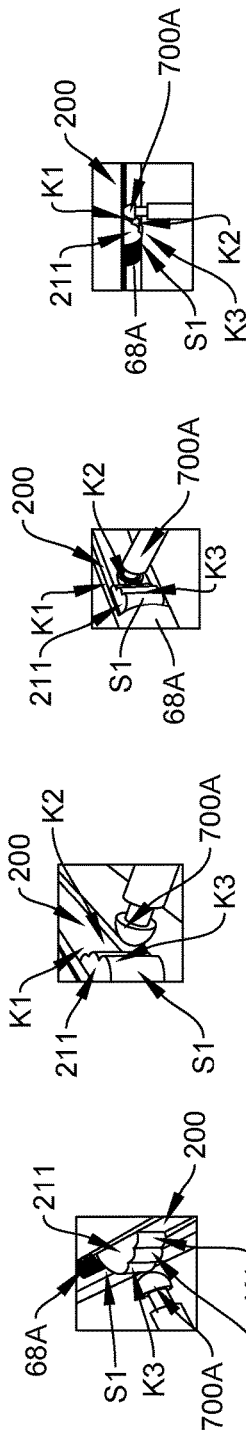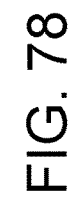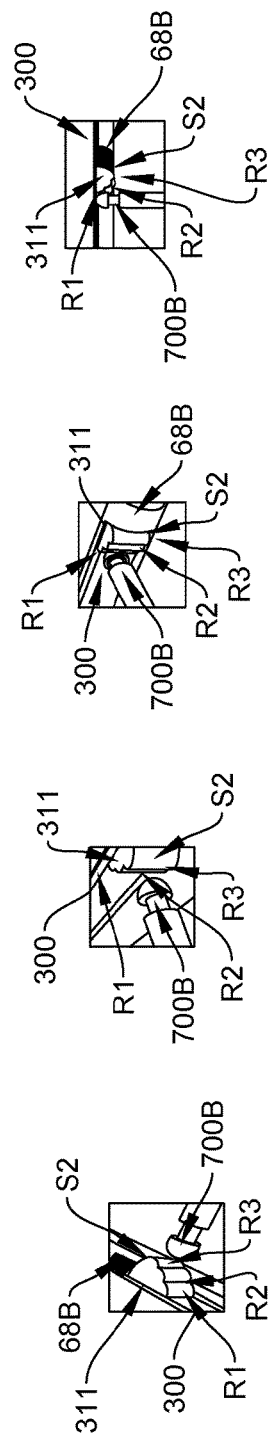

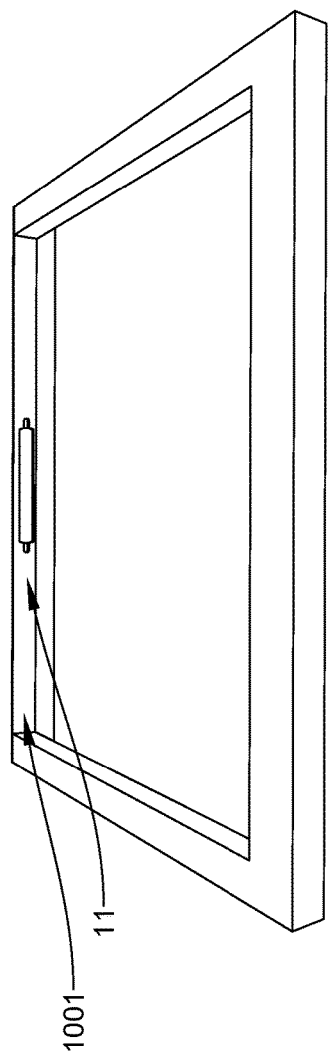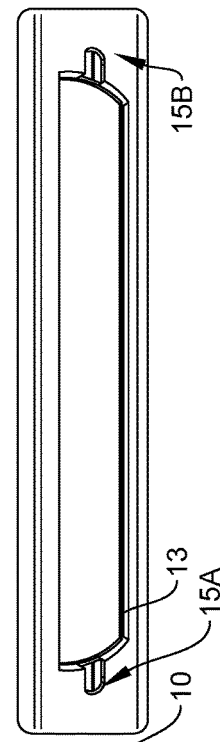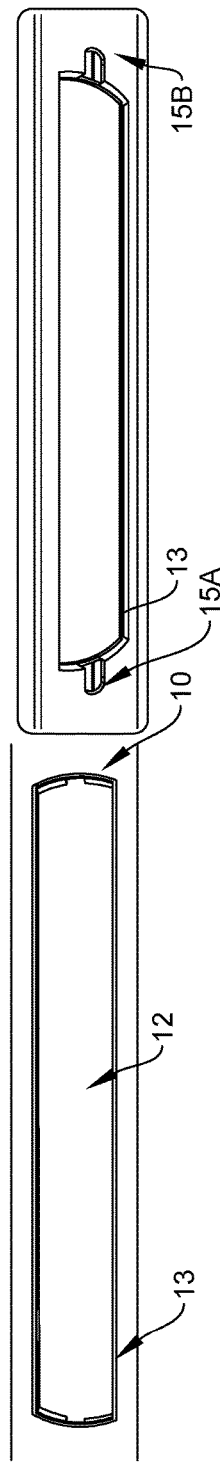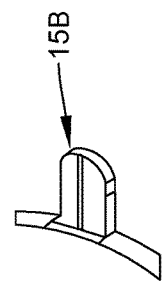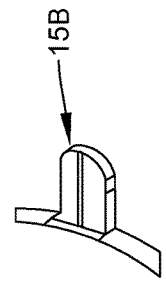
FIG. 83
FIG. 85
FIG. 87
FIG. 84
FIG. 86

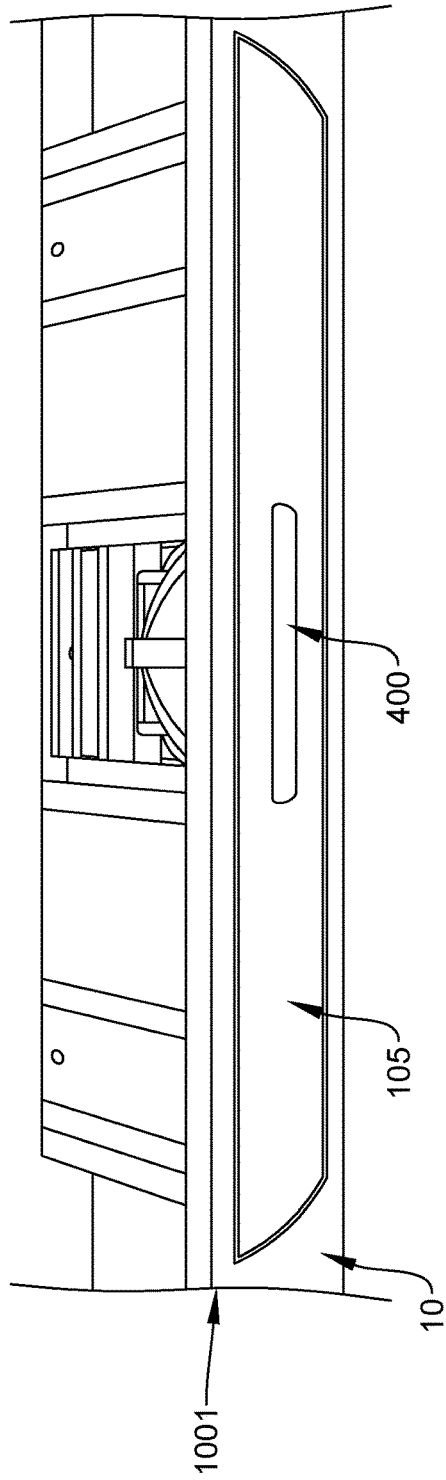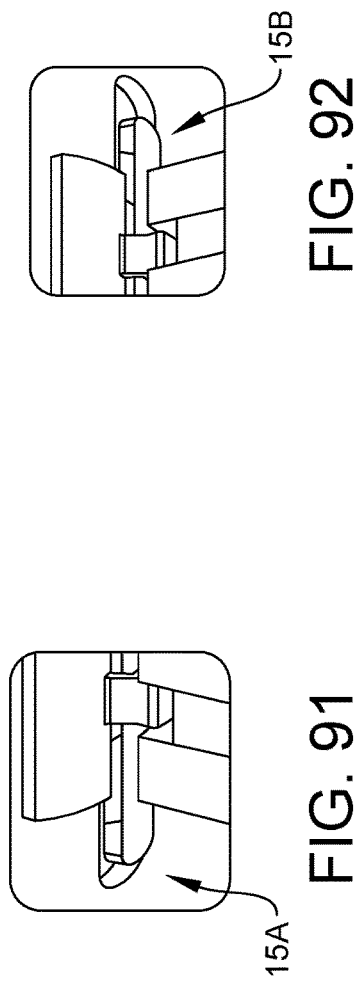
FIG. 90
FIG. 91
FIG. 92

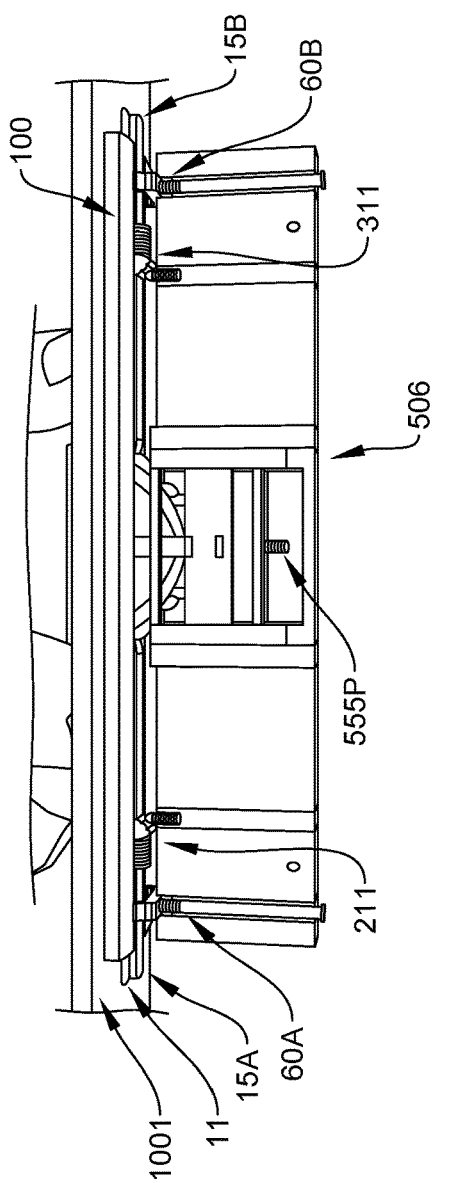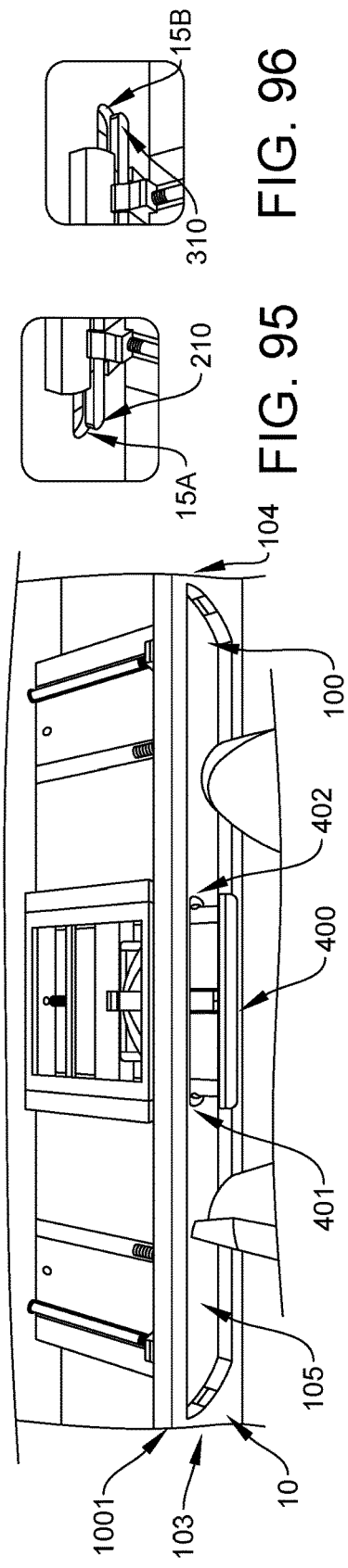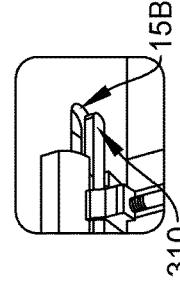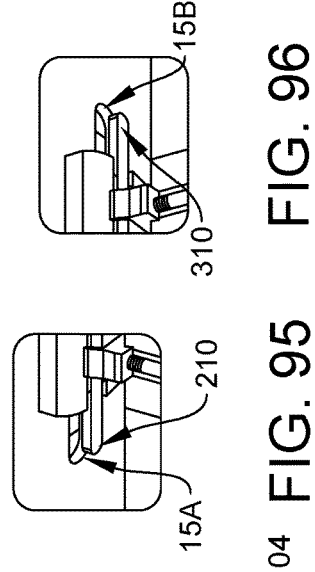

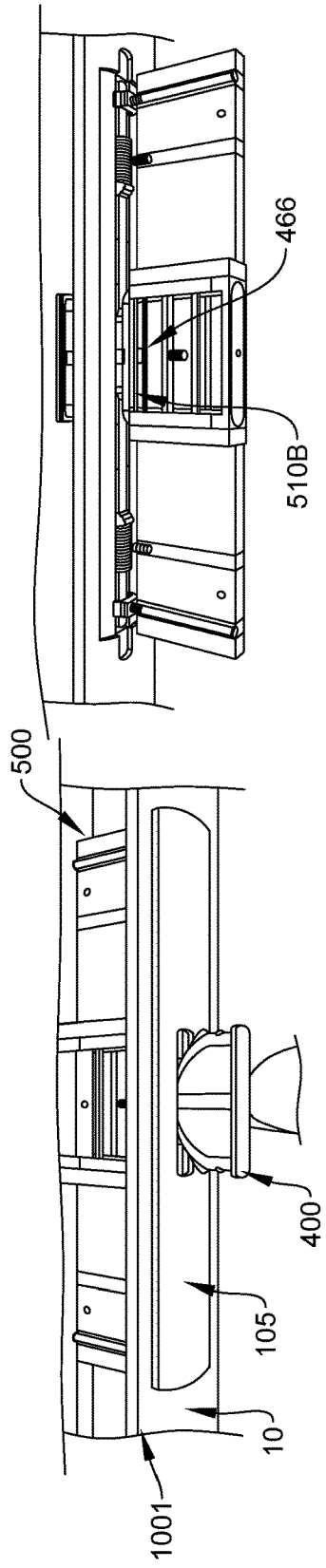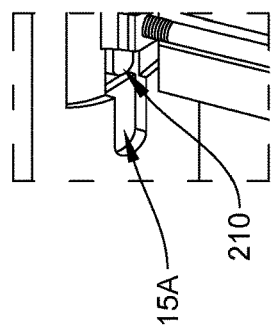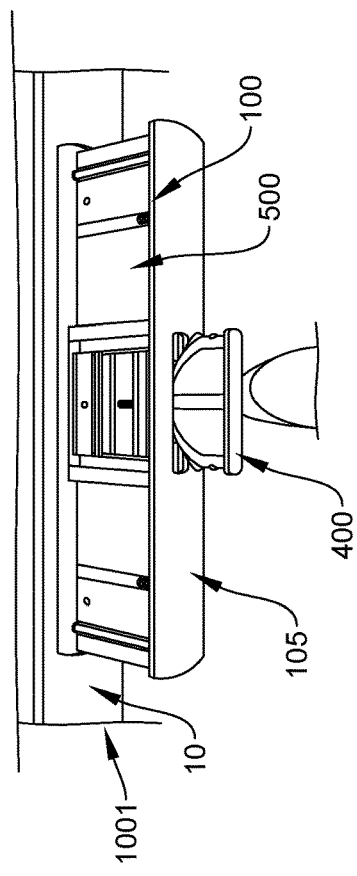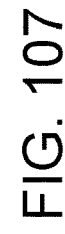

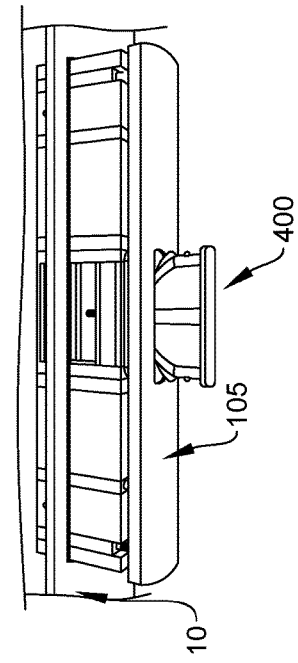
FIG. 111
FIG. 112
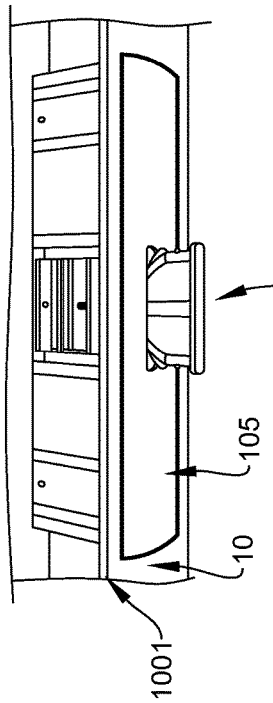
FIG. 113
FIG. 115
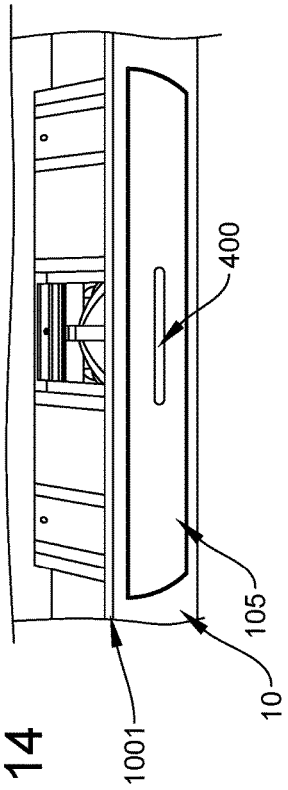
FIG. 116
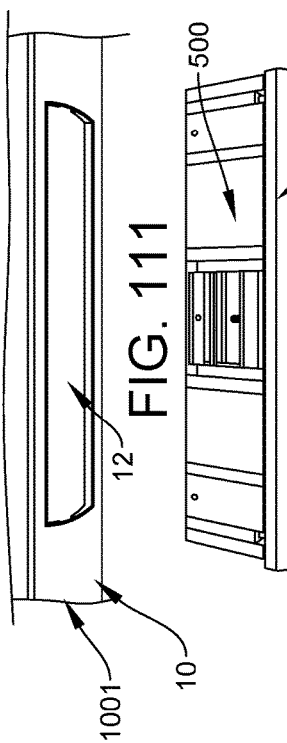
FIG. 114
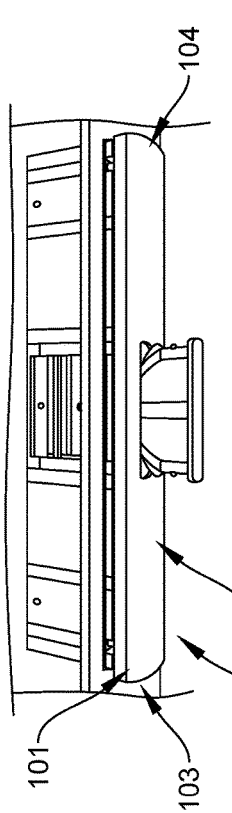

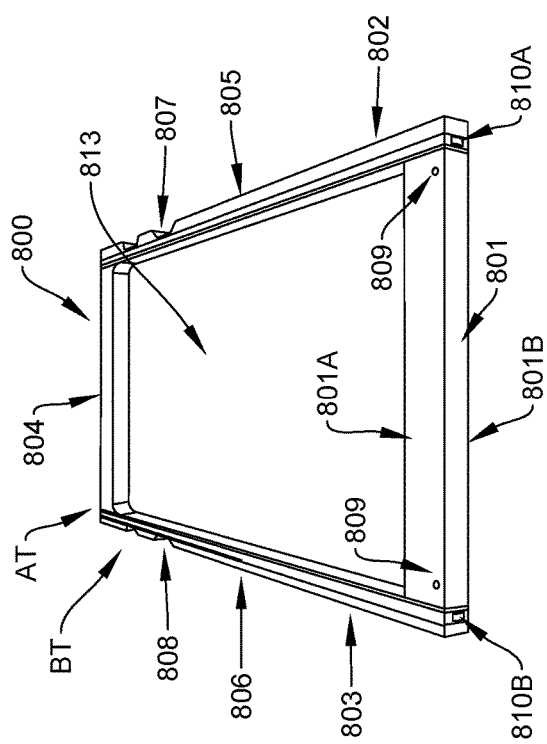
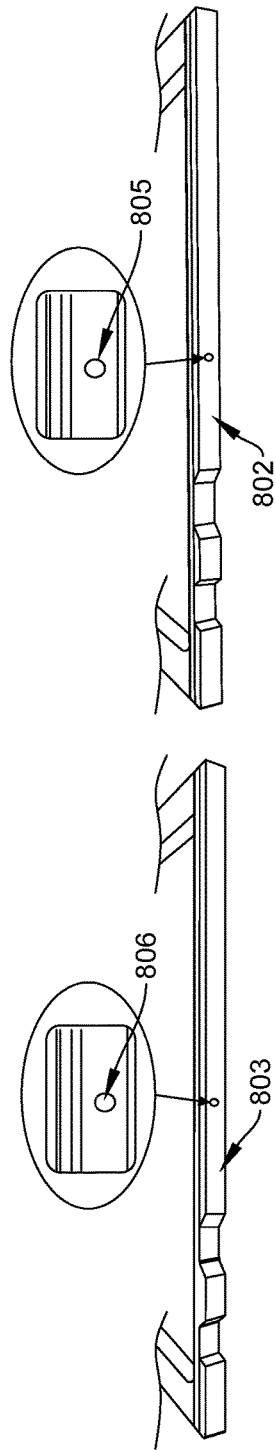
FIG. 117
FIG. 119
FIG. 118

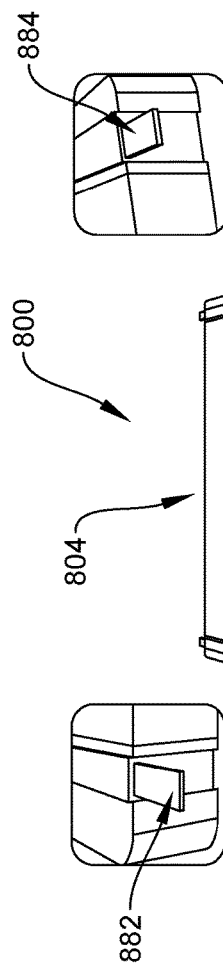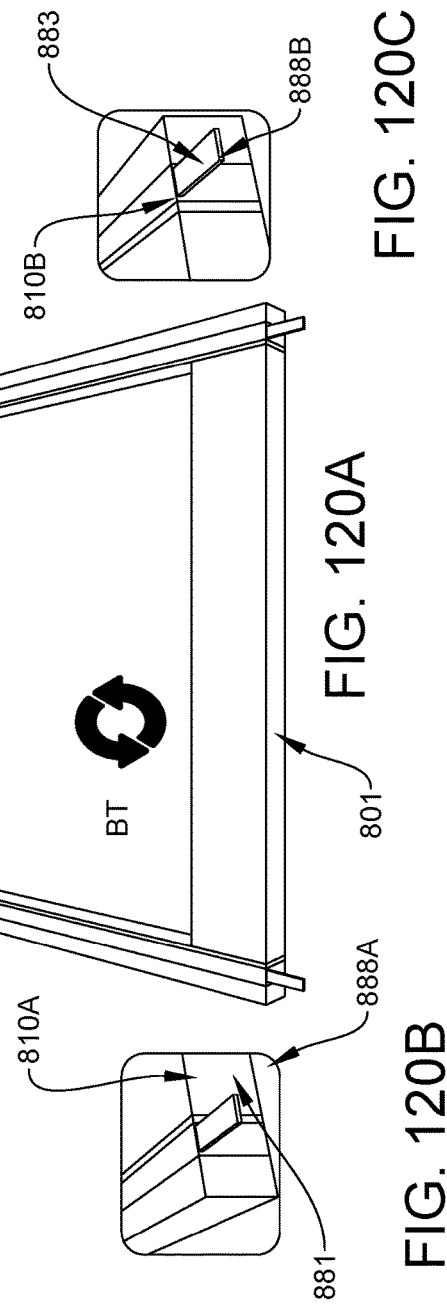

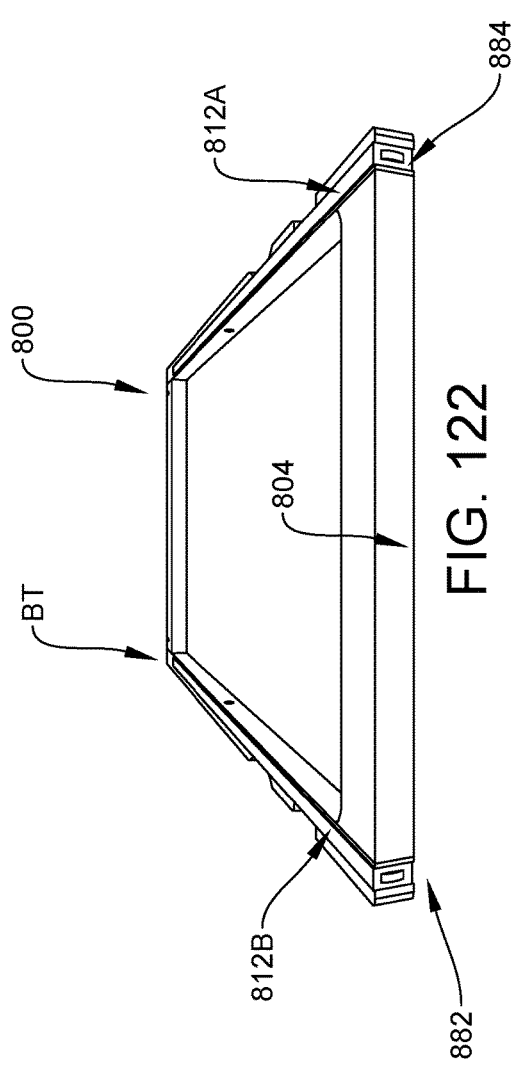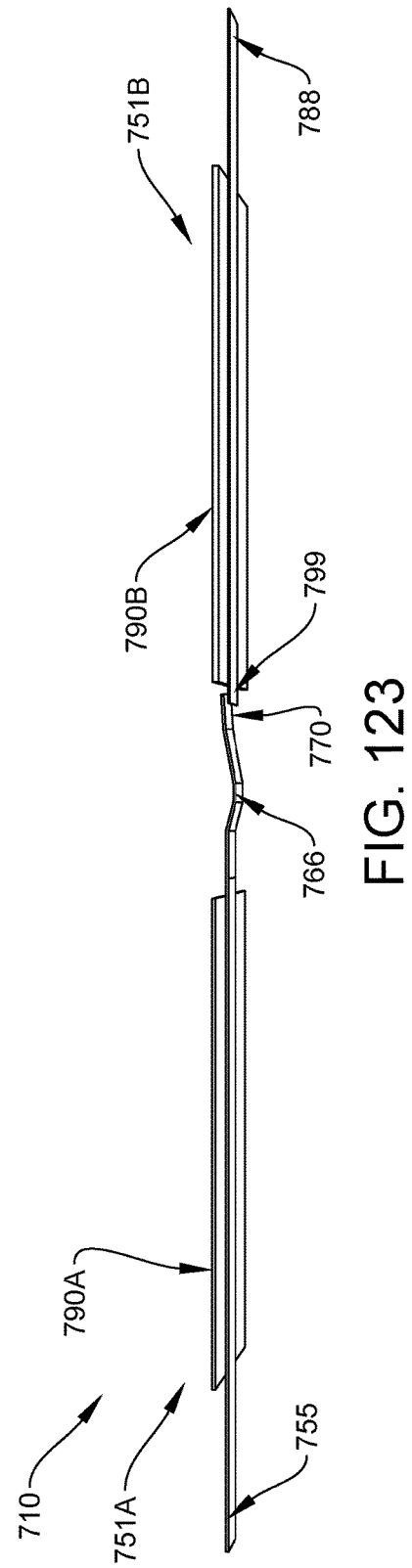

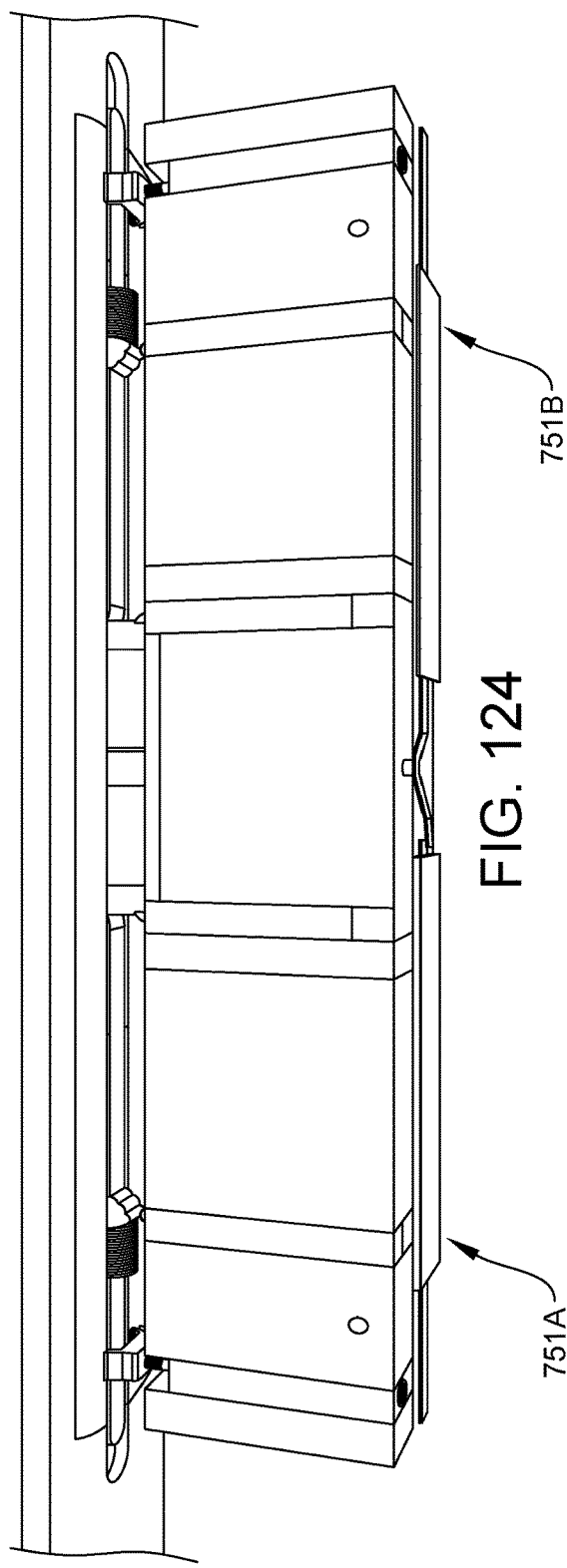
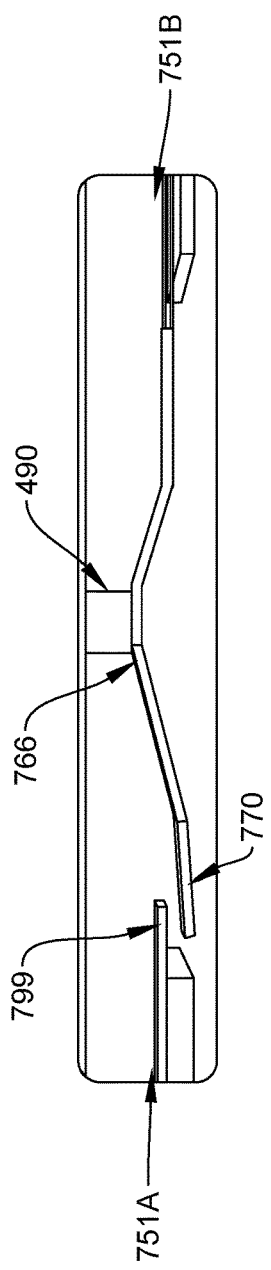

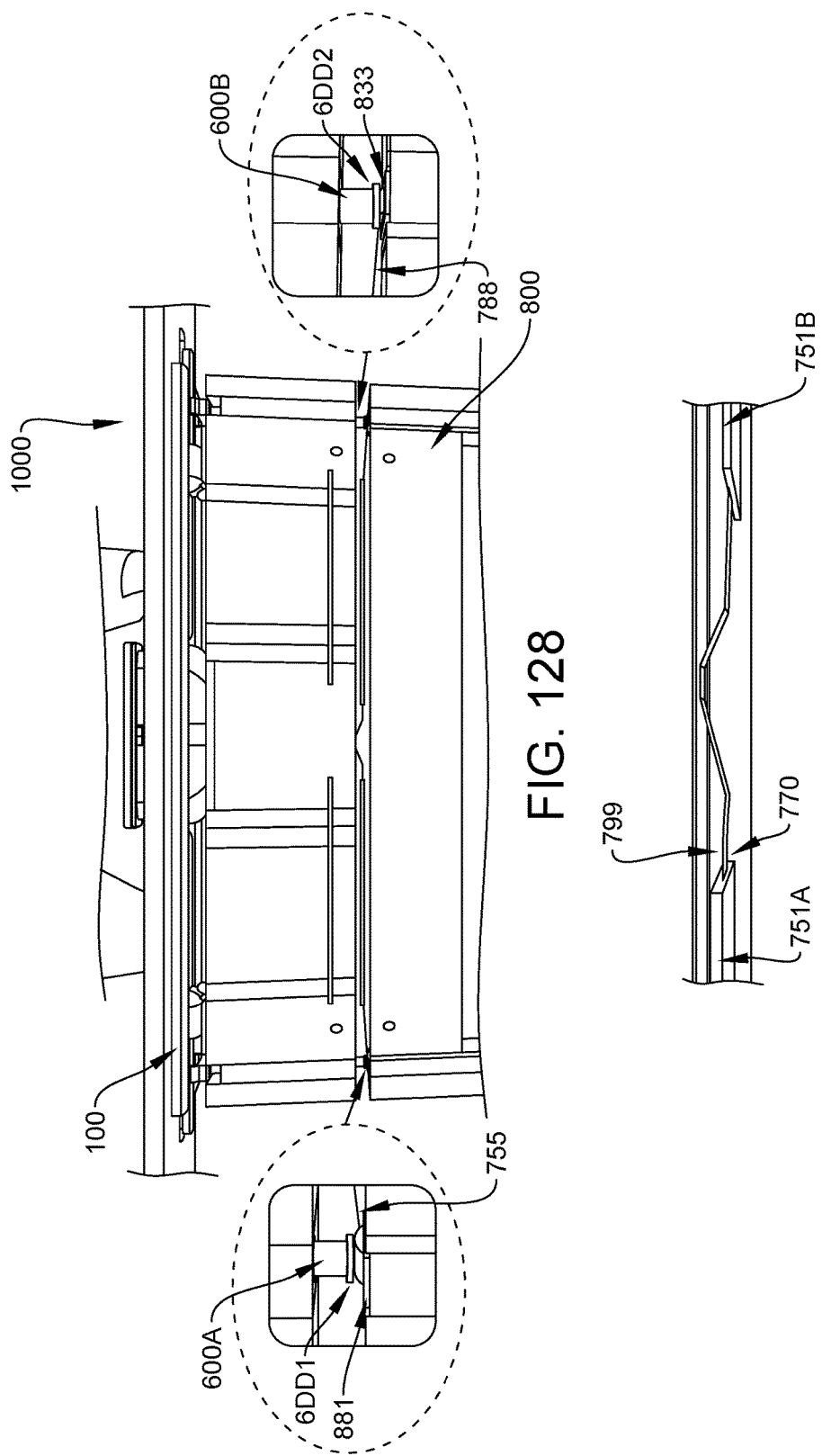

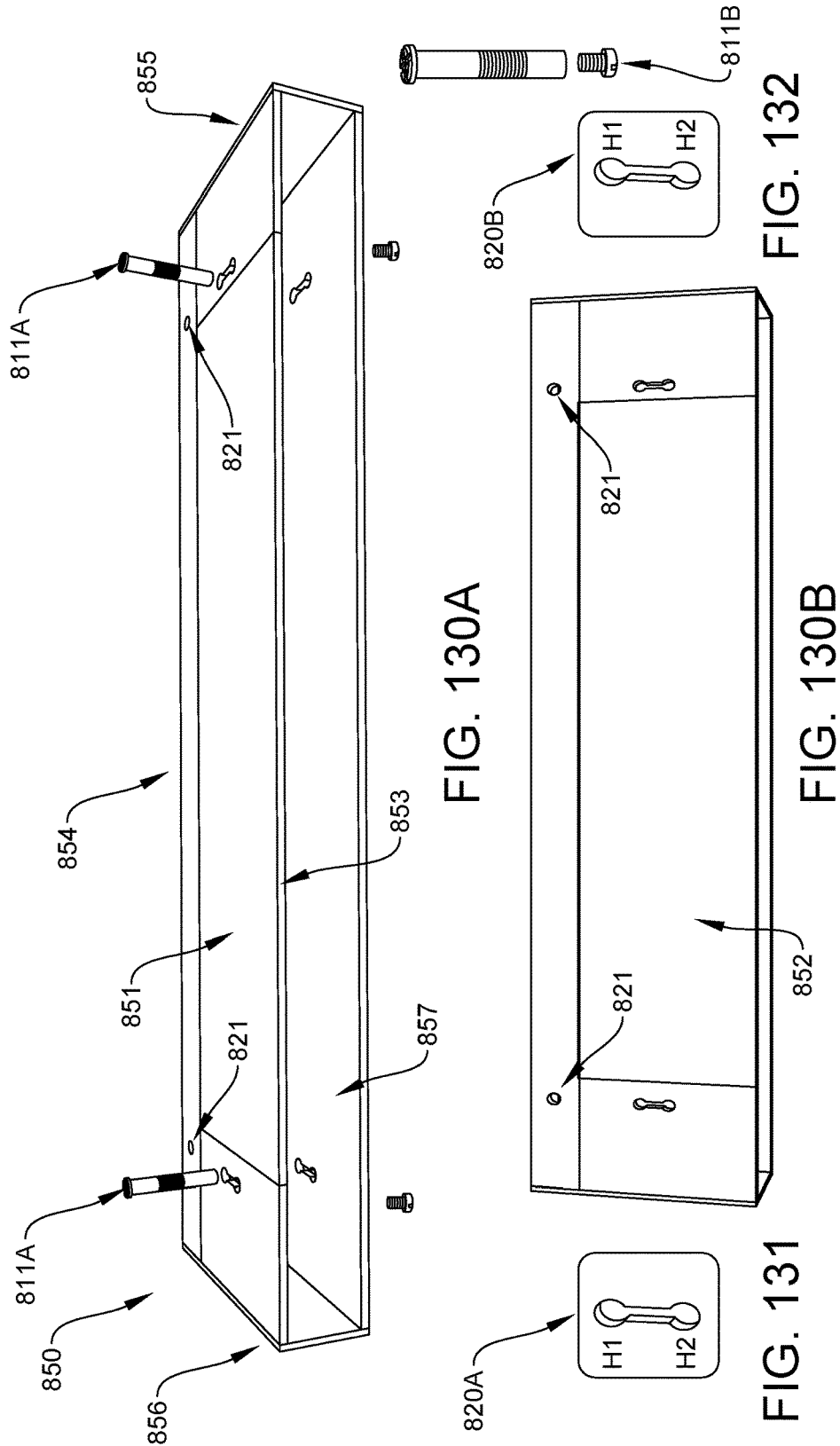

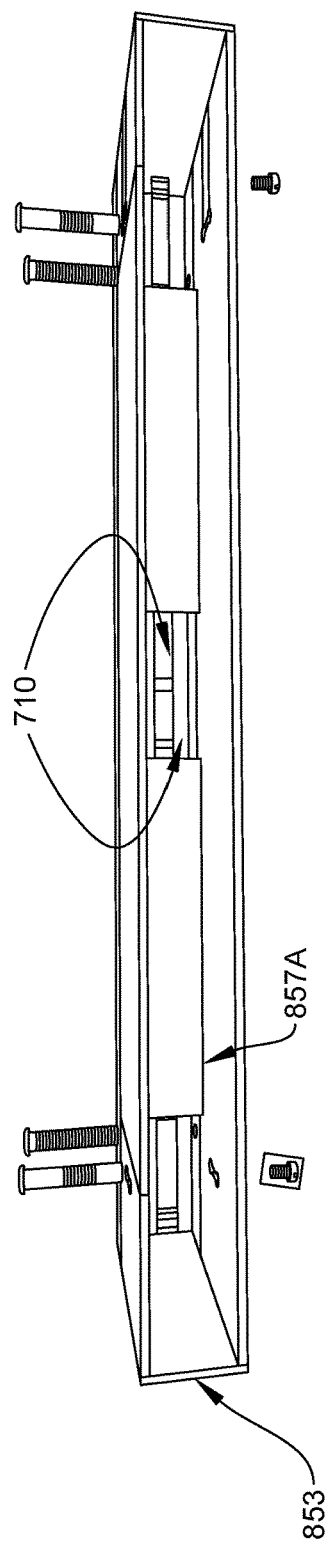
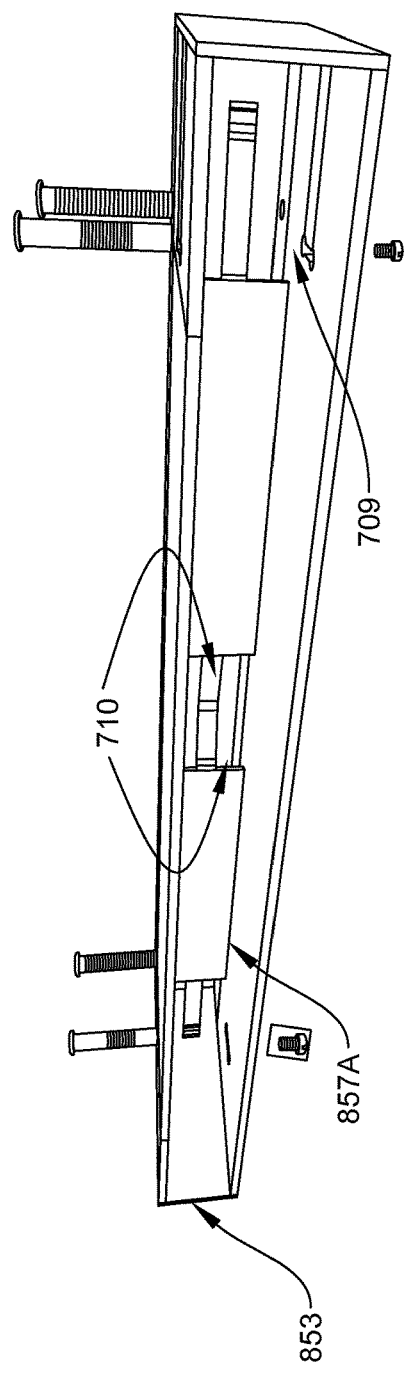
FIG. 133A
FIG. 133B

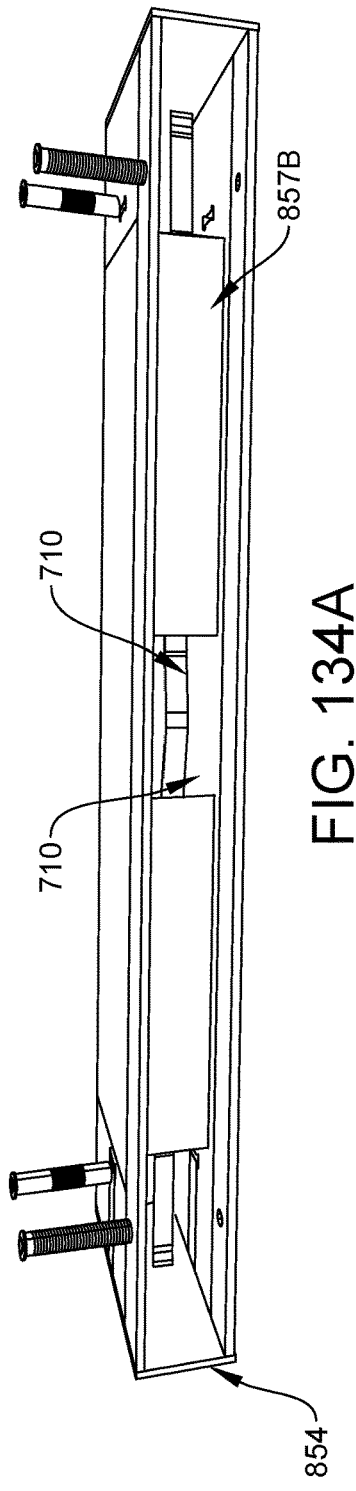
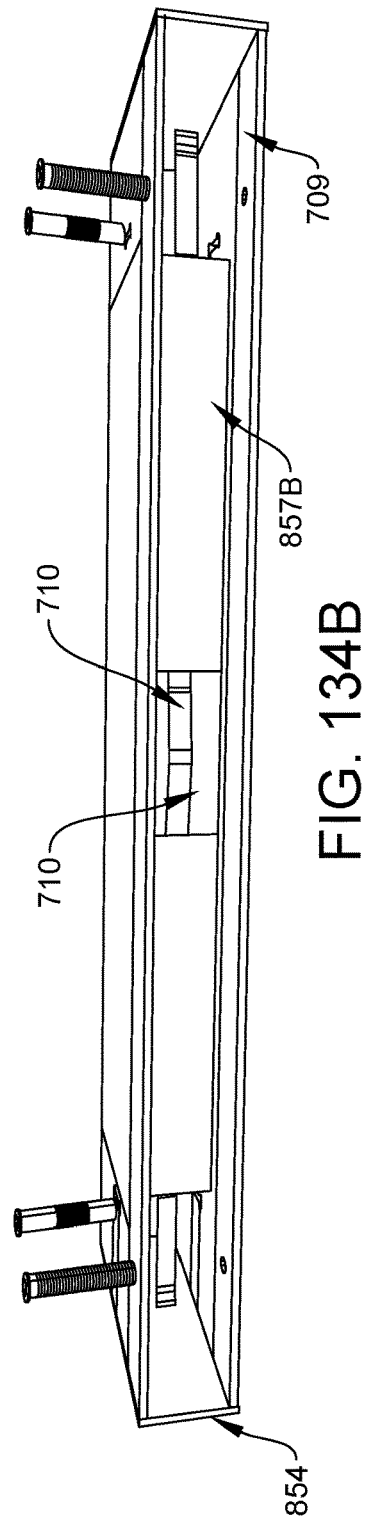

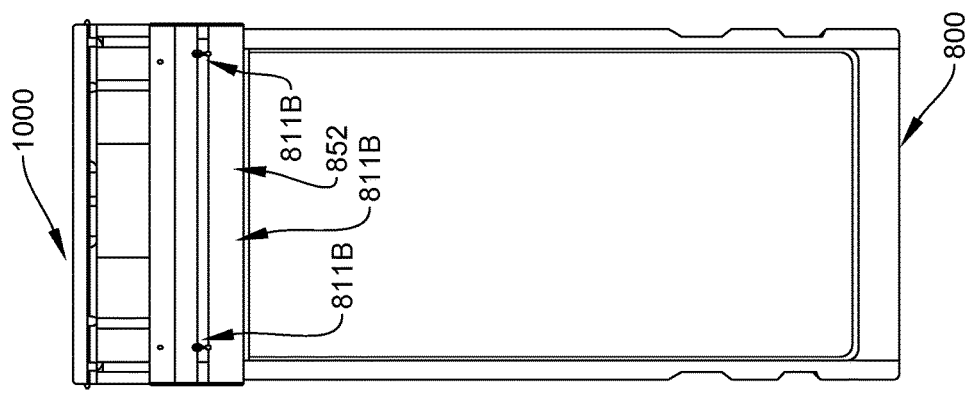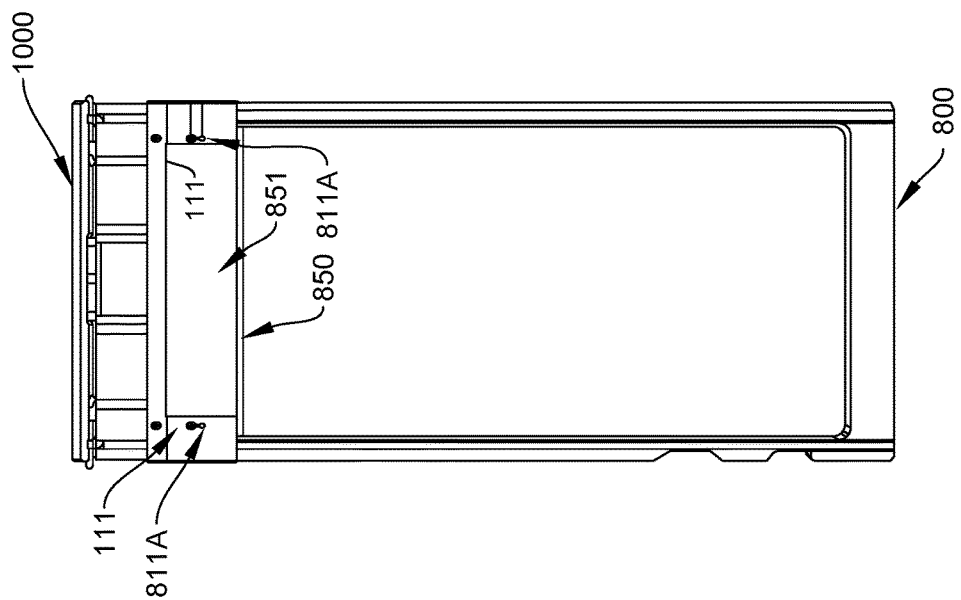
FIG. 141

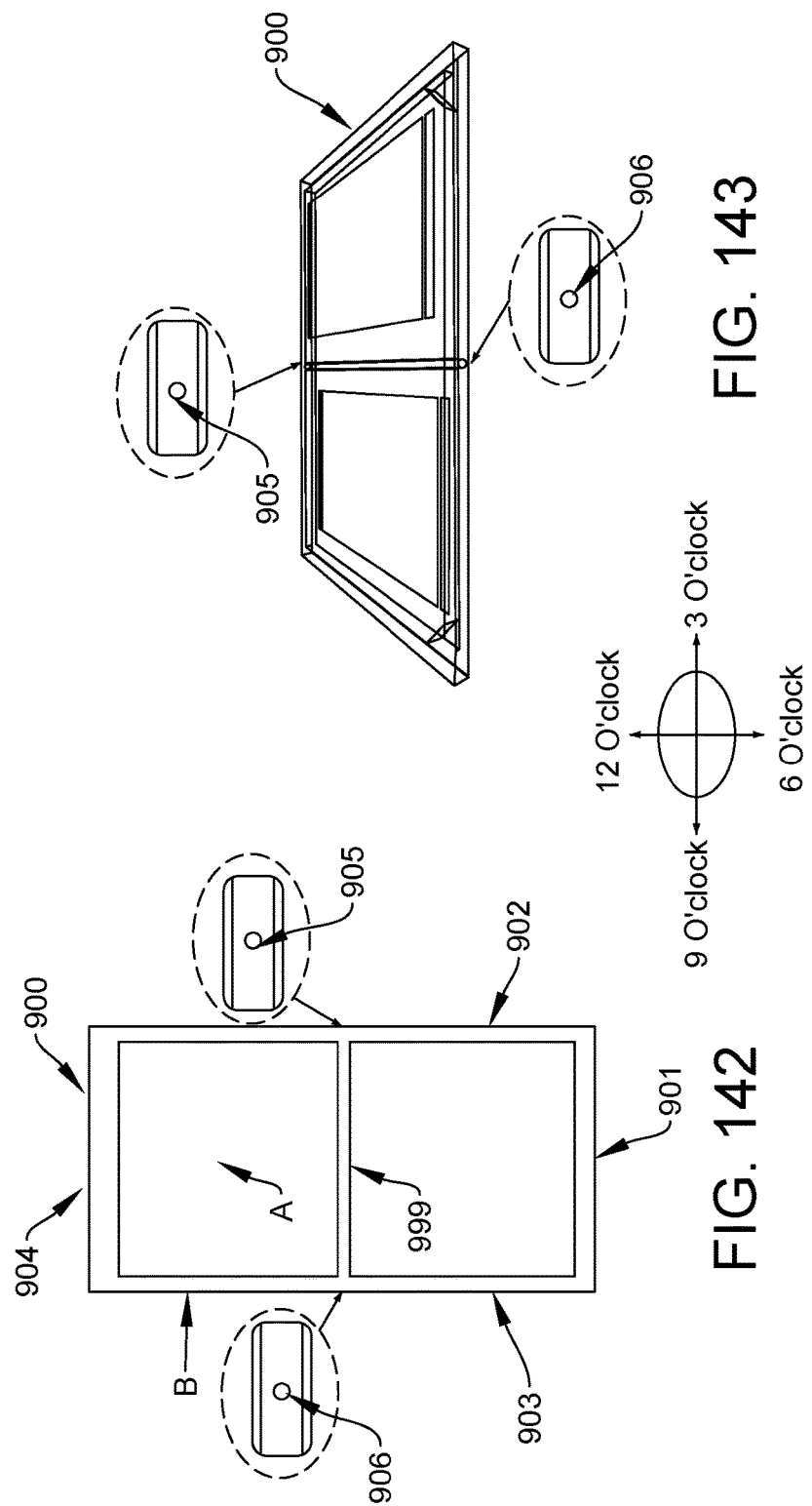

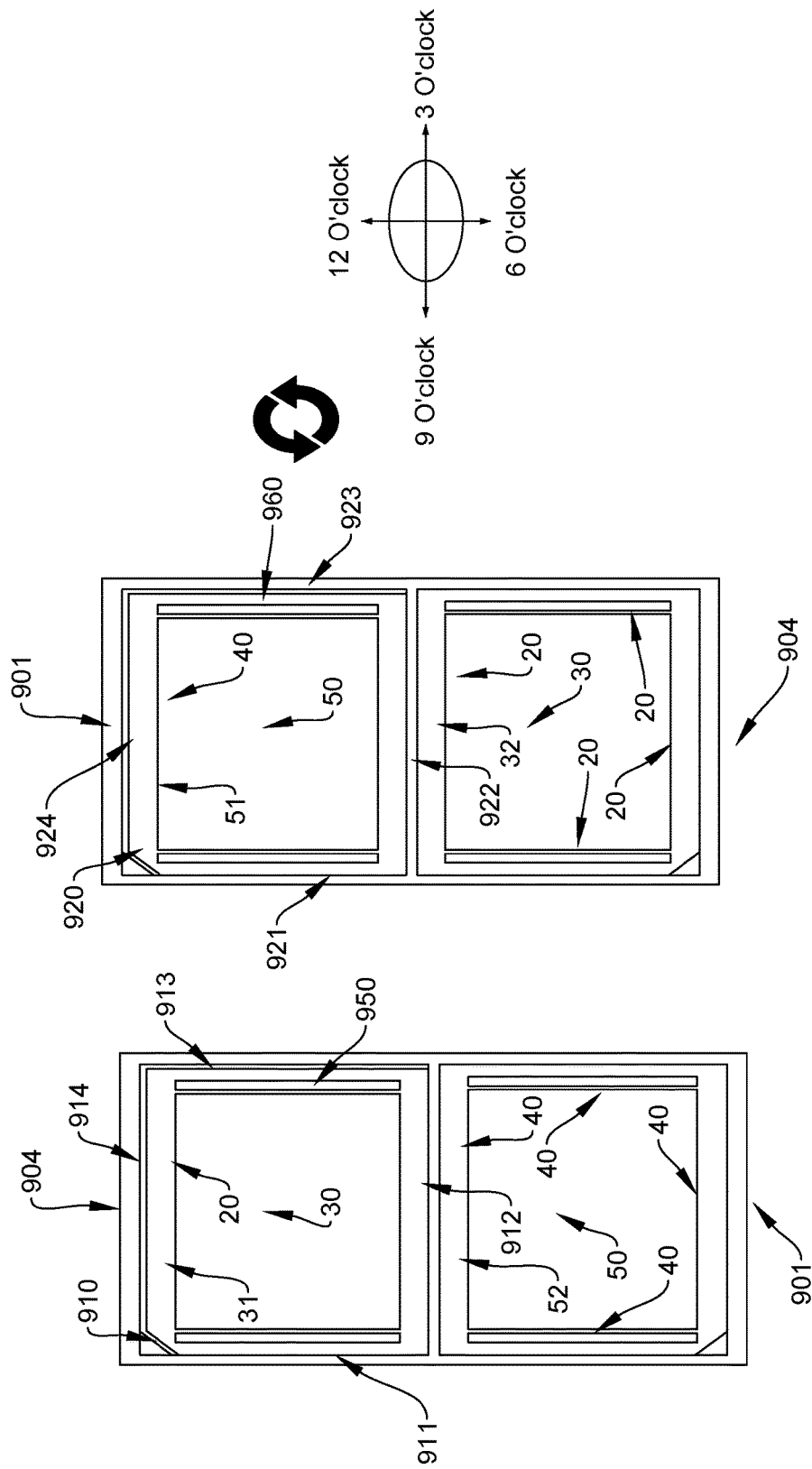

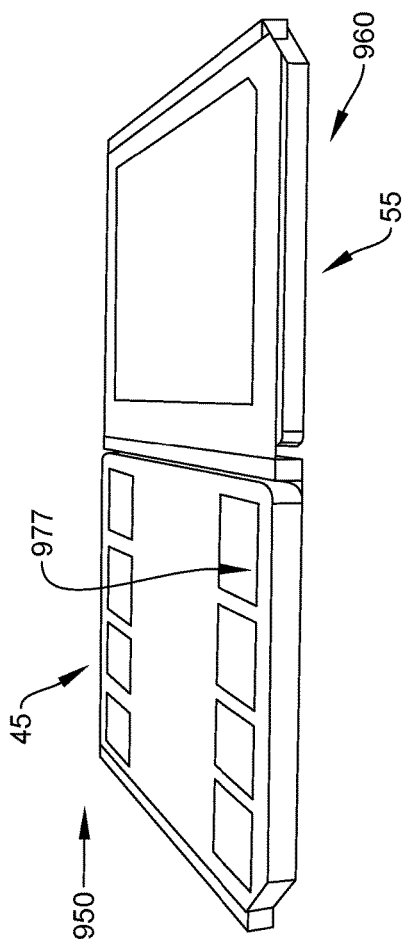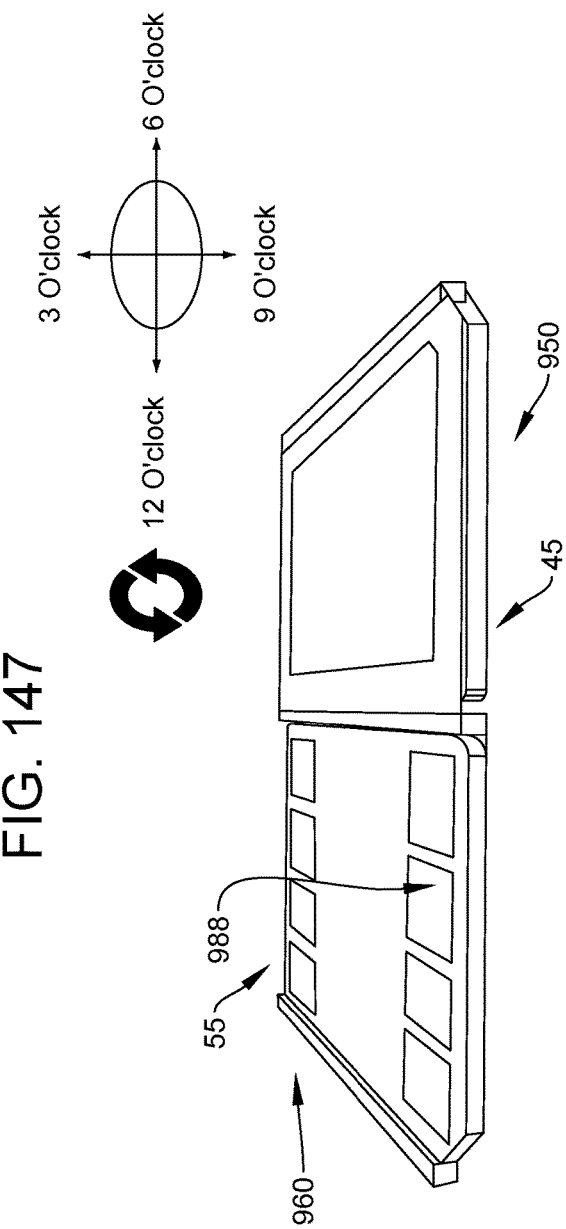
FIG. 147
FIG. 148

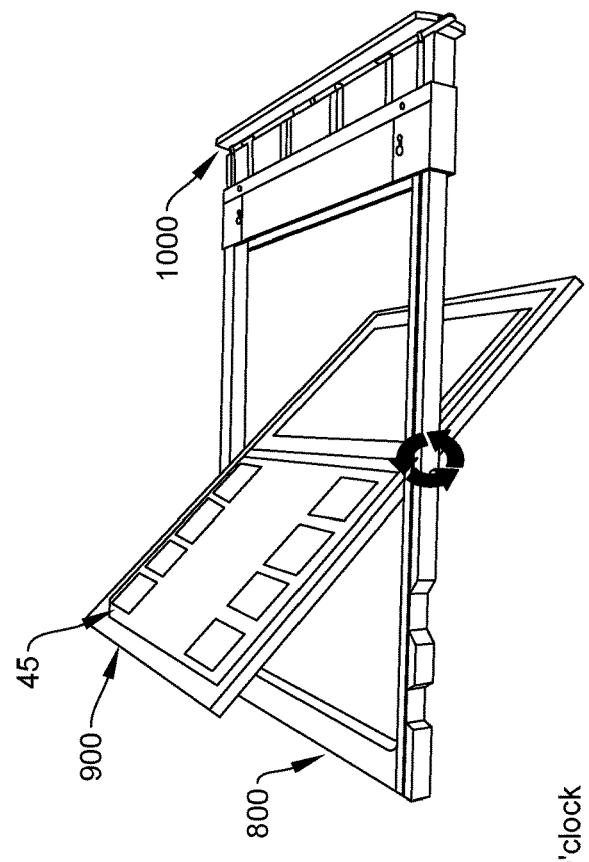
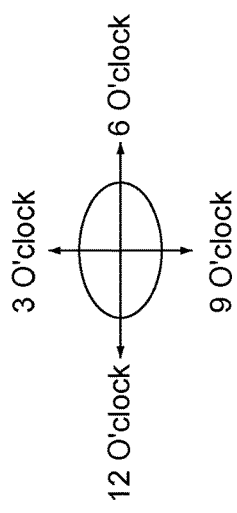
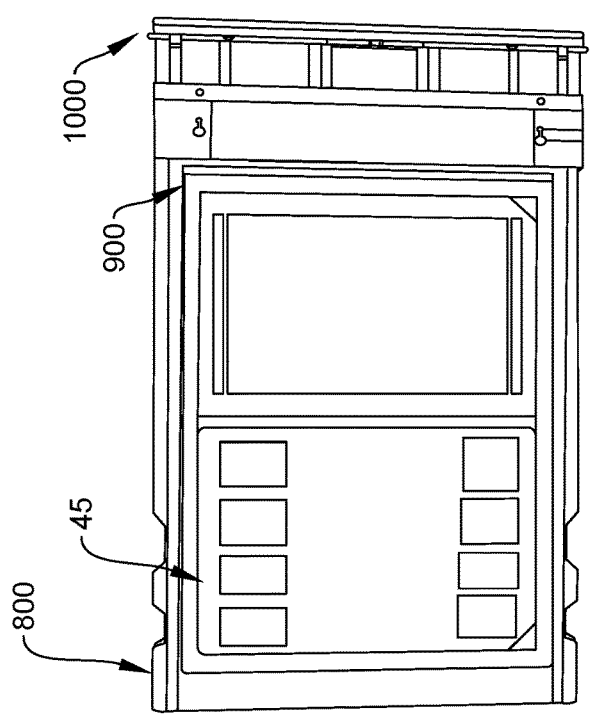
FIG. 155
FIG. 156

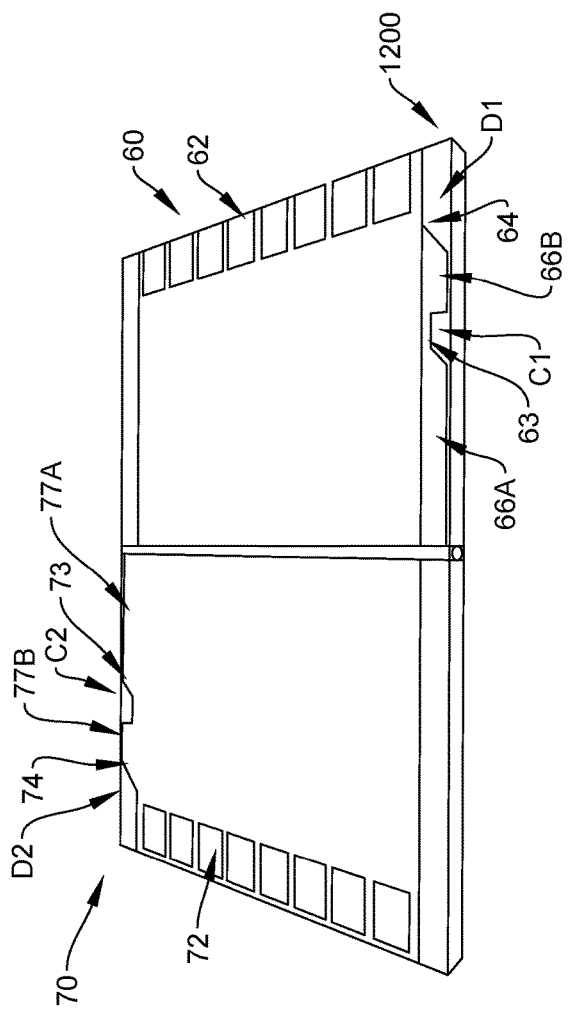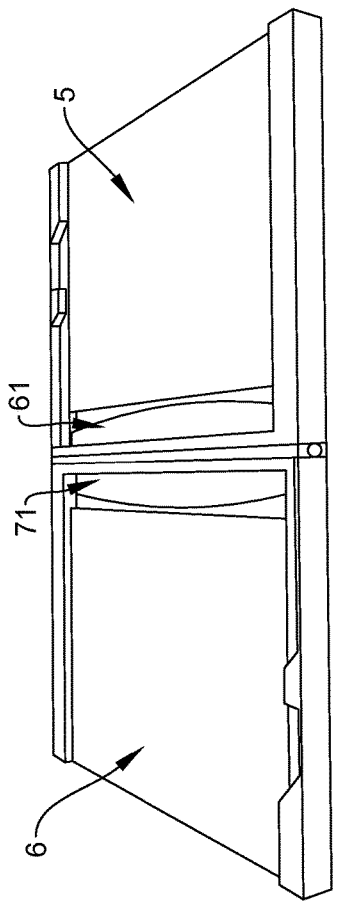
FIG. 167
FIG. 168

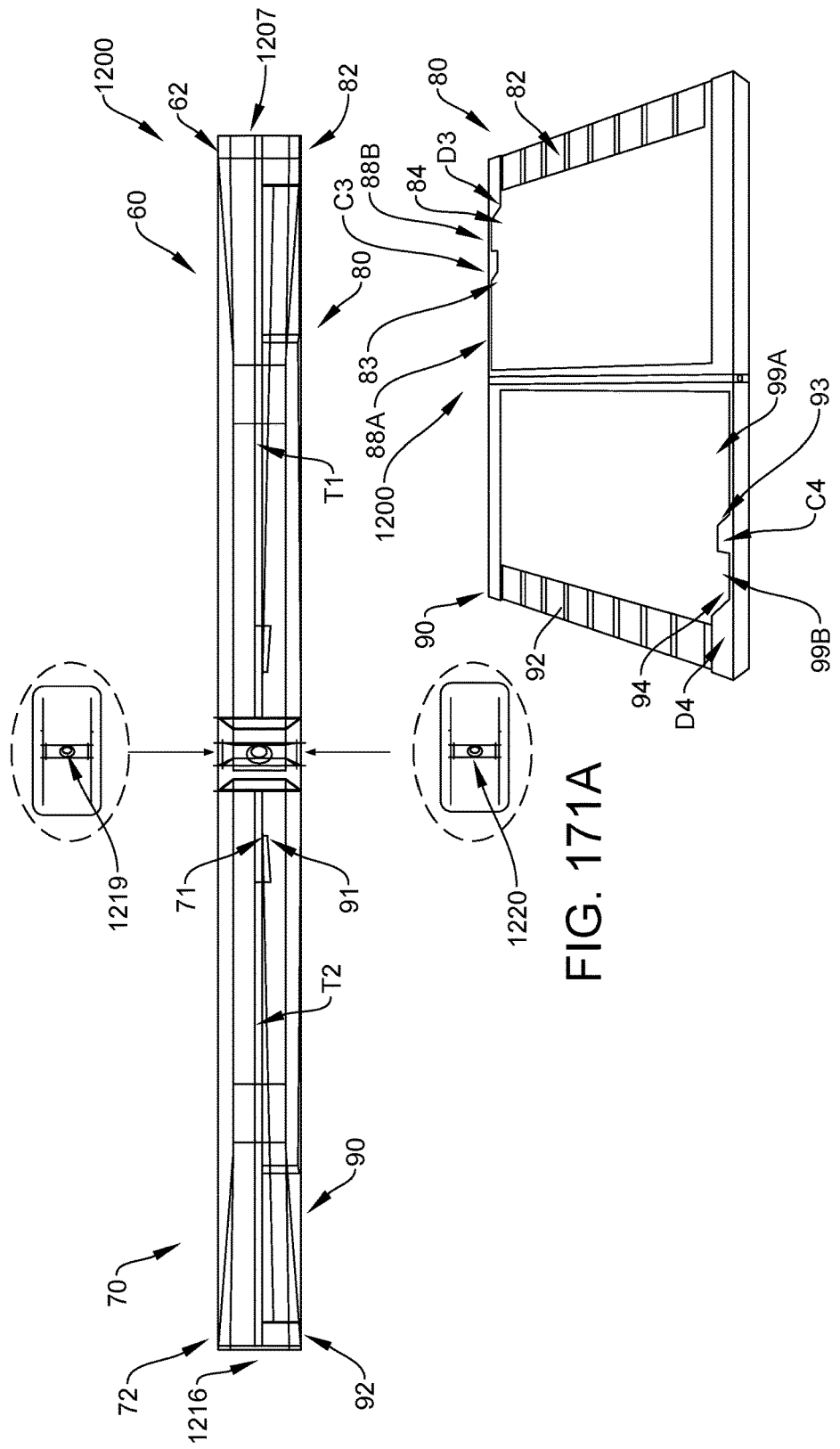

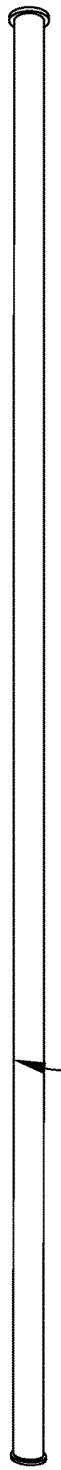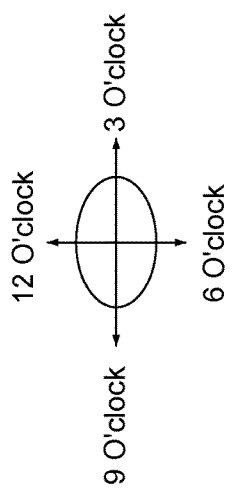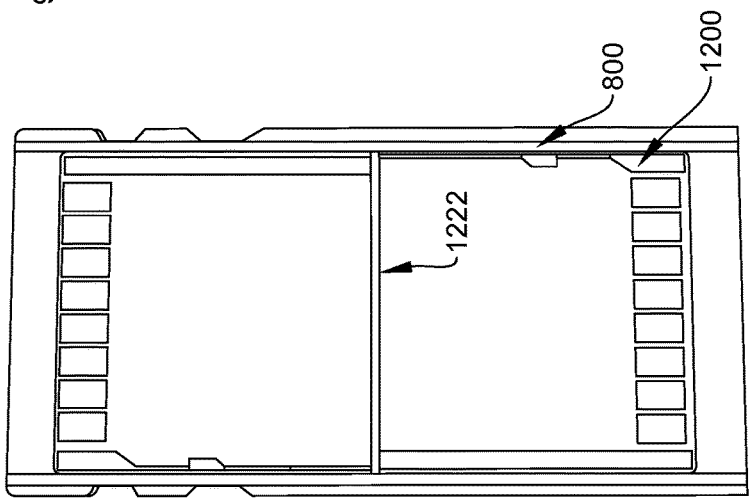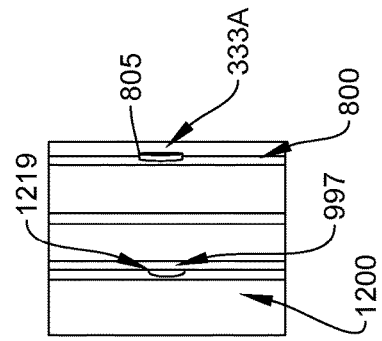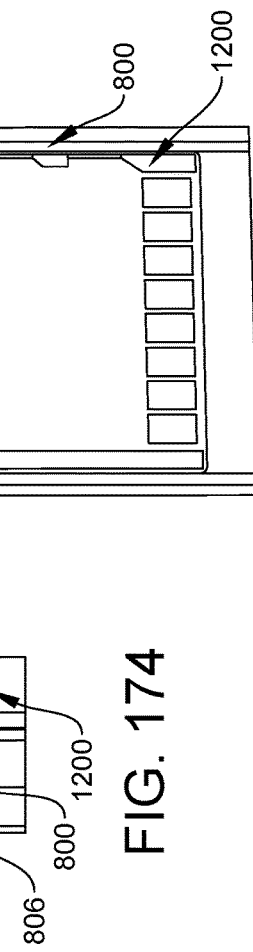
FIG. 175
FIG. 173
FIG. 172
FIG. 174

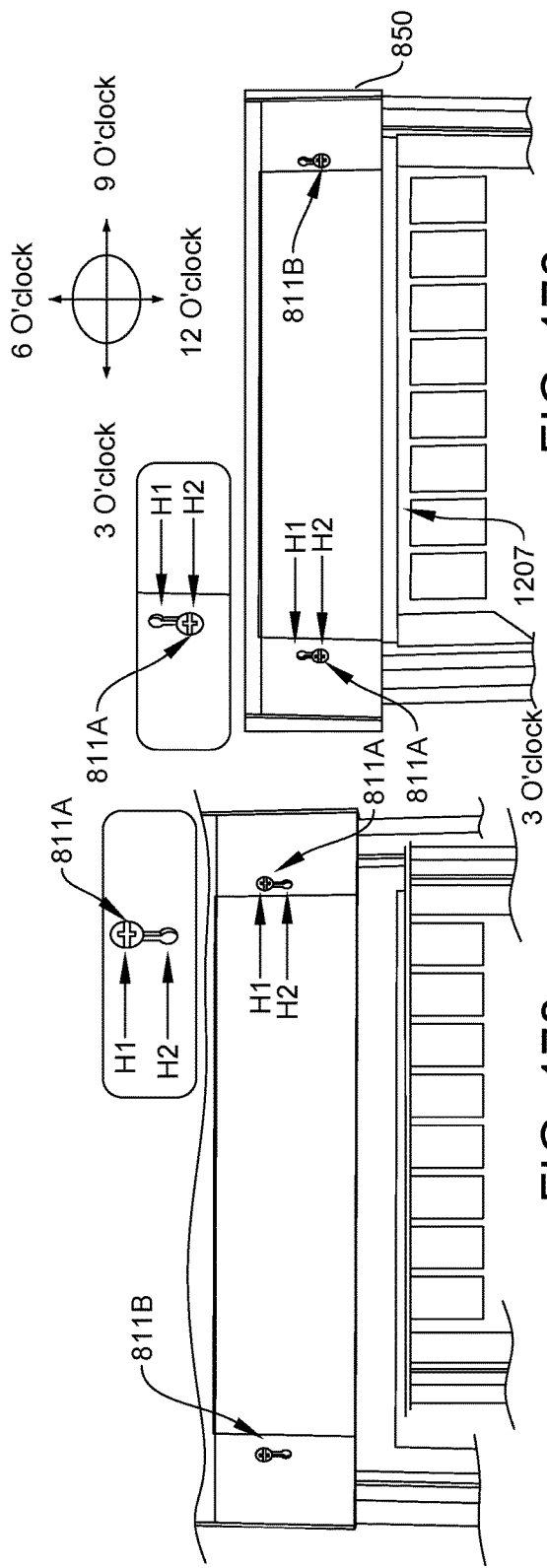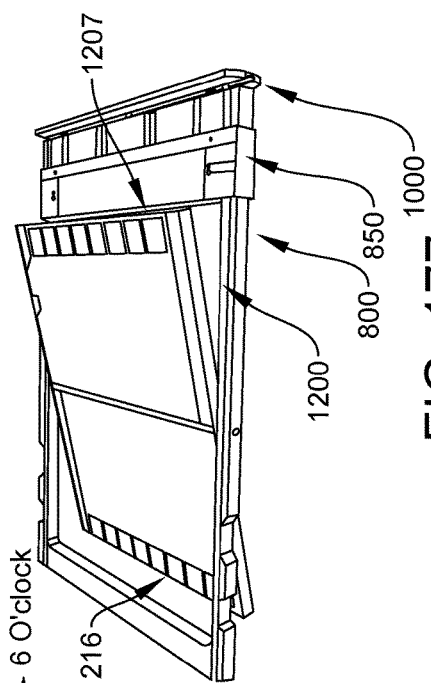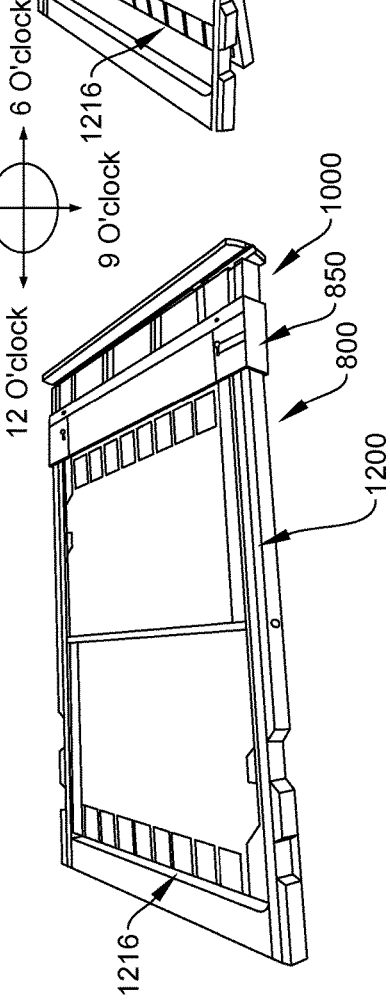
FIG. 176
FIG. 177
FIG. 178
FIG. 179

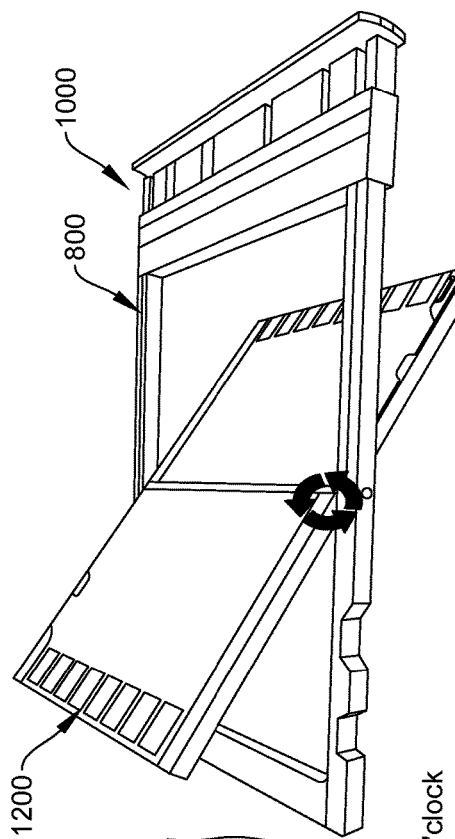
FIG. 180
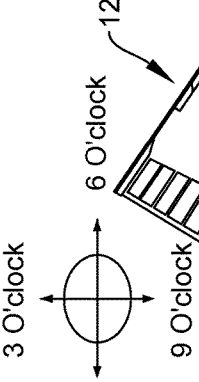
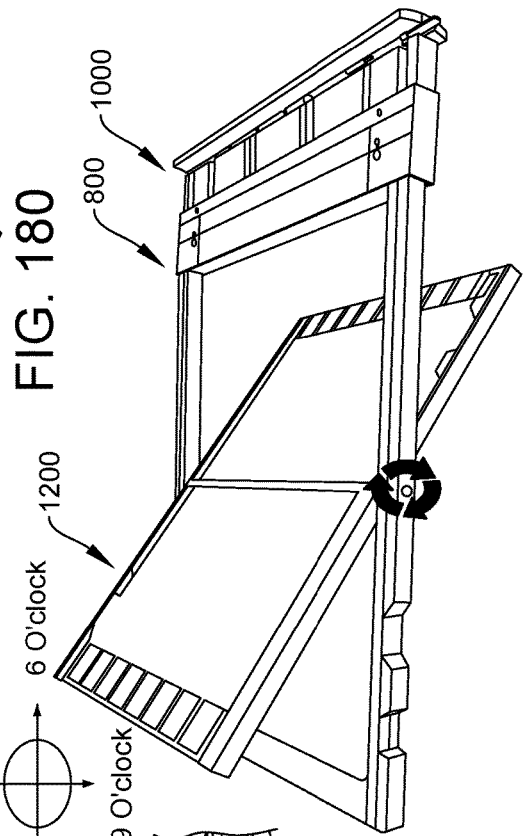
FIG. 181
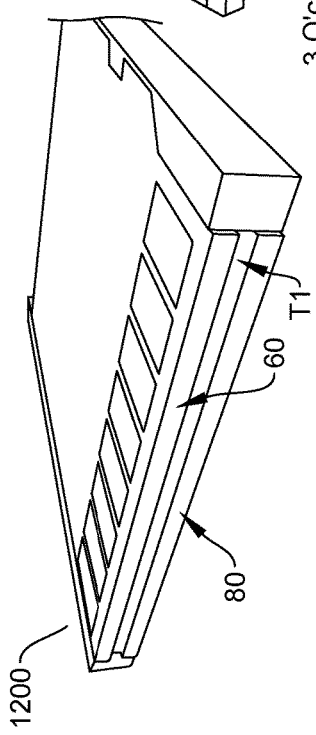
FIG. 182
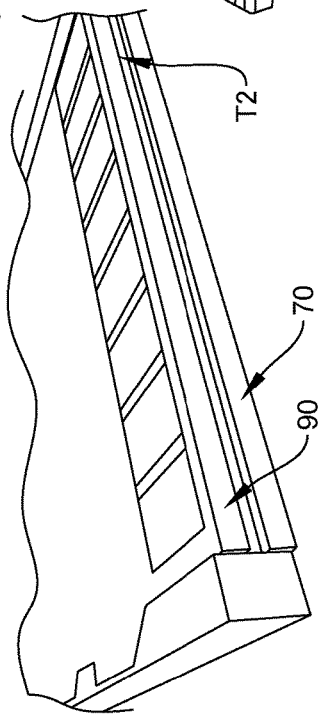
FIG. 183

STEM EJECTABLE COMPONENT ASSEMBLY

CROSS-REFERENCE TO RELATED APPLICATIONS

This application is a continuation-in-part of U.S. patent application Ser. No. 15/681,403 filed on Aug. 20, 2017, the complete disclosure of which, in its entirety, is herein incorporated by reference.

BACKGROUND

Technical Field

The embodiments herein generally relate to an ejectable component assembly that allows insertion as well as ejection of tray holders that hold SIM or MMC cards without using a pin or a needle, and enable the tray holders to slide in and out of electronic devices such as a phone, tablet computer, and other such devices.

Description of the Related Art

A conventional ejectable component assembly enables insertion and ejection of a tray holder configured to hold one or more SIM cards or MMC cards from an electronic device such as a smart phone, tablet, computer and like devices. Tray holders provide convenience of inserting one or more SIM or MMC cards within a device, or removing them without having to open the device cover. However, these assemblies generally require use of a pin or a needle to eject the tray holder, which may be difficult to locate when required.

SUMMARY

In view of the foregoing, an embodiment herein provides a stem ejectable component assembly for an electronic device, wherein the stem ejectable component assembly is characterized by the absence of a requirement of using a pin or needle to eject the tray holder. According to an embodiment, the stem ejectable component assembly for an electronic device comprises a receiving housing comprising a front side and a back side, wherein the back side of the receiving housing is configured to be coupled to a SIM tray or a MMC tray, the receiving housing, along with the coupled SIM tray or the coupled MMC tray configured to slidably fit within the electronic device through a window in a support frame of the electronic device; a front plate coupled at the front side of the receiving housing through a pair of connector pins, the connector pins slidably arranged within a pair of holes in the receiving housing, wherein the front plate is biased to move away from the front side of the receiving housing by a pair of connector pin springs provided along with the pair of connector pins, and wherein the front plate incorporates a pair of slider pins that are configured to slide between a first position that corresponds to outer ends of the slider pins engaging with the frame of the electronic device through a pair of recesses in the frame, and a second position that corresponds to the slider pins being free from engagement with the frame electronic device; and a stem slidably coupled to the receiving housing from the front side of the receiving housing through a window in the front plate, and accommodated in a recess in the receiving housing, wherein the stem is biased to move out of the recess to project out of the front plate, wherein the slider pins are biased by a pair of slider springs to permit inner ends of the slider pins to abut the stem and hold the stem in a pushed-in position within the front plate, and wherein the slider pins incorporate a profiled protrusion that engage with a pair of ball pins fixed to the front side of the receiving housing.

When the front plate is pushed inward towards the support frame, engagement of the profiled protrusion of the slider pins with the ball pins may cause the slider pins to move outward and release the stem to allow the stem to project out of the front plate, wherein when the stem is pulled out, engagement of the inner ends of the slider pins with the stem may cause the slider pins to take the second position to disengage outer ends of the slider pins from the electronic device to enable withdrawal of the stem ejectable component assembly along with the coupled SIM tray or the coupled MMC tray out of the electronic device. When the stem ejectable component assembly is pushed inward from a withdrawn condition through the stem, the slider pins through their engagement with the stem may remain in the second position thereby enabling the front plate to take a position fully within a support frame of the electronic device, and further pushing of the stem may cause the slider pins to move to the first position thereby locking the stem ejectable component assembly within the support frame.

The stem may incorporate a rod to engage a hole in the receiving housing such that the rod projects out of the back side of the receiving housing. The rod may be configured to make a first contact in a circuit when the stem projects out of the front plate. Upon the front plate being pushed inwards, the connector pins may project out of the back side of the receiving housing to make a pair of second contacts of the circuit. The circuit may be configured to provide a display of a slide out status of the stem ejectable component assembly on a screen of the electronic device. The assembly may comprise a tray holder, wherein the back side of the receiving housing is configured to be coupled to the SIM tray or the MMC tray through the tray holder, wherein the tray holder is fixed to the receiving housing through a connector housing. A front side of the connector housing may be fixed to the back side of the receiving housing, and wherein a back side of the connector housing is configured to hold the tray holder. The tray holder may be configured to hold the SIM tray or the MMC tray such that the SIM tray or the MMC tray is rotatable. Rotation of the SIM tray or the MMC tray may enable positioning of any of a pair of sides of the SIM tray or the MMC tray in an upward facing position for one or more SIM cards or one or more MMC cards positioned on the upward facing side to take an active position. In an example, an axis of rotation of the SIM tray or the MMC tray lies within a plane of the tray holder and is implemented by a pin passing through holes in the tray holder, and a hole in the SIM tray or the MMC tray. The axis of rotation of the SIM tray or the MMC tray may be oriented in any of a direction along a sliding direction of the stem ejectable component assembly, or a direction transverse to the sliding direction of the stem ejectable component assembly. The tray holder may be slidably fixed to the connector housing, wherein the sliding of the tray holder towards the connector housing causes the SIM tray or the MMC tray to engage with a recess on the back side of the connector housing thereby locking the SIM tray or the MMC tray preventing the SIM tray or the MMC tray from rotating.

The sliding of the tray holder away from the connector housing may cause the SIM tray or the MMC tray to disengage from the recess thereby unlocking the SIM tray or the MMC tray to enable rotation of the SIM tray or the MMC tray. The sliding movement of the tray holder towards or away from the connector housing may be controlled by a plurality of connected holes, wherein a pair of the holes are connected to each other by a notch. The assembly may comprise a plurality of pins, wherein the pins are positioned between the plurality of holes, and wherein sliding of the pins through the notch controls the sliding movement of the tray holder towards or away from the connector housing. The SIM tray may be configured to hold a pair of SIM cards, one on each side of the SIM tray, and wherein rotation of the SIM tray enables swapping active and standby positions of the pair of SIM cards. The MMC tray may be configured to hold four MMC cards, two on each side of the MMC tray such that conductive pads of two MMC cards held on the opposite sides of the MMC tray in a mutually opposite position face each other, and wherein conductive pads of the remaining two MMC cards held on the opposite sides of the MMC tray in a mutually opposite position face an outward direction. The MMC tray may be configured to hold all four MMC cards, with their conductive pads facing outward, and wherein two MMC cards positioned on a same side with their conductive pads facing outward doubles a storage capacity of the electronic device.

The embodiments herein provide an ejectable component assembly that may eject the tray holders without the use of a pin or a needle, wherein the tray holder may be configured to hold the SIM cards in active positions or standby positions so that the SIM cards may not have to be removed or inserted in the tray holder to change their status.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 1A through 1C are exemplary views illustrating configurations of a stem ejectable component assembly with a support frame for use with an electronic device, according to the embodiments herein.

FIGS. 2A through 3 are exemplary views illustrating front sides of a front plate and a main receiving housing of the stem ejectable component assembly, according to the embodiments herein.

FIGS. 4 through 8 are exemplary views illustrating back sides of the front plate and the main receiving housing of the stem ejectable component assembly, according to the embodiments herein.

FIGS. 9 through 18 are exemplary views of the main receiving housing, according to the embodiments herein.

FIGS. 21 through 24 are exemplary views of a first slider pin of the stem ejectable component assembly, according to the embodiments herein.

FIGS. 25 through 28 are exemplary views of a second slider pin of the stem ejectable component assembly, according to the embodiments herein.

FIGS. 29 through 33 are exemplary views illustrating engagement of the first slider pin with a first receiving groove, according to the embodiments herein.

FIGS. 34 through 38 are exemplary views illustrating engagement of a second slider pin with a second receiving groove, according to the embodiments herein.

FIGS. 39 through 41 are exemplary views of a stem insertable into a front window of the front part of the stem ejectable component assembly, according to the embodiments herein.

FIGS. 42 through 47 are exemplary views of a main slider portion of the stem, according to the embodiments herein.

FIGS. 48 through 58 are exemplary views of engagements of connector pins with connector housings of the main receiving housing, according to the embodiments herein.

FIGS. 59 through 73 are exemplary views illustrating engagement of the stem with the main receiving housing, according to the embodiments herein.

FIGS. 74 through 82 are exemplary views illustrating a relationship of mounted ball pins and the profiled protrusions of slider pins, according to the embodiments herein.

FIGS. 83 through 87 are exemplary views of a support frame that supports the stem ejectable component assembly, according the embodiments herein.

FIGS. 88 through 92 are exemplary views of a main receiving housing and middle receiving housing that receives the stem, according to the embodiments herein.

FIGS. 93 through 99 are exemplary views illustrating pulling out of the stem from the main receiving housing, according to the embodiments herein.

FIGS. 104 through 110 are exemplary views illustrating complete ejection of the stem from the receiving housing, according to the embodiments herein.

FIGS. 111 through 116 are exemplary views illustrating engagement of the stem ejectable component assembly with a front receiving window of the support frame, according to the embodiments herein.

FIGS. 117 through 122 are exemplary views of a tray holder that receives a SIM tray, according to the embodiments herein.

FIGS. 123 through 125 are exemplary views of a detect switch for detecting when a user has pushed the front plate, according to the embodiments herein.

FIGS. 126 through 129 are exemplary views illustrating the relationship of detect switch and the stem ejectable component assembly, according to the embodiments herein.

FIGS. 130A through 134B are exemplary views illustrating a connector housing, according to the embodiments herein.

FIGS. 138 through 141 are exemplary views illustrating engagement of the connector housing with the stem ejectable component assembly, according to the embodiments herein.

FIGS. 142 through 148 are exemplary views illustrating engagement of one or more SIM cards with a SIM tray, according to the embodiments herein.

FIGS. 155 through 158 are exemplary views of a complete assembly of the stem ejectable component assembly and the rotary tray, according to the embodiments herein.

FIGS. 165 through 171B are exemplary views illustrating engagement of a plurality of MMC cards with the first and the second receiving slots, according to the embodiments herein.

FIGS. 172 through 175 are exemplary views illustrating engagement of a rod with through holes of the tray holder and with two through holes of the rotary MMC tray, according to the embodiments herein.

FIGS. 176 through 183 are exemplary views illustrating locking—unlocking of the rotary MMC tray and its rotation, according to the embodiments herein.

DETAILED DESCRIPTION

Figure 19:
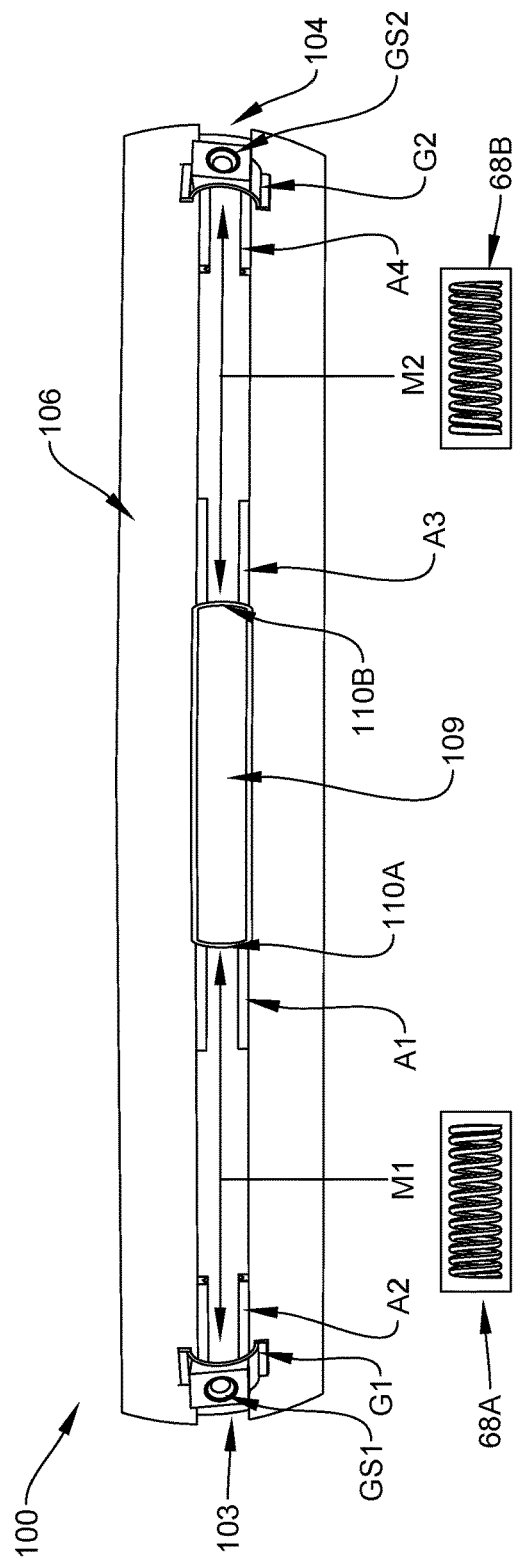
FIGS. 19 and 20 are exemplary views of the back side of the front plate from different angles, according to the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

FIGS. 1A through 1C are exemplary views illustrating a configuration of a stem ejectable component assembly 1000 configured to be received by a support frame 1001 that may be configured in an electronic device, according to the embodiments herein. The stem ejectable component assembly (also referred to as "ejectable component assembly" hereinafter) 1000 may be configured with a rotatable SIM tray 900 that holds one or more of any or a combination of SIM cards and MultiMediaCard (MMC) cards. The SIM tray 900 may be a pivotally attached to part of the stem ejectable component assembly 1000 such that the SIM tray 900 pivotally rotates about an axis (refer to FIG. 1C) of the stem ejectable component assembly 1000 so as to enable swapping/switching of active and standby positions of the one or more of SIM cards and Multi Media Card (MMC) cards held on the SIM tray 900. The stem ejectable component assembly 1000 is insertable into a front window 12 of the support frame 1001 formed by recessing and penetrating through a front side of the support frame 1001 (refer FIGS. 1A and 1B).

In an aspect, the disclosed stem ejectable component assembly 1000 is configured to allow insertion of the SIM tray 900 to an electronic device such as a mobile phone, a tablet, a laptop, a computer, a personal digital assistant (PDA) and the like devices, and its ejection from the device without having to use a pin or a needle.

Referring to FIGS. 2 and 3, with reference to FIGS. 1A through 1C, the stem ejectable component assembly 1000 comprises a front plate 100 having a front side 105, a back side 106, a top side 101, a bottom side 102, a left side 103, a right side 104, and a front window 108 formed by recessing and penetrating through the front side 105. The front window 108 extends in a direction and through the back side 106, where a receiving groove 107 is formed by recessing the front window 108. The front window 108 extending through the front side 105 is used for accommodating the back side of a mini hand gripping portion of a stem 400 to keep the stem 400 in one level with the surface of the front side 105.

In an embodiment, the front plate 100 has a receiving groove extending around edge of the front plate 100 to receive an elastic seal to prevent water and dust from entering the electronic device or any other device that uses the ejectable component assembly 1000.

The ejectable component assembly 1000 includes a first slider pin 200 configured with a first return spring 68A and a second slider pin 300 configured with a second return spring 68B. The stem ejectable component assembly 1000 further includes a main receiving housing 500 having a first connector pin 600A along with the first return spring 60A and the second connector pin 600B along with the second return spring 60B, wherein the first return spring 60A and the second return spring 60B have a lower force than the return springs 68A, 68B, and wherein a return spring 555P configured with the stem 400 has the lowest force among all these springs.

In an aspect, the main receiving housing 500 has a front side 510, a top side 502, a bottom side 503, a right side 504, a left side 505, and a back side 506, where the main receiving housing 500 incorporates a recess termed as middle receiving housing 501 to receive the stem 400. The middle receiving housing 501 includes an inner back wall 501K, a front partial portion 510A and a back side 510B positioned at top of an insert opening window of the middle receiving housing 501 that is connected to the top side 502 and respectively connected to the left side and right side of the insert opening window of the middle receiving housing 501. The front side 510 of the main receiving housing 500 includes ball pins 700A, 700B, and the top side 502 incorporates two through holes 155 having similar arrangements penetrating through the top side 502 in the direction through the back side/opposite site to receive two pins 111.

FIGS. 4 through 8, with reference to FIGS. 1A through 3, are exemplary exploded views illustrating the back side of the front plate 100 and the main receiving housing 500 of the stem ejectable component assembly 1000, according to the embodiments herein. The front plate 100, at its back, includes a middle opposite window 109, a first receiving groove M1 having a first guiding track A1 and a second guiding track A2, a second receiving groove M2 having a third guiding track A3 and a fourth guiding track A4, a first connecting housing G1, a second connecting housing G2. The back side 506 of the main receiving housing 500 incorporates a through hole 509 that penetrates through the back side 506 in a direction and through the inner back wall 501K of the middle receiving housing 501 (refer to FIGS. 2A through 2D). The through hole 509 receives a mounted rod 490 (shown in FIG. 44) of the stem 400. The back side 506 of the main receiving housing 500 further includes two long through holes 520A, 520B, as further shown in FIGS. 7 and 8, incorporating similar arrangements, that penetrate through the back side 506 in a direction and through the front side 510. Each of the long through holes 520A, 520B include circular housing holes 522A, 522B that have wider diameter than the long through holes 520A, 520B. Each short circular hole among the housing holes 522A, 522B extends from the surface of the back side 506 towards the front side 510 and are connected to each of the long through holes 520A, 520B.

Each of the short circular housing holes 522A, 522B include bottom surfaces 521A, 521B (or bottom of the counter bore) that are used to receive and work as stoppers for wider inner annular surfaces 6DA, 6DB of heads of respective connector pins 600A, 600B, as shown in FIG. 5 and FIG. 6. The bottom surfaces 521A, 521B limit displacement of respective connector pins 600A, 600B. The two identical long through holes 520A, 520B receive the connector pins 600A, 600B, each connector pin having a threaded end as shown in FIG. 5 and FIG. 6.

The connector pins 600A, 600B are configured to connect to one of each of the connector housings G1, G2 on back side 106 of the front plate 100 through the threaded ends. The first connector pin 600A and the second connector pin 600B include heads that provide surfaces 6DD1, 6DD2 respectively, and further include wider inner annular surfaces 6DA, 6DB respectively to mate and abut with the bottom surfaces 521A, 521B. The surfaces 6DD1, 6DD2 of the connector pins 600A, 600B include a plurality of notches to tighten each connector pins when connected to the connector housings G1, G2.

The two long through holes 520A, 520B are respectively formed to receive the connectors pins 600A, 600B, such that when the first connector pin 600A and the second connector pin 600B are inserted into the two long through holes 520A, 520B respectively from the back side 506, the connector pins 600A, 600B project out at the front side 510 of the main receiving housing 500, where the two long through holes 520A, 520B have a common recess allowing the connector pins 600A, 600B to freely move towards inner direction and towards outer direction when a user pushes the front plate 100. The back side 510B of the front partial portion 510A is shown to be positioned at a front top of the middle receiving housing 501 used for mating and abutting with a taper protrusion portion 466 (shown in FIG. 42) and to prevent displacement of the stem 400 from getting out of its place.

FIGS. 9 through 18, with reference to FIGS. 1A through 8, are further exemplary views of the main receiving housing 500, according to the embodiments herein. Referring to FIG. 9, the front side of the main receiving housing 500 along with the middle receiving housing 501 is shown in which front side 510 includes two receiving housings 588A, 588B to receive the connector housings G1, G2. Two front long opposite through holes 530A, 530B extend from the back side 506. The front long opposite through holes 530A, 530B are connected to back long through holes 520A, 520B, each opposite through holes of 530A, 530B include front circular housing holes 533A, 533B, as shown in FIG. 12 and FIG. 13. The front circular housing holes 533A, 533B have wider diameters than the long opposite through holes 530A, 530B, and extend inwardly from the surface of the front side 510 towards the back side 506 to end at respective bottom surfaces 532A, 532B respectively. Each of the front circular housing holes 533A, 533B receive one of the return springs 60A or 60B, as shown in FIG. 14 and FIG. 15, and detent the return springs 60A or 60B at the respective bottom surfaces 532A, 532B. The other end of the first return spring 60A engages with a top head of the first connector pin 600A such that when the first connector pin 600A is inserted into the first long through hole 520A from the back side 506 of the main receiving housing 500 in a direction through the front side 510, the threaded head of the first connector 600A is exposed and appears at the front side 510, and the first return spring 60A gets inserted into the first front circular housing hole 533A along the front top head of the first connector pin 600A, as shown in FIG. 16. Likewise, the second return spring 60B engages with the second front circular housing hole 533B along the top head of the second connector pin 600B, as shown in FIG. 17.

In an embodiment, the front side 510 of the main receiving housing 500 may include two ball pins 700A, 700B that extend from the front side 510 in the direction towards the back side 506. The first ball pin 700A may be positioned next to the through hole 530A and may be connected to the main receiving housing 500, as shown in FIG. 11. The ball head of the first ball pin 700A may be used to mate and abut with first profiled protrusion 211 of a first slider pin 200 (of FIG. 21). The second ball pin 700B may be positioned next to the through hole 530B towards the first ball pin 700A connected to the main receiving housing 500, as shown in FIG. 10, so as to mate and abut with a second profiled protrusion 311 of a second slider pin 300 (of FIG. 25).

The middle receiving housing 501 includes a first guiding track 5AA, a second guiding track 5BB, inner pairs of bumpers (also referred to as "axial bumpers" hereinafter) comprising a top axial bumper 599A, and an opposite axial bumper 599B, as shown in FIG. 18. Part of the stem 400 to be inserted into the middle receiving housing 501 may have an oval shape to match the shape of the middle receiving housing 501. The top bumper 599A may be connected to a top wall of the middle receiving housing 501 and the opposite bumper 599B may be connected to an opposite wall of the middle receiving housing 501. The bumpers 599A, 599B are adapted to mate and abut with an axially slidable body 480 of the stem 400 (of FIG. 40).

Figure 20:
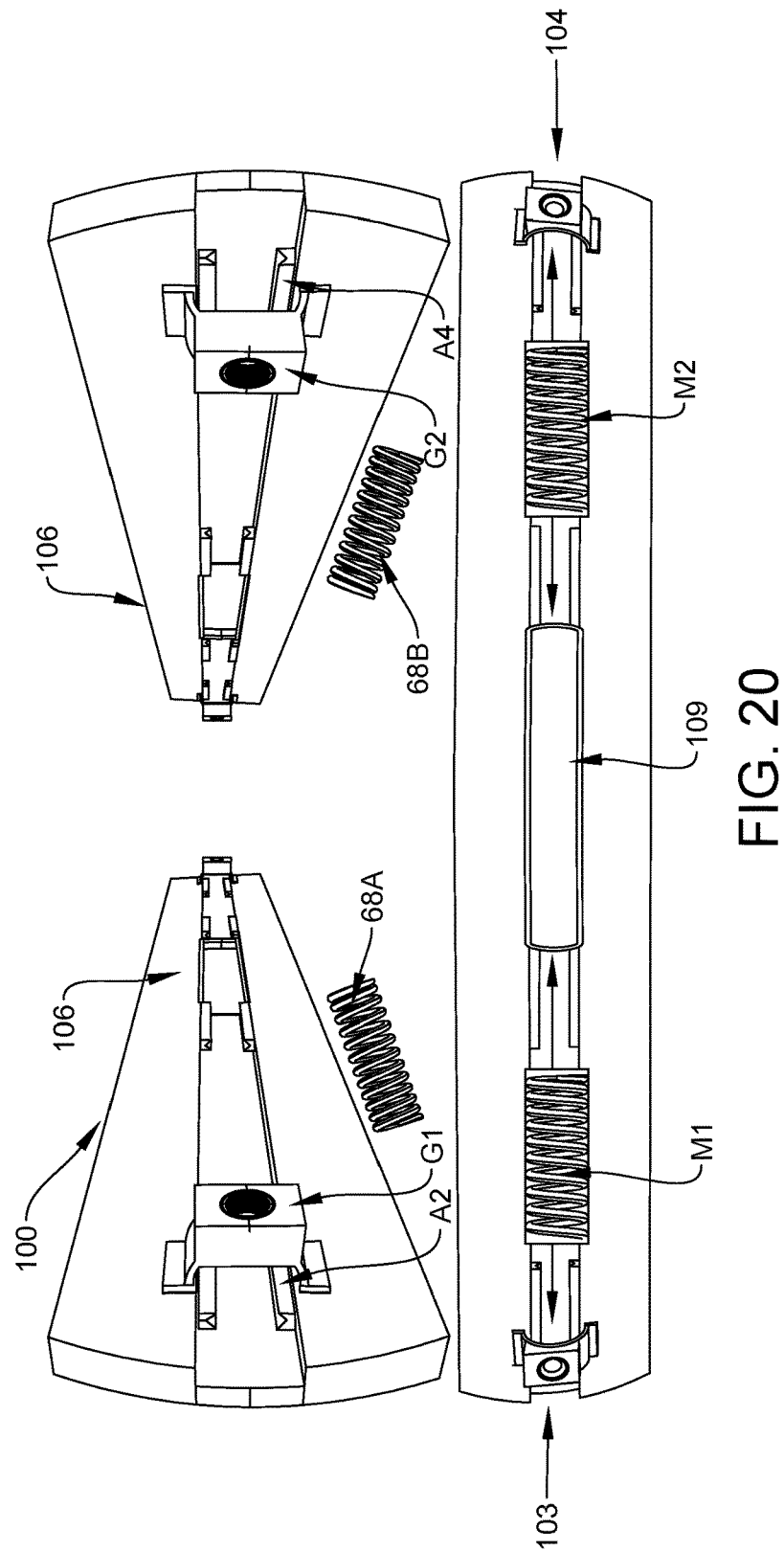

FIGS. 19 and 20, with reference to FIGS. 1A through 18, are exemplary views of a back side 106 of the front plate 100 from different angles, according to the embodiments herein. The back side 106 of the front plate 100 of the stem ejectable component assembly 1000 may include one or more receiving grooves in different directions, for instance, the stem ejectable component assembly 1000 may include a vertical receiving groove and a horizontal receiving groove. Referring to FIG. 19, the back side 106 of the stem ejectable component assembly 1000 comprises two receiving grooves M1, M2 extending along the back side 106 in horizontal direction where the first receiving groove M1 is positioned towards the left side 103, and penetrating through the surface edge of the middle opposite window 109 and connected to the first opening side 110A. The second receiving groove M2 extends in horizontal direction from the right side 104 and penetrating through the surface edge of the middle opposite window 109. Each of the receiving grooves M1, M2 may include a plurality of guiding tracks, having portions of tracks, such as, but not limited to, two pairs, and one pair of guiding tracks, where the first receiving groove M1 has a first guiding track A1 and the second guiding track A2 having similar arrangements so as to receive and allow the first slider pin 200 to slide along the guiding tracks A1, A2 to move forward and backward in the horizontal direction. Likewise, the second receiving groove M2 includes a third guiding track A3 and a fourth guiding track A4 having similar arrangements to receive and allow the second slider pin 300 to slide respectively along the third guiding track A3 and the fourth guiding track A4 to move forward and backward in horizontal direction.

The return spring 68A is inserted into the first receiving groove M1, where the return spring 68A is detent between the first pair of guiding tracks A1 and the second pair of guiding tracks A2 allowing the first slider pin 200 to fit through inner diameter of the first return spring 68A. Similarly, the return spring 68B detents between the third pair of guiding tracks A3 and the fourth pair of guiding tracks A4 of the second receiving groove M2, allowing the second slider pin 300 to fit through the second return spring 68B. The middle opposite window 109 includes a first opening side 110A and a second opening side 110B. The first opening side 110A is an opening edge adjacent to first pair of guiding tracks A1 aligned with the first receiving groove M1 positioned towards the left side 103. The second opening side 110B is an opening edge adjacent to the second pair of guiding tracks A2 aligned with the second receiving groove M2 positioned towards the right side 104.

The back side 106 of the front plate 100 incorporates two connector housings G1, G2 connected to the back side 106. The first connector housing G1 is positioned towards the left side 103 and includes an inner threaded aperture GS1 used to receive and to engage with the first connector pin 600A. The second connector housing G2 is positioned towards the right side 104 and includes an inner threaded aperture GS2 used to receive and to engage with the second connector pin 600B.

FIGS. 21 through 27, with reference to FIGS. 1A through 20, are exemplary views of the first slider pin 200 and the second slider pin 300 of the stem ejectable component assembly 1000, according to the embodiments herein. The first slider pin 200 and a second slider pin 300, are configured for fitting in the two receiving grooves M1, M2 respectively of the front plate 100. FIGS. 21 and 24 illustrate front side and back side view of the first slider pin 200 respectively. The first slider pin 200 includes main body 201, a front side 206, a substantially flat back side 207, a top side 208, a bottom side 209, a head 202 formed to abut and slide along the outer knurled and axially slidable body of the first pivot slider V1 of the stem 400 (further described below with respect to FIG. 40). FIG. 22 illustrates an enlarged view of the head 202.

The first slider pin 200 may further include two opposite pairs or portions of sliders 203, 204 formed on the main body 201. The first pair of sliders 203 are positioned at the top side 208 and the bottom side 209 adjacent to the head 202. The second pair of sliders 204 are positioned at the top side 208 and the bottom side 209 towards the round end 210. As such, the first slider pin 200 may include a round end 210. FIG. 23 is an enlarged view of the first profiled protrusion 211 positioned at the front side 206 over the main body 201 of the first slider pin 200. The first slider pin 200 may slide along the first pair of guiding tracks A1 and the second pair of guiding tracks A2 of the first receiving groove M1 at the back side 106 of the stem ejectable component assembly 1000 when pushed via the first profiled protrusion 211.

The first profiled protrusion 211 is positioned at the front side 206 and has a number of tapered levels of protrusions, for instance, a first protrusion level K1 that is lower than a second protrusion level K2, the first protrusion level K1 positioned below the second protrusion level K2 and the second protrusion level K2 positioned below a third protrusion level K3. After assembly, the first profiled protrusion 211 mates with the slidable ball 777A of the first ball pin 700A (refer to FIG. 11), and surface S1 of the back side of the third protrusion level K3 is used to push the first return spring 68A towards the left side 103.

Figure 39:
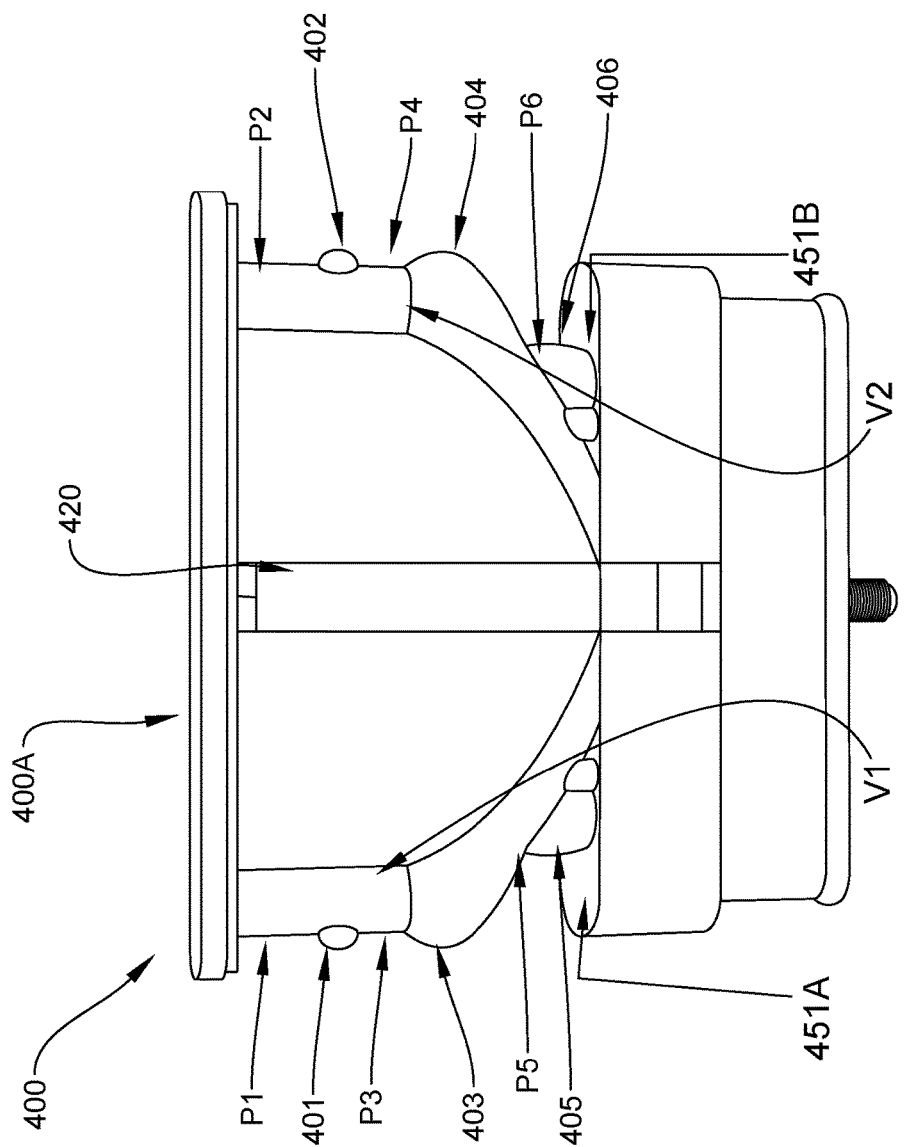

The second slider pin 300 shown in FIGS. 25 through 28, with reference to FIGS. 1A through 24, has similar profile and features as that of the first slider pin 200, and includes a main body 301, a front side 306, a substantially flat back side 307, a top side 308, a bottom side 309, and further includes a head 302 for abutting and for sliding along the outer knurled and the axially slidable body of the second pivot slider V2 of the stem 400 (of FIG. 39). FIG. 26 illustrates an isolated view of the head 302. The second slider pin 300 further includes first pair of sliders 303 positioned at the top side 308 and the bottom side 309, a second opposite pair of sliders 304 positioned at the top side 308 and the bottom side 309, and a round end 310. Similar to the first slider pin 200, the second slider pin 300 also includes a second profiled protrusion 311 having a number of tapered steps or protrusions having a first protrusion level R1 positioned below a second protrusion level R2, and the second protrusion level R2 positioned below a third protrusion level R3. The second profiled protrusion 311 mates with the slidable ball 777B of the ball pin 700B, and surface S2 on back side of the third protrusion level R3 is used to push the second return spring 68B towards the right side 104.

The second slider pin 300 is configured for sliding engagement with the second receiving groove M2 at the back side 106 of the front plate 100 through third pair of guiding tracks A3 and fourth pair of guiding tracks A4 of the second receiving groove M2. In an aspect, the first slider pin 200 and the second slider pin 300 may be identical to each other, or mirror configurations of each other.

Figure 31:
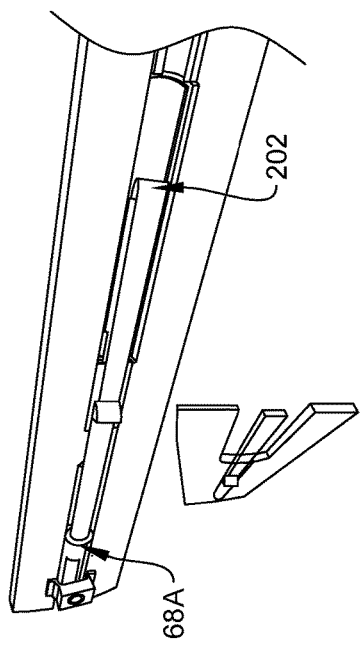

FIGS. 29 through 33, with reference to FIGS. 1A through 28, are exemplary views illustrating engagement of the first slider pin 200 with the first receiving groove M1, according to the embodiments herein. FIGS. 29 through 31, show engagement of the first slider pin 200 with the first receiving groove M1 along the first guiding track A1 and the second guiding track A2. The first slider pin 200 may be inserted in the first receiving groove M1 after aligning a first pair of sliders 203 of the first slider pin 200 in parallel with the middle opposite window 109, and with the first receiving groove M1. The round end 210 of the first slider pin 200 is kept away from inner edge of the first guiding track A1 and a return spring 66A is appropriately compressed and held in the first receiving groove M1 in alignment with the first slider pin 200.

Figure 32:
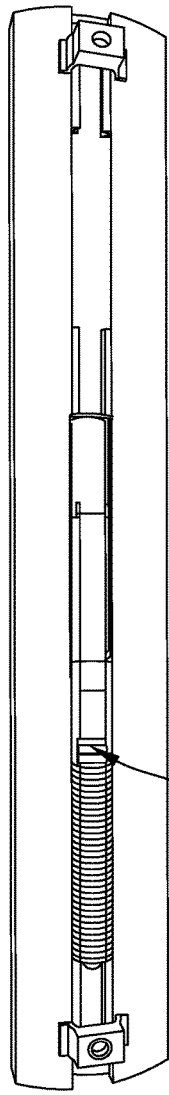
Figure 33:
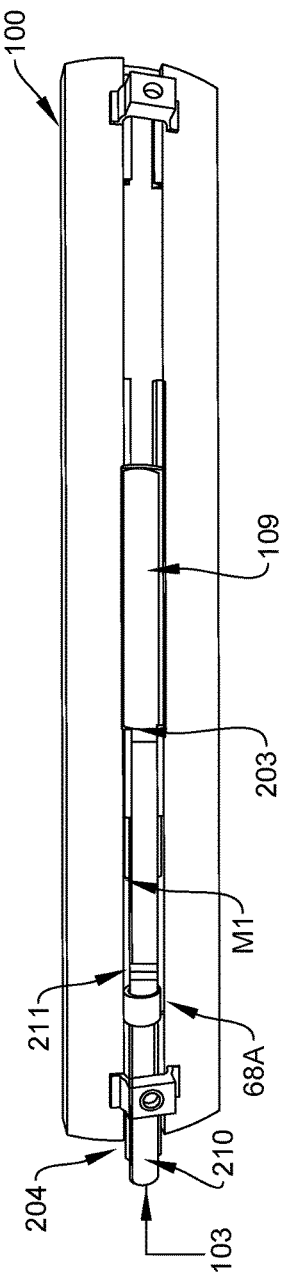

Thereafter, the first slider pin 200 is moved by pushing the head 202 such that the round end 210 of the first slider pin 200 enters the inner diameter of the first return spring 68A, and further pushing results in compression of the first return spring 68A towards the left side 103, as shown in FIG. 29. During this, the edge of the first pair of sliders 203 engages with the first pair of guiding tracks A1, and the second pair of sliders 204 engage with the second guiding track A2. Thus, both the sliders 203, 204 slide into the first and the second guiding tracks A1, A2, respectively. When the first return spring 68A is released from the compressed state, the inner end of the first return spring 68A may rest against the surface S1 of the third protrusion level K3 of the first profiled protrusion 211 thereby biasing the first slider pin 200 towards the middle opposite window 109, as shown in FIG. 32. Under this condition, pushing the head 202 or the first profiled protrusion 211 results in sliding of the first profiled protrusion 211 towards the left side 103 to bring the head 202 aligned with first opening side 110A of the middle opposite window 109, as shown in FIG. 33. Under such condition, the first return spring 68A is fully compressed and the second pair of sliders 204 projects out at the left side 103. This is the completely engaged position of the first slider pin 200 and the left side 103 is in a locked position.

Likewise, the second slider pin 300 engages with the second receiving groove M2 as shown in FIGS. 34 through 38, with reference to FIGS. 1A through 33, and for the sake of brevity, is not further described as it has a similar configuration as to the first slider pin 200 described above with respect to FIGS. 29 through 33. It would be appreciated that any of the two slider pins 200, 300 may be fitted first followed by other without making any difference and effecting satisfactory functioning of the disclosed stem ejectable component assembly 1000.

FIGS. 39 through 41, with reference to FIGS. 1A through 38, are exemplary views of a stem 400 insertable into a front window of the front part of the stem ejectable component assembly 1000, according to the embodiments herein. The stem 400 has three sections that are connected to each other, wherein the first section incorporates a hand gripping portion 400A, a first pivot slider V1, and a second pivot slider V2 on the opposite side, that connect the first section to other sections of the stem 400. The second section includes a main slider portion 450 connected to the first section, and the third section 460 has an axially slidable body 480 connected to the main slider portion 450 of the second section, as shown in FIG. 40.

Referring to FIG. 39, the stem 400 comprises a hand gripping portion 400A having a back side 400B and a groove 400C, as shown in FIG. 41. The groove 400C extends along the edge of the back side 400B and may be used to receive an elastic seal material, such as, but not limited to, elastomers, polymers and the likes to prevent water or dust from entering into the electronic device, including, but not limited to, smart phone, tablet, laptop, computer and the like. Referring to FIG. 40, the stem 400 includes a middle rod 420 extending from the back side 400B of the hand gripping portion 400A and connected to the main slider portion 450.

The first section of the stem 400 includes, on its two opposite sides, pivot sliders V1, V2 that engage with the first slider pin 200 and the second slider pin 300, respectively, and make the two slider pins 200, 300 slide simultaneously in opposite directions. Each of the pivot sliders V1, V2 has a number of knurled or protrusions or sleeves, where each pair of protrusions may have similar arrangements and protrusions/sleeves of each side may be configured as an axially slidable body. The first pivot slider V1 may include a first protrusion 401 having first diameter, a second protrusion 403 having a second diameter and height greater than the first protrusion 401, a third protrusion 405 having a third diameter smaller than the second protrusion 403. The protrusions of the first pivot slider V1 are used to mate and abut with the first slider pin 200. A second pivot slider V2 aligned with the first pivot slider V1 has a first opposite protrusion 402 having a similar diameter to the first protrusion 401, a second opposite protrusion 404 having a similar diameter and height to the second protrusion 403, a third opposite protrusion 406 having a similar diameter to the third protrusion 405 are used to mate and abut with the second slider pin 300. Due to the number of protrusions or sleeves portions on the axially slidable body on the first pivot slider V1 and the second pivot slider V2, a space between each protrusion is realized that is used to detent the first slider pin 200 and the second slider pin 300, that is to say, the distance between two protrusions is used to detent and to hold the head of each pin from sliding when the two heads 202, 302 of slider pins 200, 300 respectively are in stationary positions in which the first pivot slider V1 having the first space portion P1 positioned between the back side 400B of the hand gripping portion 400A and between the first protrusion 401.

The first space portion P1 and a first opposite space portion P2 may include a notch to receive and to latch with the first and the second head 202, 302 respectively of the slider pins 200, 300 respectively. A second space portion P3 may be positioned between the first protrusion 401 and the second protrusion 403, a third space portion P5 may be positioned between the second protrusion 403 and the first front side 451A of the main slider portion 450. The second pivot slider V2 may include the first opposite space portion P2 positioned between the back side 400B of the hand gripping portion 400A and the first opposite protrusion 402. A second opposite space portion P4 may be positioned between the first opposite protrusion 402 and the second opposite protrusion 404. A third opposite space portion P6 may be positioned between the second opposite protrusion 404 and the second front side 451B of the main slider portion 450.

FIGS. 42 through 47, with reference to FIGS. 1A through 41, are exemplary views of main slider portion of the stem 400, according to the embodiments herein. FIG. 42 illustrates the main slider portion 450 having an oval shape in a flipped position. The main slider portion 450 may include a first front side 451A, a second front side 451B, a top side 452, a left side 455, and a right side 456.

Referring to enlarged view in FIG. 46, the top side 452 incorporates a taper protrusion portion 466, having a taper shape, where front side of the taper protrusion portion 466 has a rectangular front positioned towards the front plate 100, having a back side that has a lower height than the rectangular front. The rectangular front of the taper protrusion portion 466 is positioned towards the inner back wall 501K to prevent the stem 400 from getting out of the main receiving housing 501. Referring to FIG. 43, the main slider portion 450 is shown in a turnover position, and the main slider portion 450 further includes a bottom side 453 and a back side 454, wherein the back side 454 appears as a partial portion extending around the main slider portion 450, and is used to mate and abut with front side of the two bumpers 599A, 599B (shown in FIG. 67) so as to limit displacement of the stem 400 upon being pushed towards the through hole 509. Furthermore, the third section 460, which may be oval-shaped and has a smaller cross-sectional size than that of the main slider portion 450, extends towards the through hole 509, and incorporates an axially slidable body 480 extending along the edge of the end of the third section 460. The axially slidable body 480 is adapted to mate and slide over the pair of inner bumpers 590A, 590B such that an additional pushing force is utilized during pushing of the stem 400.

With respect to FIG. 44, the front side 461 of the third section 460 includes a mounted rod 490 having an external threaded portion 492 of greater diameter than the shaft 491 of the mounted rod 490, wherein the external threaded portion 492 is positioned at the base of the mounted rod 490 near to the front side 461. The external threaded portion 492 is used to engage and retain the return spring 555P that fits over the shaft 491 of the mounted rod 490, as shown in FIG. 45. The return spring 555P comprises a wider diameter than the through hole 509 and the shaft 491 of the mounted rod 490. This allows the mounted rod 490 to pass through the through hole 509 but not the return spring 555P. Therefore, the return spring 555P is spaced between the front side 461 of the third section 460 and the inner back wall 501K of the middle receiving housing 501, and the return spring 555P is in compressed state thereby biasing the stem 400 away from the inner back wall 501K of the middle receiving housing 501.

FIGS. 48 through 58, with reference to FIGS. 1A through 47, are exemplary views showing engagement of connector pins 600A, 600B with connector housings G1, G2 of the main receiving housing 500, according to the embodiments herein. FIG. 48 shows a sectional illustration of the main receiving housing 500 with the middle receiving housing 501 configured therein. FIGS. 49 and 51 illustrate engagement of the first connector pin 600A and the second connector pin 600B with the first connecter housing G1 and the second connecter housing G2, respectively. The connector pins 600A, 600B engage the connector housings G1, G2, respectively, through inner threaded aperture GS1, as shown in FIG. 50, and inner threaded aperture GS2, as shown in FIG. 52.

Figure 56:
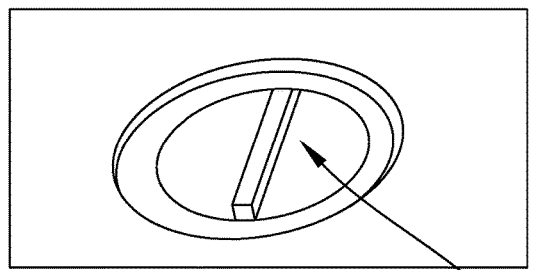
Figure 55:
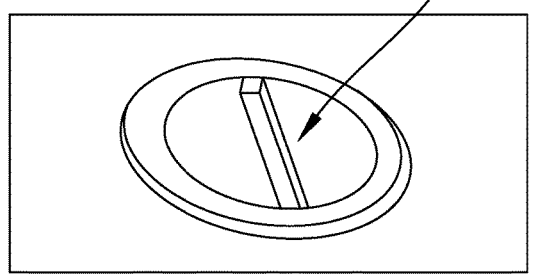
Figure 57:
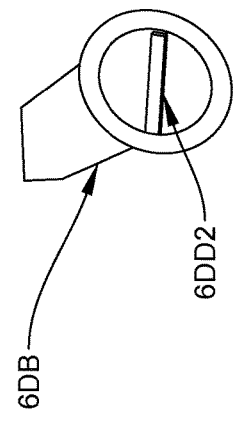

When the first connector pin 600A is inserted from the back side 506 of the main receiving housing 500 through the first long through hole 520A, the threaded end of the first connector pin 600A may project out at the front side 510, and may be inserted into the inner threaded aperture GS1 of the first connector housing G1 with the first return spring 60A positioned over the first connector pin 600A. The first connector pin 600A may be tightened from the back side 506 via a notch 6DA 1 on the bottom of the first connector pin 600A, as illustrated in FIG. 55. Similarly, the second connector pin 600B may be fitted into the second connecter housing G2, with the second return spring 60B positioned as shown in FIGS. 51 through 53. The second connector pin 600B may be tightened from the back side 506 via a notch 6DB2 on the bottom of the second connector pin 600B, as illustrated in FIG. 56.

When the two connector pins 600A, 600B are tightened, the two return springs 60A, 60B get compressed to bias the front plate 100 towards a front direction guided by the two connectors pins 600A, 600B that may slide in the long through holes 520A, 520B. Furthermore, displacement of each of the connector pins 600A, 600B towards the front is limited by the bottom surfaces 521A, 521B of the housing holes 522A, 522B, where wider inner annular surfaces 6DA, 6DB of heads of the respective connectors pins 600A, 600B would rest to prevent further displacement. In this situation, the surfaces 6DD1, 6DD2 of each of the connector pins 600A, 600B shall be in level with; i.e., flush with the surface of the back side 506 of the main receiving housing 500. In other words, travel of the front plate 100 relative to the main receiving housing 500 is in front direction is limited by a first position when the wider inner annular surfaces 6DA, 6DB of the heads of the respective connector pins 600A, 600B abut the respective bottoms surfaces 521A, 521B of the housing holes 522A, 522B. In an aspect, the first position corresponds to locked position of the ejectable components. On the other hand, the front plate 100 may be pushed towards the main receiving housing 500 against the biasing force of the return springs 60A, 60B to take a second position. When the front plate 100 moves towards the main receiving housing 500, the two connector housings G1, G2 may move into the two receiving housings 588A, 588B of the main receiving housing 500 as shown in FIGS. 53 and 54. Simultaneously, the surfaces 6DD1, 6DD2 of each of the connector pins 600A, 600B project out of the surface of the back side 506 of the main receiving housing 500.

Figure 58:
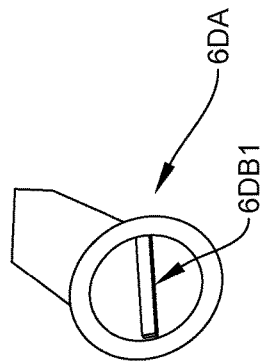

FIGS. 59 through 73, with reference to FIGS. 1A through 58, are exemplary views illustrating engagement of the stem 400 with the main receiving housing 500, according to the embodiments herein. FIG. 59 illustrates a sectional view of the main receiving housing 500 along with the middle receiving housing 501 showing complete engagement of the stem 400 with the middle receiving housing 501.

In an aspect, when the profiled protrusions 211, 311 of the slider pins 200, 300 are pushed to slide towards the left side 103 and right side 104, respectively, the heads 202, 302 of the slider pins 200, 300 align with the first opening side 110A and the second opening side 110B (also shown in FIG. 19), respectively, of the middle opposite window 109, as shown in FIG. 38 and FIG. 60. This provides a clear passage for the third section 460 of the stem 400 for entry into the front window 108 and for it to take a position within the middle receiving housing 501, as shown in FIG. 61, when pushed in by a user.

Figure 108:
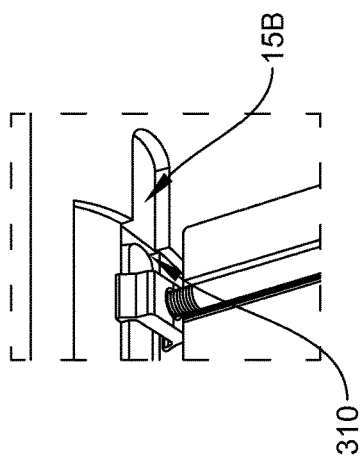

In an aspect, when the stem 400 is assembled in the middle receiving housing 501 of the main receiving housing 500, the left side 455 and the right side 456 of the main slider portion 450 may mate and respectively slide along the first and the second guiding tracks 5AA, 5BB of the middle receiving housing 501, as shown in FIG. 18 and FIG. 61, until the taper protrusion portion 466 slides under the front partial portion 510A (of FIGS. 2A through 2D) and is available inside the middle receiving window 501, as shown in FIG. 62, and in the enlarged view in FIG. 63. Thereafter, heads 202, 302 of the first and the second slider pins 200, 300 respectively align with the third space portion P5 of the first pivot slider V1 and the third opposite space portion P6 of the second pivot slider V2 respectively, as shown in FIG. 64. At this instance, the profiled protrusions 211, 311 may be released to allow the return springs 68A, 68B to push back the first and the second slider pins 200, 300 to slide inwards; i.e., towards each other, causing the first head 202 and the second head 302 of the first slider pin 200 and the second slider pin 300 to abut with the pivot sliders V1, V2, and detent at the third space portion P5 and third opposite space portion P6, respectively, as shown in FIG. 64. When the heads 202, 302 detent as explained above, the ends 210, 310 of the slider pins 200, 300 shall be positioned away from their respective recesses 15A, 15B, as shown in FIGS. 107 and 108. Under this condition, the stem ejectable component assembly 1000 is completely unlocked, as shown in FIGS. 104 and 105, and is ready to slide out. The engagement among the ejectable component assembly 1000 with the supporting frame 1001 is described in further detail below.

Figure 101:
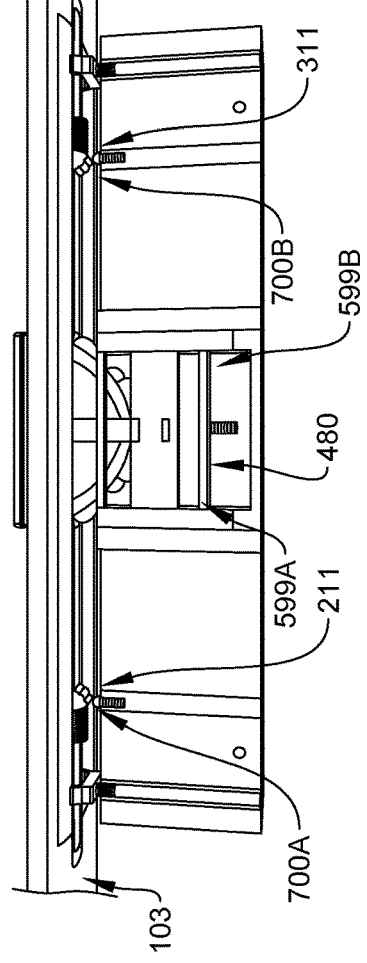

When the stem ejectable component assembly 1000 is out of the support frame 1001 of an electronic device such as a mobile phone, a tablet, a PDA, a laptop, a computer and the like, the stem 400 projects out, as shown in FIG. 115. For inserting the stem ejectable component assembly 1000 within the support frame 1001, the stem 400 is to be pushed back completely. When the user pushes the hand gripping portion 400A of the stem 400, the back lower diameters of the protrusions 403, 404 of the pivot sliders V1, V2 respectively push the heads 202, 302 of the slider pins 200, 300 towards the left side 103 and right side 104 respectively. This causes the ends 210, 310 of the slider pins 200, 300 to get inserted into respective recesses 15A, 15B, as shown in FIGS. 65, 101, 102, and 103, resulting in the stem ejectable component assembly 1000 getting securely locked within the support frame 1001. Simultaneously, the front of the axially slidable body 480 mates and abuts with the back of the bumpers 599A, 599B, as shown in FIG. 65, requiring the user to push the stem 400 with sufficient force to make the heads 202, 302 of the slider pins 200, 300 ride over the second protrusion 403 and the second opposite protrusion 404, respectively. When the two heads 202, 302 ride over the highest points of the second protrusion 403 and the second opposite protrusion 404, the first and second return springs 68A, 68B get fully compressed as shown in FIG. 66, and the ends 210, 310 of the slider pins 200, 300 are in their maximum inserted condition inside the respective recesses 15A, 15B, as shown in FIG. 101.

Simultaneously, the front of the axially slidable body 480 may pass through or remain stationary between the bumpers 599A, 599B, as shown in FIG. 66. While the user is pushing the stem 400, the axially slidable body 480 may completely pass through the bumpers 599A, 599B, and the return springs 68A, 68B may force back the first and the second slider pins 200, 300 to abut and slide along the second space portion P3 and the second opposite space portion P4. The slider pins 200, 300 may abut with edge of the front side of the second protrusion 403 and the second opposite protrusion 404, as shown in FIG. 67. The axially slidable body 480 may continue to move towards the back wall 510K and the two heads 202, 302 may abut and slide along the first protrusion 401 and the first opposite protrusion 402, as shown in FIG. 68. The first protrusion 401 and the first opposite protrusion 402 pass between the first head 202 and the second head 302, and they may force the first slider pin 200 to slide towards the left side 103 and may force the second slider pin 300 to slide towards the right side 104. The state of the stem ejectable component assembly 1000 is still closed and secured as shown in FIG. 68.

After the first protrusion 401 and the first opposite protrusion 402 have crossed the two heads 202, 302, the front of the mounted rod 490 may fit inside the through hole 509, and the return spring 555P may abut with the back wall 510K and may be slightly compressed, as shown in FIG. 69. The biasing force of the return springs 68A, 68B shall keep the two slider pins 200, 300 against the first space portion P1 and the first opposite portion P2 respectively. The mounted rod 490 may fully enter the through hole 509, and project out from the back side 506 of the main receiving housing 500. Under this condition, the return spring 555P gets fully compressed between the back wall 510K of the middle receiving housing 501, and the front side 461 of the third section 460, as shown in enlarged view in FIG. 70.

The back side of the bumpers 599A, 599B may mate with the back side 454 of the main slider portion 450, as shown in enlarged view in FIG. 71. The slider pins 200, 300 may detent at the first space portion P1 and the first opposite space portion P2 respectively, due to higher force of the return springs 68A, 68B, than the force of the return spring 555P. The two heads 202, 302 may hold the stem 400, as shown in FIG. 72 such that the stem 400 is completely engaged while the ends 210, 310 are still inside recesses 15A, 15B, respectively, such that the stem ejectable component assembly 1000 is completely closed and secured, as shown in FIG. 59 and FIG. 74. The front side 105 of the front plate 100 is aligned with the hand gripping portion 400A of the stem 400, as shown in FIG. 116; that is to say, while the user is pushing the stem 400, each protrusion of the first pivot slider V1 and the second pivot slider V2 of the stem 400 may abut and push the heads 202, 302 of the slider pins 200, 300 respectively, and each space portion of the first pivot slider V1 and the second pivot slider V2 may slide along the heads 202, 302.

Further, when the stem 400 is pulled out or pushed in, the two heads 202, 302 of the slider pins 200, 300, respectively, may slide over the first protrusion 401, the first opposite protrusion 402, the second protrusion 403, and the second opposite protrusion 404 making the slider pins 200, 300 move in opposite directions towards the left side 103 and the right side 104, respectively. This will keep the ends 210, 310 within the respective recesses 15A, 15B, keeping the stem ejectable component assembly 1000 closed and secured. However, when the two heads 202, 302 detent at the third space portion P5 and third opposite space portion P6, respectively, the two ends 210, 310 withdraw from respective recesses 15A, 15B unlocking the stem ejectable component assembly 1000.

FIGS. 74 through 82, with reference to FIGS. 1A through 73, are exemplary views illustrating relationship of the mounted ball pins 700A, 700B and the profiled protrusions of the slider pins 200, 300, according to the embodiments herein. FIG. 74 illustrates the relationship among a first ball pin 700A and the first profiled protrusion 211 of the first slider pin 200. The corrugated or profiled protrusions 211, 311 are slidable protruding parts of the first slider pin 200 and the second slider pin 300 respectively; and the heads of the ball pins 700A, 700B are configured to slide over the profiled protrusions 211, 311. The slider pins 200, 300 are configured to slide by engagement of the respective pairs of sliders 203, 204, 303, 304 with the corresponding guiding tracks A1, A2, A3, A4 as described above. When a user pushes the front plate 100 towards inner direction, the ball pins 700A, 700B mate and force the third protrusion levels K3, R3, as shown in FIGS. 75 and 79, to make the respective slider pins 200, 300 slide to an outward side; i.e., towards surfaces S1, S2 respectively. Further, pushing the front plate 100 will result in the ball pins 700A, 700B forcing the second protrusion levels K2, R2, as shown in FIGS. 76 and 80, to make the respective slider pins 200, 300 slide in the outward direction further. Still further pushing of the front plate 100 makes the ball pins 700A, 700B force the first protrusion level K1, R1, as shown in FIGS. 77 and 81 to continue sliding the slider pins 200, 300 in the outward direction; i.e., towards the surfaces S1, S2, respectively, as shown in FIGS. 78 and 82. Force applied by a user on the front plate 100 causes the slider pins 200, 300 to overcome biasing forces offered by the return springs 68A, 68B that rest against surfaces S1, S2. The return springs 68A, 68B become compressed to allow the slider pins 200, 300 to move. However, when the user withdraws the force, the return springs 68A, 68B push the surfaces S1, S2 to make the slider pins 200, 300 move inwards and return to their original positions.

FIGS. 83 through 87, with reference to FIGS. 1A through 82, are exemplary views of the support frame 1001 that supports the stem ejectable component assembly 1000, according to the embodiments herein. The support frame 1001 may be part of an electronic device such as a mobile phone, a tablet, a laptop, a computer, a PDA and the like to support the entire stem ejectable component assembly 1000. The two ends 210, 310 of the first and the second slider pins 200, 300 respectively engage with the two respective recesses 15A, 15B in the support frame 1001 to retain the stem ejectable component assembly 1000 within the support frame 1001. Even though the return springs 60A, 60B force the slider pins inwards, other ends of the two slider pins 200, 300 abut stem 400 to prevent their inward movement. Simultaneously, the return springs 60A, 60B acting through the profiled protrusions 211, 311 and the corresponding ball pins 700A, 700B keep the main receiving housing 500 with all its associated elements towards the support frame 1001 to keep the entire stem ejectable component assembly 1000 tightly locked.

Referring to FIG. 83, the support frame 1001 comprises a front side 10, a back side 11, and a front window 12, as shown in FIG. 84, formed by recessing and penetrating through the front side 10 and extending in a direction through the back side 11, where the front window 12 is configured to receive and to allow the entire stem ejectable component assembly 1000 to fit in.

As described above, the back side 11 includes receiving recesses 15A, 15B that are oriented along a length of the front window 12, and are identical or mirror configurations of each other. The receiving recesses 15A, 15B include protruding ribs 16A, 16B as shown in FIG. 86 and FIG. 87. The ribs 16A, 16B reduce friction between contact surfaces of the round ends 210, 310 of the slider pins 200, 300 and respective recesses 15A, 15B when the slider pins 200, 300 slide in and out. The ribs 16A, 16B also help to adjust the height of the receiving recesses 15A, 15B so that when the front plate 100 is received in the front window 12 of the support frame 1001, the front side 105 of the front plate 100 is level with the front side 10 of the support frame 1001.

Referring to FIG. 84, the inner edge of the front window 12 includes a receiving groove 13 that extends around the periphery of the front window 12. The receiving groove 13 is positioned between surfaces of the front side 10 and the back side 11 towards an outward direction, as shown in FIG. 84 and FIG. 85, to accommodate an elastic seal to prevent water or dust from entering the electronic device.

Figure 88:
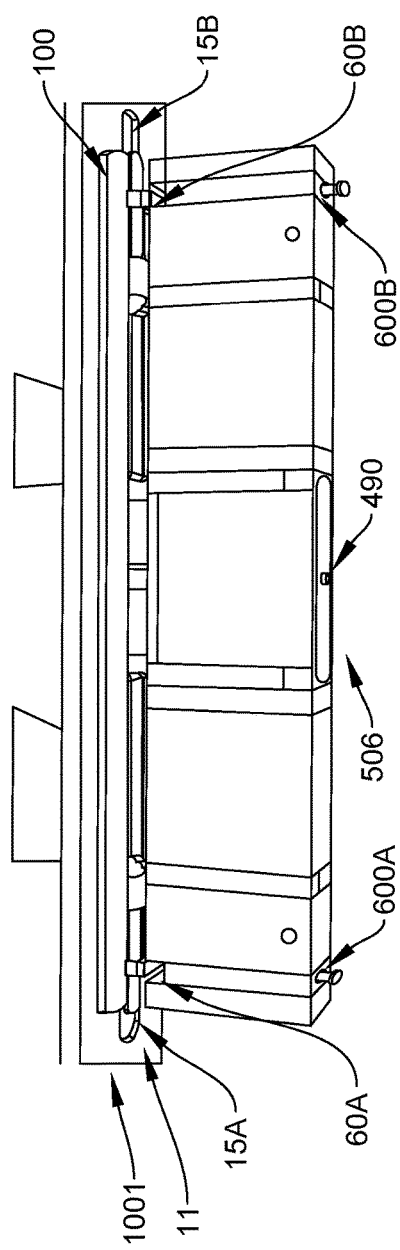
Figure 89:
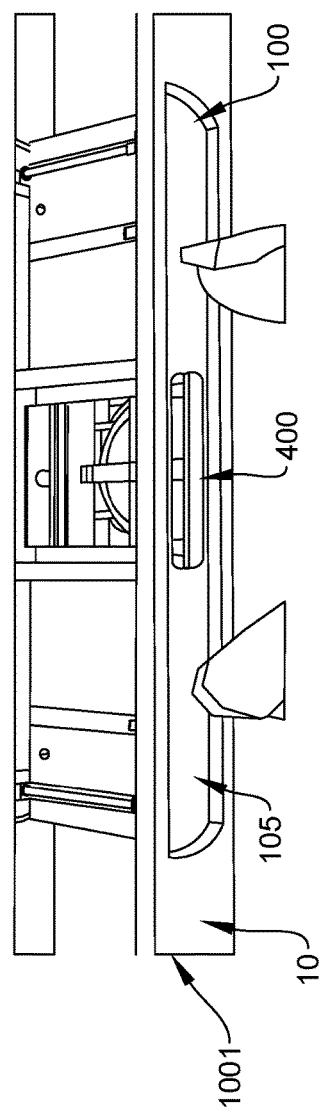

FIGS. 88 through 92, with reference to FIGS. 1A through 87, are exemplary views of the main receiving housing 500 and middle receiving housing 501 that receives the stem 400, according to the embodiments herein. FIG. 88 and FIG. 89 illustrate sectional views of the main receiving housing 500 and the middle receiving housing 501 along with the support frame 1001, showing an exposed stem 400, where the head 202 of the first slider pin 200 and the head 302 of the second slider pin 300 are resting against the first space portion P1 of the first pivot slider V1 and the first opposite space portion P2 of the second pivot slider V2 of the stem 400 (refer to FIG. 72) such that if the user mistakenly pushes the front side 105 of the front plate 100 towards an inner direction with low force, as shown in FIG. 88 and FIG. 89, the entire front plate 100 with all its associated elements slides towards the inner direction with the heads 202, 302 of the slider pins 200, 300 respectively sliding along the first space portion P1 and the first opposite space portion P2 (refer to FIG. 69).

As a result of the inward movement of the front plate 100, the first connector pin 600A and the second connector pin 600B are also pushed towards the inner direction simultaneously compressing the first return spring 60A and the second return spring 60B (refer to FIG. 16 and FIG. 17), and slightly exposing the connector pins 600A, 600B towards the back side 506, as shown in FIG. 88. This may also result in the ends 210, 310 of the two sliders pins 200, 300 being pushed slightly inwards but still remaining engaged with the respective recesses 15A, 15B, as shown in FIG. 91 and FIG. 92. Simultaneously, and respectively, the two ball pins 700A, 700B that are in engagement with the third protrusion levels K3, R3 respectively do not slide to the second protrusion levels K2, R2 of the respective profiled protrusions 211, 311 on account of the low force being applied by the user (refer to FIGS. 75 and 79). Thus, the two heads 202, 302 of the two slider pins 200, 300 are unable to cross the first protrusion 401 and the first opposite protrusion 402 due to the low force applied by the user, and also because the return spring 555P has a lower force than the two return springs 68A, 68B. During such movement of the front plate 100, the first space portion P1 of the first pivot slider V1 and the first opposite space portion P2 of the second pivot slider V2 of the stem 400 will not get exposed out of the front plate 100 towards the user, as shown in FIG. 89. At this instance, the stem ejectable component assembly 1000 is still locked via the ends 210, 310 of the slider pins 200, 300 respectively, and when the user releases the front plate 100, the return springs 60A, 60B may push the front plate 100 back to its original position along with all associated elements. The front side 105 of the front plate 100 may be planar with the front side 10 of the support frame 1001 and aligned with the stem 400, as shown in FIG. 90. Accordingly, when the user pushes the front plate 100, the entire front plate 100 along with all its associated elements may travel a distance until the heads 202, 302 of the slider pins it reaches the first protrusion 401 and the first opposite protrusion 402, but they do not cross them.

Thus, while the user pushes the front plate 100 with a low force, the third protrusion levels K3, R3 of the profiled protrusions 211, 311 do not experience sufficient force from the ball pins 700A, 700B respectively to make the slider pins 200, 300 move. This may happen when a user mistakenly or unintentionally pushes the front plate 100.

Figure 99:
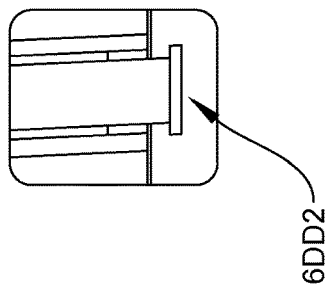
Figure 98:
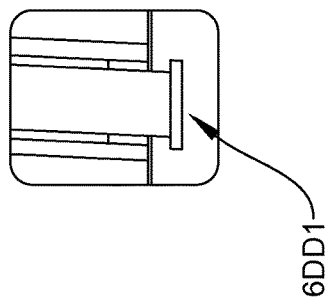

FIGS. 93 through 99, with reference to FIGS. 1A through 92, are exemplary views illustrating pulling out of stem 400 from the main receiving housing 500, according to the embodiments herein. FIG. 93 and FIG. 94 illustrate sectional views of the main receiving housing 500 along with the middle receiving housing 501, showing the stem 400 pulled out of the main receiving housing 500. When a user intentionally wants to completely slide out the stem 400, he/she has to either sequentially or at once push the front plate 100 with sufficient force for the stem 400 to project out sufficiently, and grab the stem 400 to slide it in an outward direction. Intentional pushing of the front plate 100 in an inward direction with adequate force causes the connector housings G1, G2 (of FIGS. 49 and 51) to fit into the respective receiving housings 588A 588B, making the front plate 100 to take a fully pushed-in position, as shown in FIG. 93. At the same instance, the surfaces 6DD1, 6DD2 of the connector pins 600A, 600B slide in a backward direction projecting out of the back side 506 of the main receiving housing 500 as shown in FIG. 98 and FIG. 99. The first return spring 60A and the second return spring 60B get fully compressed and the entire front plate 100 along with its associated elements fully in position, as shown in FIG. 93. In this situation, the ends 210, 310 of the slider pins 200, 300 respectively would still be engaging with respective recesses 15A, 15B, as shown in FIG. 95 and FIG. 96. At the same instance, engagement of the ball pins 700A, 700B shall shift from the third protrusion levels K3, R3 of the profiled protrusions 211, 311 to the second protrusion levels K2, R2 (refer to FIGS. 75, 76, 79, and 80), and further to the first protrusion levels K1, R1 (refer to FIGS. 77 and 81) to make the slider pins 200, 300 slide further in an outward direction; i.e., towards the left side 103 and right side 104, further compressing the respective return springs 68A, 68B and further increasing the engagement of the ends 210, 310 of the slider pins 200, 300 respectively with respective recesses 15A, 15B.

Figure 97:
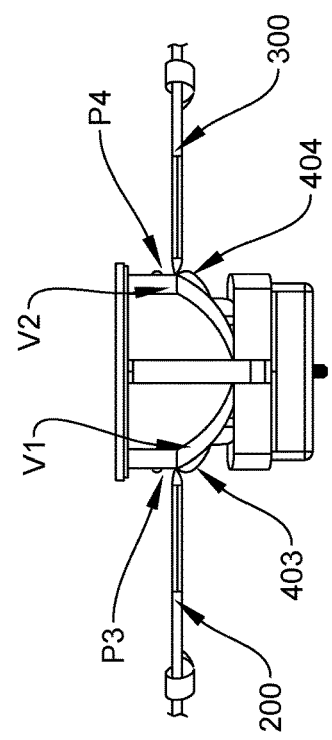

When the front plate 100 is fully pushed in as described above, the heads 202, 302 of the slider pins 200, 300 may move away from the first pivot slider V1 and the second pivot slider V2 of the stem 400 respectively, and may remain away and stationary as long as the user keeps the front plate 100 in fully pushed in condition, as shown in FIG. 97. This allows the return spring 555P to force the stem 400 to slide towards the user. When the stem 400 slides out, its movement is limited by the front side of the wider diameter of the second protrusion 403 and the second opposite protrusion 404 that will engage with the heads 202, 302 of the slider pins 200, 300 on the respective side limiting outward movement of the stem 400. Simultaneously, the back side of the axially slidable body 480 mates with the front side of the inner pairs of bumpers 599A, 599B (refer to FIG. 67), which coupled with the low force of the return spring 555P and the large and wider diameter size of the second protrusion 403 and the second opposite protrusion 404, prevents further movement of the stem 400 towards front. However, in this condition, the front section of the stem 400 is exposed, out of the front plate 100, along with first protrusion 401 and the first opposite protrusion 402, as shown in FIG. 94. While the stem 400 is in stationary state, the two heads 202, 302 of the slider pins 200, 300 are positioned aligned with second space portion P3 and the second opposite space portion P4, as shown in FIG. 67.

Figure 100:
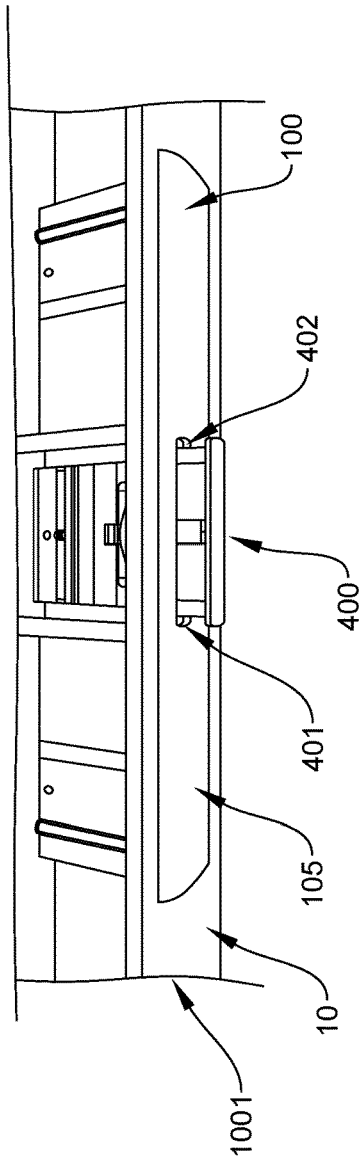
FIGS. 100 through 103 are exemplary views illustrating the stem projecting out of the front plate of the stem ejectable component assembly, according to the embodiments herein.

FIGS. 100 through 103, with reference to FIGS. 1A through 99, are exemplary views of the stem 400 being exposed from the front plate 100 of the stem ejectable component assembly 1000, according to the embodiments herein. FIG. 100 illustrates a condition just before the user removes force applied on the front plate 100 after having pushed the front plate 100 to an extreme inward position in the manner described above, and further shows a part of the first section of the stem 400 being mounted towards the user. In this condition, the first protrusion 401 and the first opposite protrusion 402 of the stem 400 are exposed to the user, and the ball pins 700A, 700B are still holding the first and the second slider pins 200, 300 via the respective first protrusion levels K1, R1 of the first and the second profiled protrusions 211, 311 (refer to FIGS. 78, 82, and 93) that keeps the heads 202, 302 away from the stem 400 (refer to FIG. 97). When the force is released, the return springs 60A, 60B force the entire front plate 100 with all its associated parts to retract back to its original position, as shown in FIG. 101. Simultaneously, the axially slidable head of the ball pins 700A, 700B may be positioned away from the respective annular profiled protrusions 211, 311, as shown in FIG. 101. This allows the respective return springs 68A, 68B force the two slider pins 200, 300 through the respective resting surfaces S1, S2, to slide in an inward direction and abut with the pivot sliders V1, V2 respectively of the stem 400, wherein the first head 202 detents at the second space portion P3 and abuts with the second protrusion 403, the second head 302 detents at the second opposite space portion P4 and abut with the second opposite protrusion 404 (refer to FIG. 67). Thus, the two heads 202, 302 hold the stem 400 at the second space portion P3 and at the second opposite space portion P4. This results in the front section of the stem 400 to be exposed out of the front plate 100 even when the front plate has returned back to its original position after the user has withdrawn the force.

Figure 102:
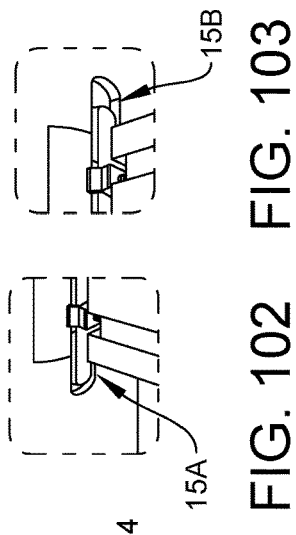

Thus, the provided configuration of the front plate 100 along with the associated parts and the stem 400 enable the front section of the stem 400 to remain exposed with enough space for the user to grab the hand gripping portion 400A, as shown in FIG. 100, after the front plate 100 has been pushed-in intentionally with adequate force and thereafter released. In another aspect, in this situation, the stem 400 is not only exposed but also cannot return back inside and remains stationary being held by the heads 202, 302 on account of higher force of the return springs 68A, 68B that acts on the first and the second heads 202, 302. At the same time, low force of the return spring 555P cannot make the stem 400 to completely slide out. Thus, the stem 400 remains stationary. At this instance, the stem ejectable component assembly 1000 is still locked due to the ends 210, 310 of the slider pins 200, 300 are still in engagement with the receiving recesses 15A, 15B respectively of the support frame 1001, as shown in FIGS. 102 and 103.

After the front plate 100 is back to its original position, it may be aligned with the front side 10 of the support frame 1001, as shown in FIG. 100, while the heads 202, 302 hold the stem 400 by abutting with the second protrusion 403 and the second opposite protrusion 404 respectively (refer to FIG. 67). At the same time, the front side of the inner pair of bumpers 599A, 599B may mate with the back side of the axially slidable body 480 of the oval-shaped third section 460 (refer to FIG. 67). At this instance, the user has to decide if he/she wants to completely to slide out the stem 400.

Figure 103:
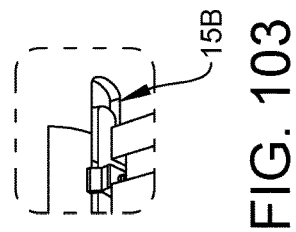

FIGS. 104 through 110, with reference to FIGS. 1A through 103, are exemplary views illustrating a complete ejection of the stem 400 from the main receiving housing 500, according to the embodiments herein. If the user decides to completely slide out of the stem ejectable component assembly 1000, he/she may grab the hand gripping portion 400A and pull out the stem 400, as shown in FIG. 104. As the user pulls out the stem 400 by gripping the hand gripping portion 400A, the edge of the front smaller diameters of the second protrusion 403 of the first pivot slider V1 and the second opposite protrusion 404 of the second pivot slider V2 respectively abut and gradually slide to push the heads 202, 302 towards left and right sides 103, 104 respectively (refer to FIG. 67). Simultaneously, the back side of the axially slidable body 480 may mate and abut the front side of the bumpers 599A, 599B (refer to FIG. 67), and the user may pull out the stem 400 with a higher force to allow the wider diameter of the second protrusion 403 and the second opposite protrusion 404 to pass between the heads 202, 302 and allow the axially slidable body 480 to overcome resistance offered by the bumpers 599A, 599B and pass through them. During this process, as the two heads 202, 302 pass the highest point of the wider diameter of the second protrusion 403 and the second opposite protrusion 404 respectively, the return springs 68A, 68B become fully compressed (refer to FIG. 66). After the two heads 202, 302 have passed the second protrusion 403 and the second opposite protrusion 404 respectively, the head 202 may detent between the third space portion P5 and the first front side 451A of the main slider portion 450, and the head 302 may detent between the third opposite space portion P6 and the second front side 451B of the main slider portion 450 (refer to FIG. 64). At the same time, the taper protrusion portion 466 may mate with the back side 510B of the front partial portion 510A, as shown in FIGS. 63 and 106, to limit/restrict movement of the stem 400 and prevent it from completely sliding out. Also, the first and second front sides 451A, 451B respectively may prevent the stem 400 from getting out of the middle receiving housing 501. At the same time, as a result of the heads 202, 302 resting at the third space portion P5 and third opposite space portion P6, respectively, the ends 210, 310 may completely slide out of the receiving recesses 15A, 15B, as shown in FIGS. 105, 107, and 108, thereby unlocking the entire stem ejectable component assembly 1000 for the user to withdraw it out of the support frame 1001 as shown in FIG. 106.

Figure 110:
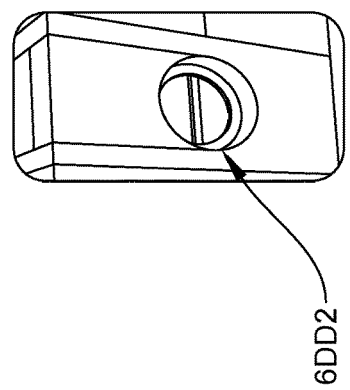
Figure 109:
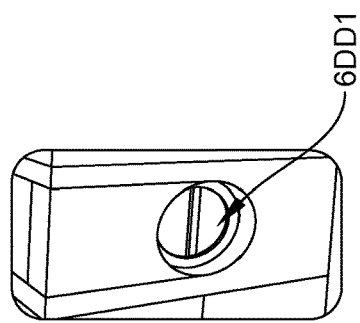

FIGS. 111 through 116, with reference to FIGS. 1A through 110, are exemplary views illustrating engagement of the stem ejectable component assembly 1000 with the front window 12 of the support frame 1001, according to the embodiments herein. FIG. 111 illustrates the entire stem ejectable component assembly 1000 along with the stem 400 (shown in FIG. 112) fitted within the front window 12 of the support frame 1001. In order to push back the entire stem ejectable component assembly 1000 into the front window 12, the back side 506 of the main receiving housing 500 is first to mate with the front window 12 and become inserted therein, as shown in FIG. 113. Upon being inserted, the back side 506 of the main receiving housing 500 slides along the front window 12 in an inward direction until the back side 106 of the front plate 100 mates the outer and the middle edges of the front window 12.

The top side 101, the bottom side 102, the left side 103, and the right side 104 of the front plate 100 engage with and fit into the front window 12, as shown in FIG. 114. The front side 10 of the support frame 1001 is level with the front side 105 of the front plate 100, as shown in FIG. 115. However, the stem 400 remains projecting out, towards the user, as shown in FIG. 115, until the entire stem ejectable component assembly 1000 is inserted and is completely engaged with the front window 12 of the support frame 1001. Thereafter, the user may push the stem 400 to engage and lock the stem ejectable component assembly 1000 with the support frame 1001, wherein pushing the stem 400 causes the ends 210, 310 to get inserted into their respective recesses 15A, 15B of the support frame 1001 (refer to FIGS. 102 and 103). Upon the stem 400 being pushed in, the front plate 100, the front side 10 of the support frame 1001, and the stem 400 may be aligned as shown in FIG. 116, which means the entire stem ejectable component assembly 1000 is completely inside within the support frame 1001 and locked securely.

FIGS. 117 through 122, with reference to FIGS. 1A through 116, are exemplary views of a tray holder 800 to receive a SIM tray 900 (of FIG. 1C) or a MMC tray, according to the embodiments herein. FIG. 117 illustrates the tray holder 800 that may receive a SIM tray 900 or a MMC tray 1200 that hold one or more of SIM cards and MMC cards. The tray holder 800 comprises a front side 801, a back side 804, a left side 803, a right side 802, having a top side AT, and an opposite side BT. The tray holder 800 includes a middle window 813 that is bounded by the four sides 801, 802, 803, and 804, and penetrating through the top side AT in the direction and through the opposite side BT, as shown in FIG. 117. The window may be configured to receive the SIM tray 900 or the MMC tray 1200 that hold one or more SIM cards and MMC cards. In an aspect, the front side 801 is connected to the right side 802 and the left side 803, and the back side 804 is connected to the left side 803 and the right side 802. The back side 804 may have a height that is lower than height of the left side 803 and the right side 802.

The front side 801 includes a top face 801A and an opposite face 801B, having two similar through holes 809. The through holes 809 penetrate the top face 801A in the direction and through the opposite face 801B. The through holes 809 are adapted to receive two pins 111 to connect the tray holder 800 with the main receiving housing 500 of the stem ejectable component assembly 1000.

Figure 149A:
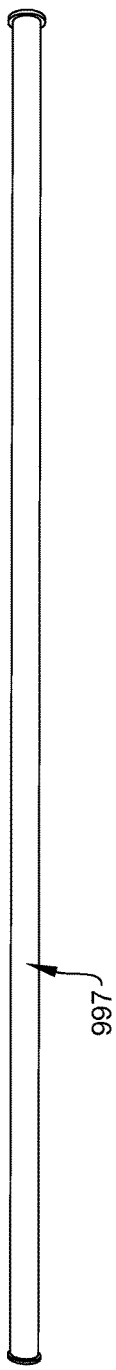
FIGS. 149A through 150E are exemplary views of a configuration of a rod with the SIM tray, according to the embodiments herein.
Figure 149C:
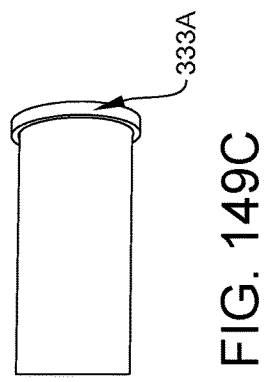
Figure 149B:
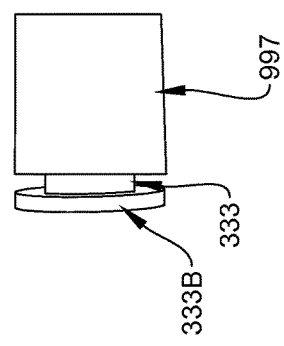
Figure 150B:
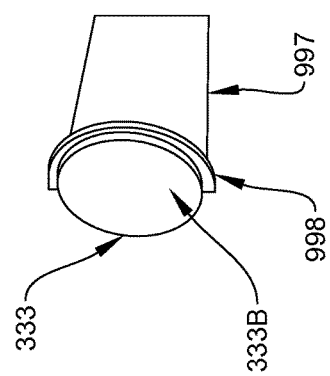
Figure 150A:
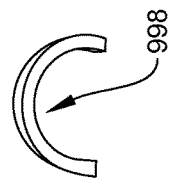
Figure 150D:
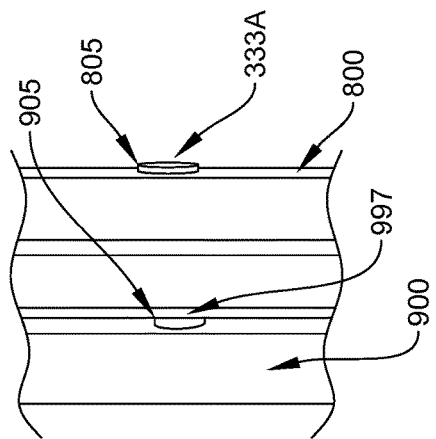
Figure 157:
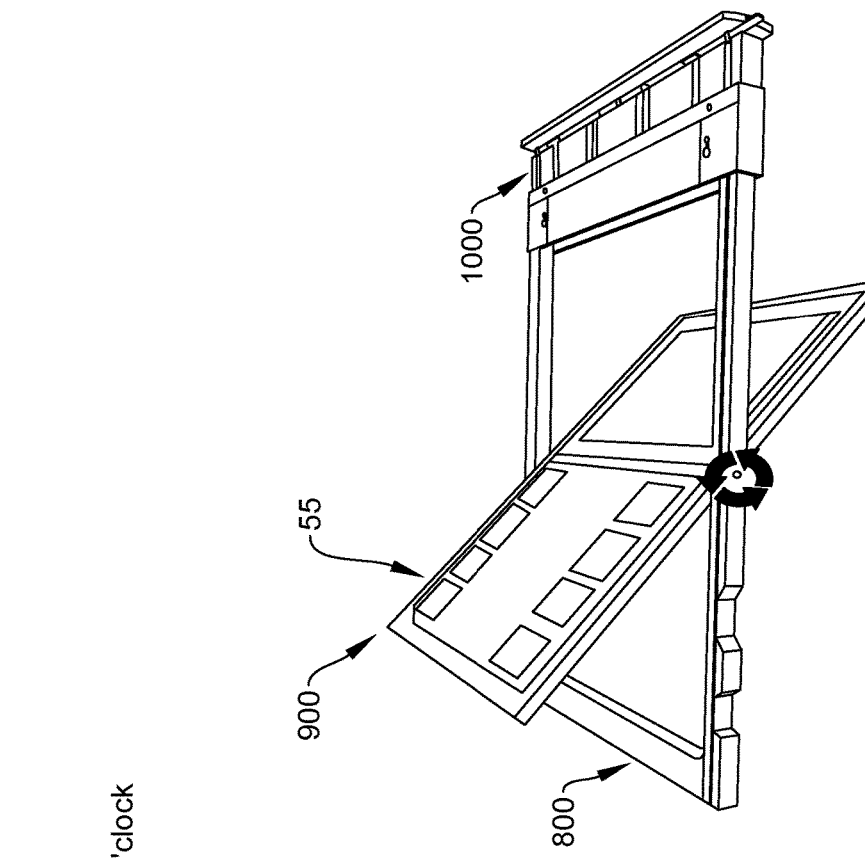

Each of the left side 803 and the right side 802 include notches 807, 808 respectively to hold and abut with a resilient arm inside the internal circuit board (not shown). The left side 803 and the right side 802 each may further include through holes 805, 806, respectively, that penetrate through the respective outer surfaces of the right and left sides 802, 803 in a direction and through the respective inner surfaces of the right and left sides 802, 803, as shown in FIG. 118 and FIG. 119. Alternatively, these through holes 805, 806 may be positioned at the outer or the inner sides of the front and the back sides 801, 804 respectively, and aligned to each other so as to receive and to hold the SIM tray 900 using a pair of rods 997 (of FIG. 149A) with snap rings 998 (of FIG. 150A), or by using two pins connected to the outer sides of the SIM tray 900. The rods 997 may be fitted into the two through holes 805, 806 of the tray holder 800 and may engage with the two through holes 905, 906 of the SIM tray 900 and secured by the snap rings 998. This allows the SIM tray 900 to rotate in a clockwise direction or counter-clockwise direction with a rotation range of 180° or 360°. This rotation allows the user to switch between any of the SIM cards held on any of the two sides of the SIM tray 900 as shown in FIG. 155 and FIG. 157, to mate with the connector reader inside the circuit board (not shown).

Referring to FIG. 122, the tray holder 800 may include two guide tracks 812A, 812B, one each on the opposite side BT of the right side 802 and the left side 803. The guide tracks 812A, 812B may engage with and slide along with corresponding guide tracks inside the connector. The front of each of the sides 802, 803 may include two through holes 810A, 810B respectively (refer to FIG. 117) that penetrate through the front of each side 802, 803 in a direction and through the respective opposite sides; i.e., towards the back side 804, to receive conductive (e.g., metal) elements such as a first conductive element 888A and a second conductive element 888B. Further, the tray holder 800 may receive the two conductive elements at the top side AT or the opposite side BT or the outer side of each of right and left sides 802, 803 respectively. The two conductive elements may pass through the two notches 807, 808, and may be exposed between the two notches 807, 808. The SIM tray 900 may receive two conductive elements 888A, 888B with similar arrangements and may be used without a frame holder.

FIG. 120A through 120E illustrate engagement of the two conductive elements 888A, 888B with the two through holes 810A, 810B. The tray holder 800 may be constructed from plastic material and during manufacturing of the frame holder or the SIM tray 900 as the case may be, the two conductive elements 888A, 888B may be appropriately positioned in an associated mold during injection molding process. Therefore, the first and the second conductive elements 888A, 888B may be held in their respective housings while the plastic flows around them during the injection process. The receiving housing of the first and the second through holes 810A, 810B may take shape of each conductive element.

Figure 121:
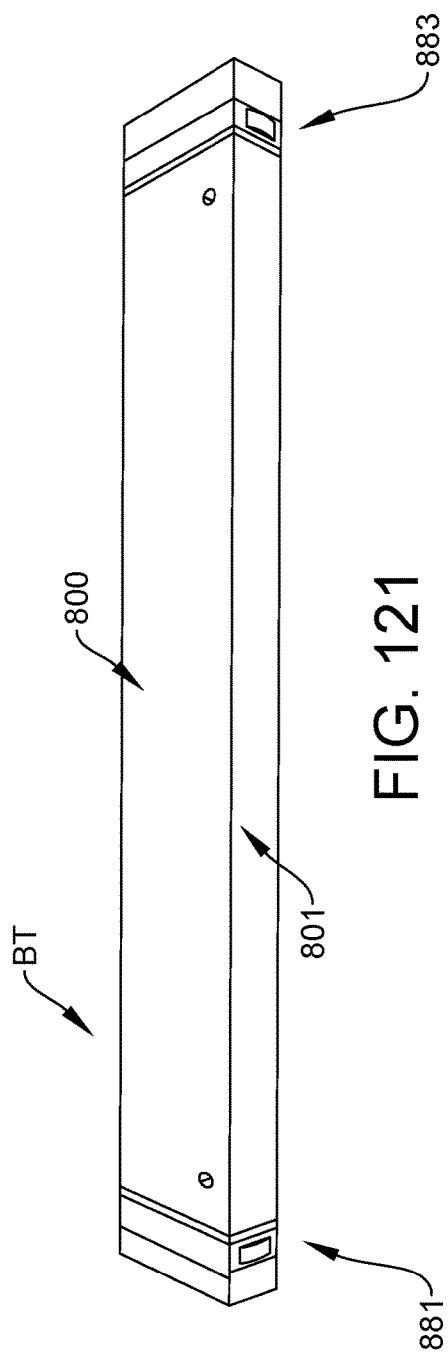

In FIGS. 120A through 120E, where the tray holder 800 is shown in a turnover position, the first through hole 810A may hold the first conductive element 888A and the second through hole 810B may hold the second conductive element 888B. The front end and the back end of each of the conductive elements 888A, 888B may be exposed and extend out of the respective through holes 810A, 810B, as shown in FIGS. 120B through 120E where the contact portions 881, 883, 882, 884 of the two conductive elements 888A, 888B may be punched then folded along the front and the back surface of the left side 803 and the right side 802, as shown in FIG. 121 and FIG. 122. In an embodiment, these contact portions 881, 883 are used to provide a connection between the circuit board and the stem ejectable component assembly 1000 to pop-up an indication message on a screen of the electronic device to inform and/or confirm open or slide out status of the stem ejectable component assembly 1000 along with the SIM tray 900. This is performed using a detect switch 710 that sends a signal through the first and second contact portions 755, 788 as further described below.

FIGS. 123 through 125, with reference to FIGS. 1A through 122, are exemplary views of a detect switch 710 for detecting when a user has pushed the front plate 100, according to the embodiments herein. FIG. 123 illustrates the detect switch 710 that includes two pairs of resilient portions providing an elastic restoring force, where the first resilient arm 751A includes a first contact portion 755 that is configured to engage with the surface of the first connector pin 600A when the surface of the first connector pin 600A is exposed/projected outwards. The outward projection of the surface of the first connector pin 600A results in it pushing the first contact portion 755 to make contact with the contact portion 881 of the first conductive element 888A of the tray holder 800. The first resilient arm 751A further includes a push portion 766 for abutting against the mounted rod 490 of the stem 400. The push portion 766 includes a contact portion 770 for making contact with a contact portion 799 of the second resilient arm 751B. When the mounted rod 490 is exposed and projects out of the through hole 509 of the main receiving housing 500 it pushes the push portion 766 to keep the contact portion 770 away from the contact portion 799 to break the electrical circuit that runs through the first resilient arm 751A connected to the first insulate body 790A. Conversely, when the stem 400 slides out towards the user, the mounted rod 490 moves in allowing the push portion 766 to move back and allow the contact portion 770 to make contact with the contact portion 799 to complete the electrical circuit.

The second resilient arm 751B includes a second contact portion 788 used that is configured to engage with the surface 6DD2 of the second connector pin 600B when the surface 6DD2 projects outwards. The outward projection of the surface 6DD2 pushes the second contact portion 788 for making contact with the contact portion 883 of the second conductive element 888B of the tray holder 800. The second resilient arm 751B further includes the contact portion 799, which is used for making contact with the contact portion 770 of the first resilient arm 751A when the stem 400 slides out towards the user, as described above. The mounted rod 490 of the stem 400 moves within the main receiving housing 500, the contact portion 770 of the first resilient arm 751A gets released and makes contact with the contact portion 799 of the second resilient arm 751B that makes the electrical circuit through the second resilient arm 751B connected to the second insulated body 790B. In an aspect, the entire detect switch 710 is connected with a partition 709 inside a connector housing 850 (of FIG. 130A) positioned between the back side 506 of the main receiving housing 500 and the front side 801 of the tray holder 800. FIGS. 124 and 125 illustrate relationship between the detect switch 710 and the stem ejectable component assembly 1000 while the front plate 100 is closed and not being pushed by the user. The mounted rod 490 is being exposed outwardly towards the tray holder 800 and continues pushing the push portion 766 to keep the contact portion 770 away from the contact portion 799. Also, the connector pins 600A, 600B are not projecting outward towards the tray holder 800, thus, the electrical circuit is completely disconnected.

Figure 126:
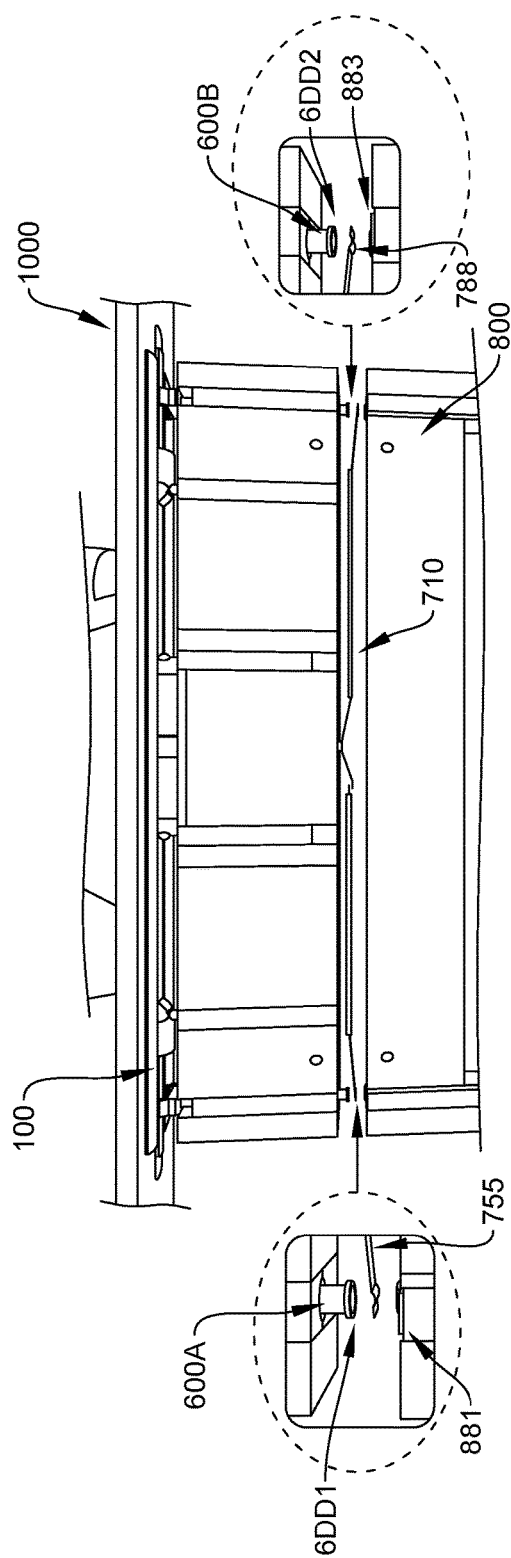
Figure 127:
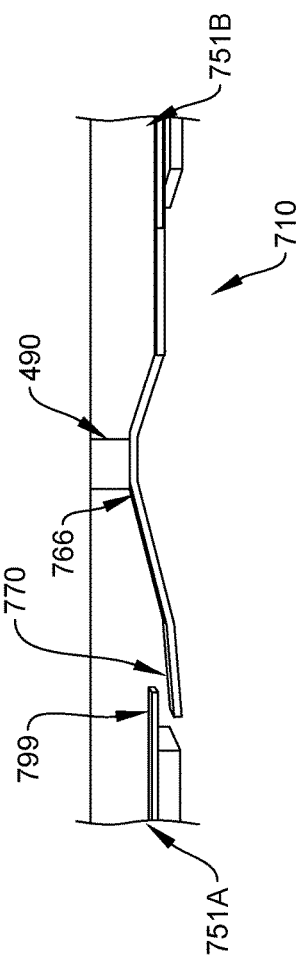

FIGS. 126 through 129, with reference to FIGS. 1A through 125, are exemplary views illustrating the relationship of the detect switch 710 and the stem ejectable component assembly 1000, according to the embodiments herein. If the user mistakenly pushes the front plate 100, the two connector pins 600A, 600B slide towards the tray holder 800 resulting in their surfaces 6DD1, 6DD2 projecting out, as shown in FIG. 126. In this situation, the two surfaces 6DD1, 6DD2 are set away from the first and second contact portions 755, 788, as shown in FIG. 126. Simultaneously, the mounted rod 490 is exposed out and pushes the push portion 766 to prevent the contact portion 770 to connect with the contact portion 799 even if the two surfaces 6DD1, 6DD2 push the first and second contact portions 755, 788 to connect with the two contact portions 881, 883 of the tray holder 800. This results in breaking the electrical circuit as shown in FIG. 127, where the mounted rod 490 pushes the push portion 766 and prevents the circuit to get connected due to the low force being applied by the user on the front plate 100. Therefore, if the user mistakenly pushes the front plate 100 with a low force, the circuit is still disconnected, and no warning message is indicated on the screen of the electronic device (not shown).

FIG. 128 illustrates the relationship of the detect switch 710 and the stem ejectable component assembly 1000 when the user intentionally pushed the front plate 100 with sufficient force. As shown, in this situation, the two connector pins 600A, 600B slide towards the tray holder 800, and the respective surfaces 6DD1, 6DD2 of the connector pins 600A, 600B project out to force the first and second contact portions 755, 788 to make contact with respective contact portions 881, 883 of the tray holder 800. Simultaneously, as described above, the stem 400 slides outward towards the user, resulting in the mounted rod 490 moving away from the push portion 766. Therefore, the electrical circuit becomes completed and provides a warning message on the screen of the electronic device. It is to be appreciated that when the user intentionally pushes the front plate 100, besides relative movement of the front plate 100 and the main receiving housing 500, the entire stem ejectable component assembly 1000 slides towards the circuit board and the contact portions 882, 884 make contact with corresponding contact portions (not shown) provided on the circuit board (not shown) to allow the electrical circuit to become completed. In addition, the circuit board may have resilient arms or any other similar biasing means (not shown), that engage with the back side 804 of the tray holder 800 to force back the tray holder along with the entire stem ejectable component assembly 1000 via the back side 804 towards the support frame 1001 to ensure that the electrical circuit flow happens only when the user pushes the front plate 100 intentionally with sufficient force.

FIGS. 130A, 130B, 131, and 132 with reference to FIGS. 1A through 129, are exemplary views of connector housing, according to the embodiments herein. The connector housing 850 comprises a top side 851, a bottom side 852, a front side 853, a back side 854, a right side 855, and a left side 856. The front side 853 has a recessed window 857 to accommodate the tray holder 800. The top side 851 and the bottom side 852 incorporate four pairs of connected through holes H1, H2 connected to each other via a notch providing elongated shapes 820A, 820B, as shown in FIG. 131 and FIG. 132, and are formed by recessing and penetrating the top side 851 in a direction and through the opposite bottom side 852. In an example, each pair of the elongated shapes 820A, 820B may be planar holes; i.e., without threads. The through holes 809 of the tray holder 800 may include inner threads to engage with the two pins 811A. Each notch may be narrower than the diameter of the two through holes H1, H2 to prevent any free relative movement between the tray holder 800 and the stem ejectable component assembly 1000 when the two are assembled using the two pins 811A as described above. However, when a sufficient force is applied, the two pins 811A may move through the narrower notches of the elongated shapes 820A, 820B to move from holes H1 to H2 or vice-versa. Thus, when sufficient external force is applied, the tray holder 800 and the stem ejectable component assembly 1000 may have relative movement to the extent of the distance between holes H1, H2.

The user may hold the stem ejectable component assembly 1000 and pull out the tray holder 800 that is accommodated within the recessed window 857 of the connector housing 850, or may hold the tray holder 800 and pull out the stem ejectable component assembly 1000 to move from the hole H1 to the hole H2, or vice versa. Therefore, the narrow notch prevents the tray holder 800 as well as the stem ejectable component assembly 1000 from freely moving or sliding while the two pins 811A hold the connector housing 850 with the tray holder 800. The pins 811A are retained in position by heads of the respective pins 811A, or alternatively by snap rings for securing the top side 851 and the bottom side 852. This arrangement also allows the user to slide the tray holder 800 only to the extent from through hole H1 to through hole H2 and the vice versa.

Figure 138:
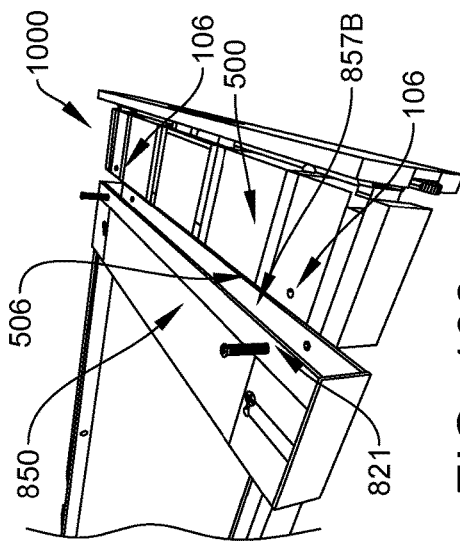

The recessed window 857 is formed in the connector housing 850 by recessing the front side 853 in the direction of and penetrating through the back side 854. Thus, the recessed window 857 has a front end 857A (shown in FIGS. 133A, 133B, and 135) that receives the front side 801 of the tray holder 800. The recessed window 857 incorporates a partition 709 to hold the detect switch 710, as shown in FIGS. 133A, 133B, 134A, and 134B. The recessed window 857 has a back end 857B (as shown in FIGS. 134A, 134B, and 138) that opens on the back side 854 of the connector housing 850. The back end 857B of the recessed window 857 is adapted to receive the stem ejectable component assembly 1000, as shown in FIG. 138 and FIG. 139.

Figure 136:
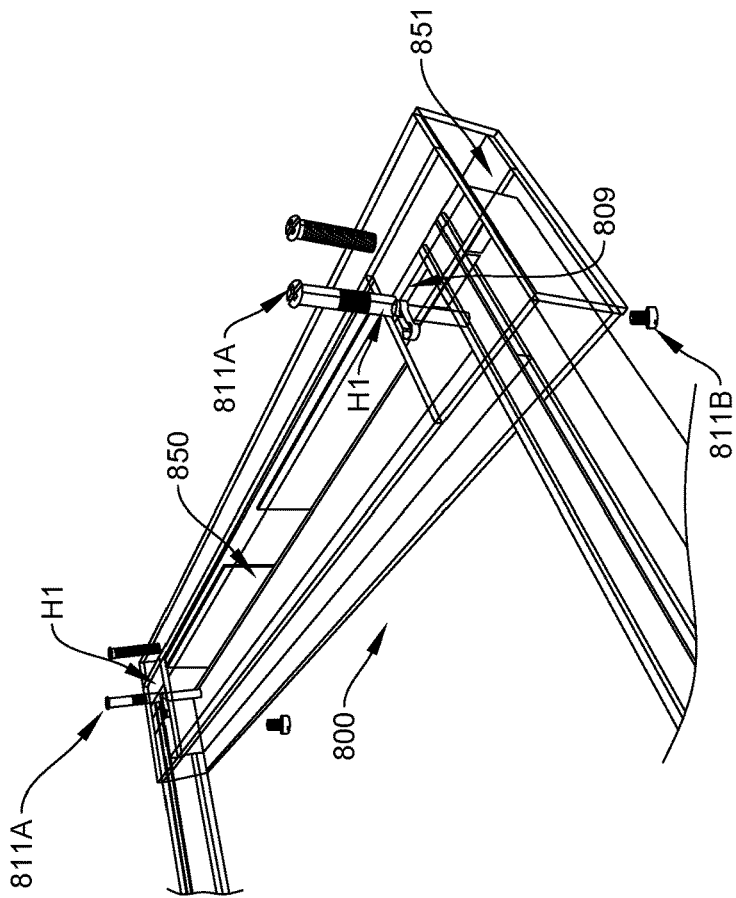
FIGS. 135 through 137 are exemplary views illustrating engagement of the tray holder with the connector housing, according to the embodiments herein.
Figure 135:
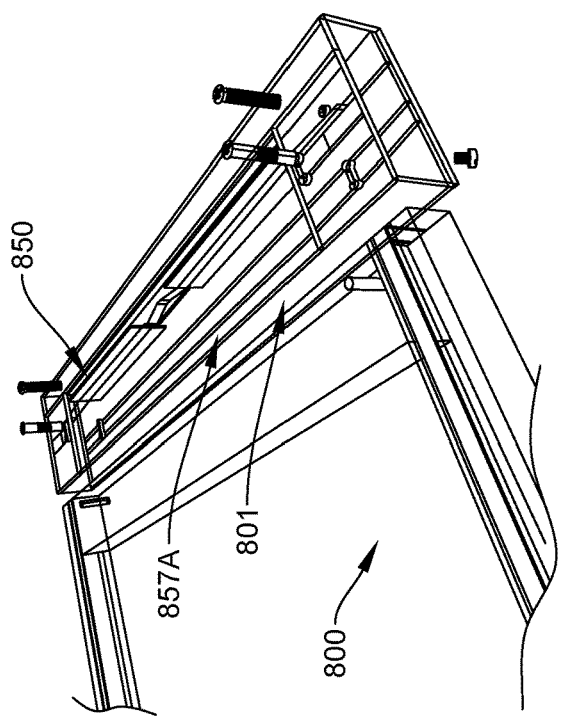
Figure 137:
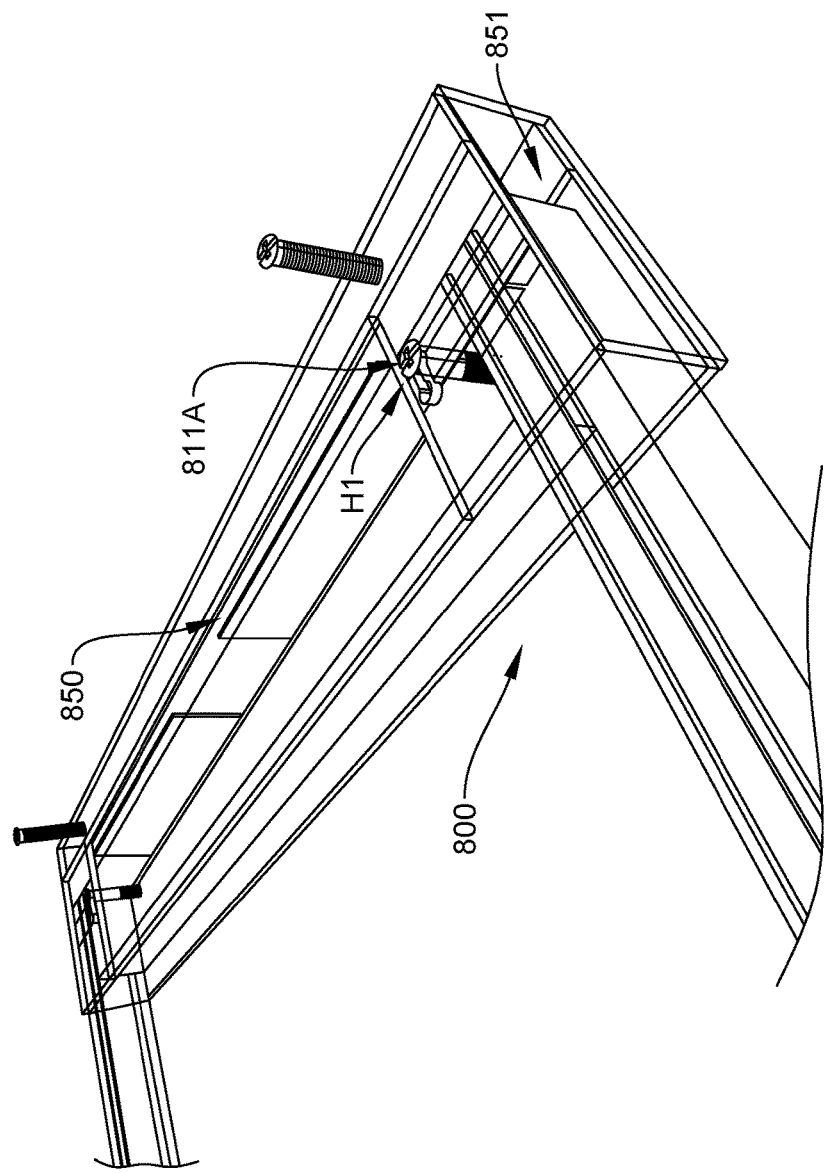

FIGS. 135 through 137, with reference to FIGS. 1A through 134B, are exemplary views illustrating engagement of the tray holder 800 with the connector housing 850, according to the embodiments herein. The front side 801 of the tray holder 800 mates and becomes aligned with the front end 857A of the recessed window 857. The front side 801 may be fitted and inserted inside the front end 857A of the recessed window 857, as shown in FIG. 136. When one of the through holes of the pairs of the through holes H1 or H2 of connector housing 850 mates and becomes aligned with the through holes 809 of the tray holder 800, the pins 811A that have a female configuration may be inserted through the through holes H1 or H2, from the top side 851 in the direction through the through holes 809 of the tray holder 800 and in the direction of the bottom through holes H1, as shown in FIG. 136 and FIG. 137. Then, a corresponding male pin 811B may be inserted from other side; i.e., the bottom side 852, to engaged with the female pin 811A. Thus, the tray holder 800 is completely engaged with the connector housing 850.

Figure 139:
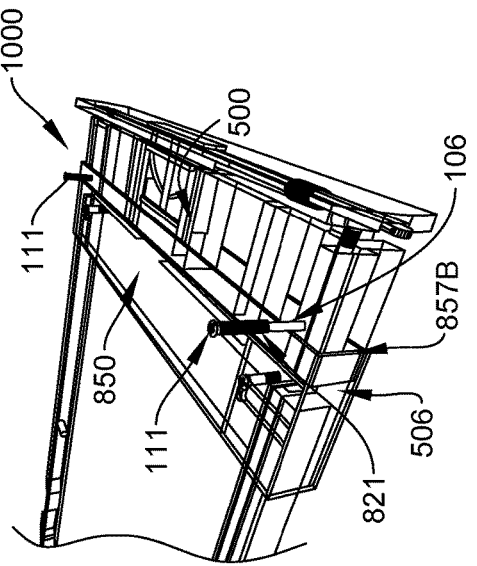
Figure 140:
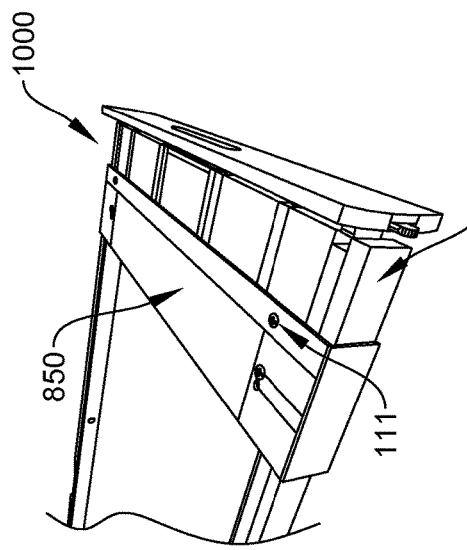

FIGS. 138 through 141, with reference to FIGS. 1A through 137, are exemplary views illustrating engagement of the connector housing 850 with the stem ejectable component assembly 1000, according to the embodiments herein. After aligning the back side 506 of the main receiving housing 500 with the back end 857B of the recessed window 857, the stem ejectable component assembly 1000 may be pushed inside the front end 857A of the recessed window 857 and the through holes 106A, 106B of the main receiving housing 500 may be aligned with the through holes 821 (shown in FIGS. 130A and 130B) of the connector housing 850, as shown in FIG. 139. Thereafter, the pins 111 may be inserted through the through holes 821 in the direction of the through holes 155. Thus, the connector housing 850 is completely engaged with the stem ejectable component assembly 1000, as shown in FIG. 140. Referring to FIG. 141, the front and the back of the tray holder 800 may be completely engaged with the stem ejectable component assembly 1000 via the connector housing 850.

FIGS. 142 through 148, with reference to FIGS. 1A through 141, are exemplary views illustrating engagement of one or more SIM cards 45, 55 with the SIM tray 900, according to the embodiments herein. FIG. 142 illustrates a top view of the SIM tray 900 used to receive two SIM cards/MMC cards in any combination. Thus, the SIM tray 900 may receive four SIM/MMC cards—two on each side. The SIM tray 900 may have smaller dimensions than the middle window 813 (refer to FIG. 117) of the tray holder 800, to provide adequate clearance to allow the SIM tray 900 to freely rotate within the middle window 813 of the tray holder 800. The SIM tray 900 comprises a front side 901, a back side 904, a left side 903, a right side 902, having a top side A, and an opposite side B. In addition, a partition 999 connects the left side 903 to the right side 902 thereby creating two windows 30, 50. The right side 902 may include a through hole 905 penetrating through entire of the right side 902 and penetrating partition 999 in the direction of and penetrating through the left side 903, as shown in FIG. 142, and emerging on the left side 903 as through hole 906. Thus, the two through holes 905, 906 are aligned with each other, and may receive a rod 997 (of FIG. 149A) to be secured by a snap ring 998 (of FIG. 150A).

Figure 145:
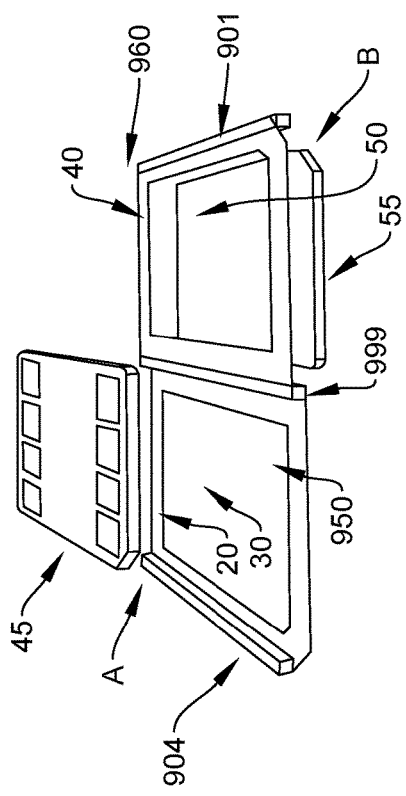
Figure 146:
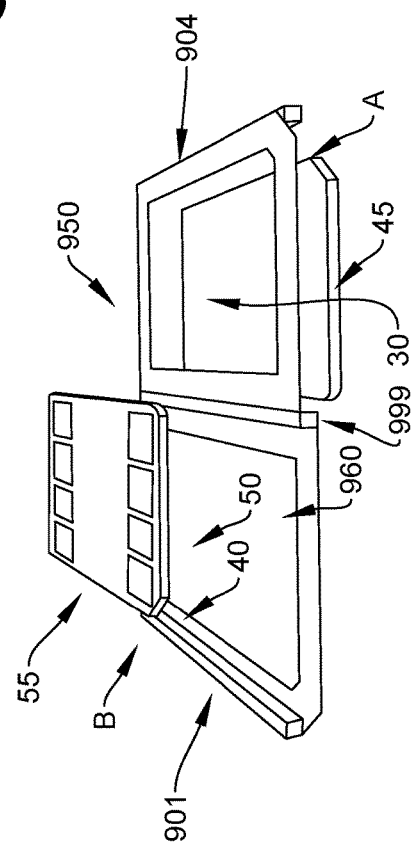

Referring to FIGS. 144A and 144B, the partition 999 creates two windows, such as the windows 30, 50, wherein a first receiving slot 950 is positioned in the window 30 on the top side A to receive a first SIM card (SIM card 45), as shown in FIG. 145, and the second receiving slot 960 is positioned in the window 30 at the opposite side B to receive a second SIM card (SIM card 55), as shown in FIG. 146. Thus, each window 30, 50 may have at least one receiving slot 950, 960 to receive one or more SIM cards 45, 55. The first receiving slot 950 is formed by recessing the surface of the top side A. The first receiving slot 950 is limited by the support layer 20, where the support layer 20 extends from edge of the back side 904 at the opposite side B in the direction to the partition 999, as shown in FIG. 143 and FIG. 145. Thus, the window 30 lies within the support layer 20 penetrating through the top side 31 of the support layer 20 in the direction to the opposite side 32 of the support layer 20 at the opposite side B. While the support layer 20 supports the first SIM card 45 and prevents it from falling down, the window 30 enables withdrawal of the first SIM card 45 from the first receiving slot 950.

The inner surface of the support layer 20 may receive a sticker (not shown) having two sticky surfaces/faces in which one face may stick with the top side 31 of the support layer 20, while the other face may stick with back side of the first SIM card 45. The first receiving slot 950 comprises a defined edge 910, a first side 911, second side 912 that is a back side of the partition 999, a third side 913, a fourth side 914. The sides 911-914 of the first receiving slot 950 are formed to receive and to hold the first SIM card 45.

Referring to FIGS. 144A and 144B, where a top view of a second receiving slot 960 provided on the opposite side B of the SIM tray 900 is shown. The second receiving slot 960 may have a similar arrangement as the first receiving slot 950. The second receiving slot 960 may be formed by recessing the surface of the opposite side B, and may be limited by the support layer 40, where the support layer 40 may extend from the edge of the front side 901 at the top side A in the direction to the partition 999, as shown in FIGS. 144A, 144B, and 146. Thus, the window 50 may lie within the support layer 40 and penetrates through the top side 51 of the support layer 40 in the direction and through the opposite side 52 of the support layer 40. While the support layer 40 supports a second SIM card (SIM card 55) to prevent it from falling down, the window 50 enables withdrawal of the second SIM card 55 from the second receiving slot 960.

The inner surface of support layer 40 may receive a sticker (not shown) having two sticky surfaces/faces in which one face may stick with the top side 51 of the layer 40, while the other face may stick with back side of the second SIM card 55. The second receiving slot 960 comprises a receiving groove having a defined edge 920, a first side 921, a second side 922 that is a back side of the partition 999, a third side 923, a fourth side 924. The sides 921-924 of the second receiving slot 960 are formed to receive and to hold the second SIM card 55.

Referring to FIGS. 145 and 147, where engagement of the first SIM card 45 with the first receiving slot 950 is shown. The first SIM card 45 may be placed into the first receiving slot 950, where the back side may face downwardly, and the conductive pads 977 of the first SIM card 45 may face upwardly, as shown in FIG. 147. The first SIM card 45 placed in the first receiving slot 950 of the SIM tray 900 may be positioned towards the 12 o'clock direction, facing upward.

FIGS. 146 and 148 illustrate engagement of the second SIM card 55 with the second receiving slot 960. The back side of the second SIM card 55 may be placed into the second receiving slot 960, where the back side may face downwardly, and the conductive pads 988 of the second SIM card 55 may face upwardly, as shown in FIG. 148. After the second SIM card 55 is placed in the second receiving slot 960 of the SIM tray 900, it may be positioned towards the 12 o'clock direction, facing upward, side by side to the first SIM card 45 would be positioned towards the 6 o'clock direction, facing downward. However, when the user rotates the SIM tray 900, the first SIM card 45 may be positioned towards the 12 o'clock direction, and its conductive pads 977 may face upward, while the conductive pads 988 of the second SIM card 55 may face downward, and the second SIM card 55 may be positioned towards the 6 o'clock direction. Thus, rotating the SIM tray 900 interchanges the position of the first SIM card 45 and the second SIM card 55.

FIGS. 149A through 150E, with reference to FIGS. 1A through 148, are exemplary views showing assembly of the SIM tray 900 with the tray holder 800 with help of a rod 997, according to the embodiments herein. The rod 997 may include a head 333A on one end to prevent the rod 997 from getting out of the through hole 805 through which the other end of the rod 997 is inserted. The opposite end 333B of the rod 997 includes a groove 333 to receive a snap ring 998 and secure the rod 997 and prevent its getting out.

Figure 150E:
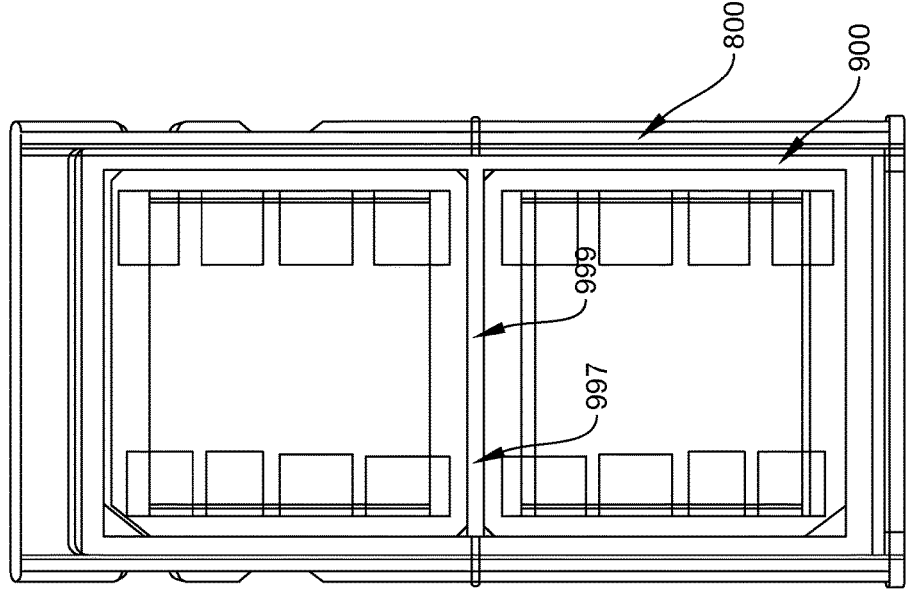
Figure 150C:
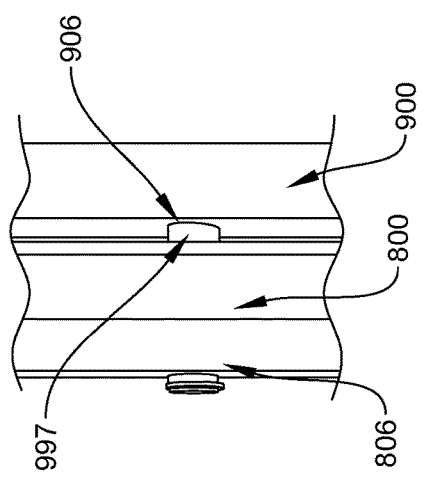
Figure 151:
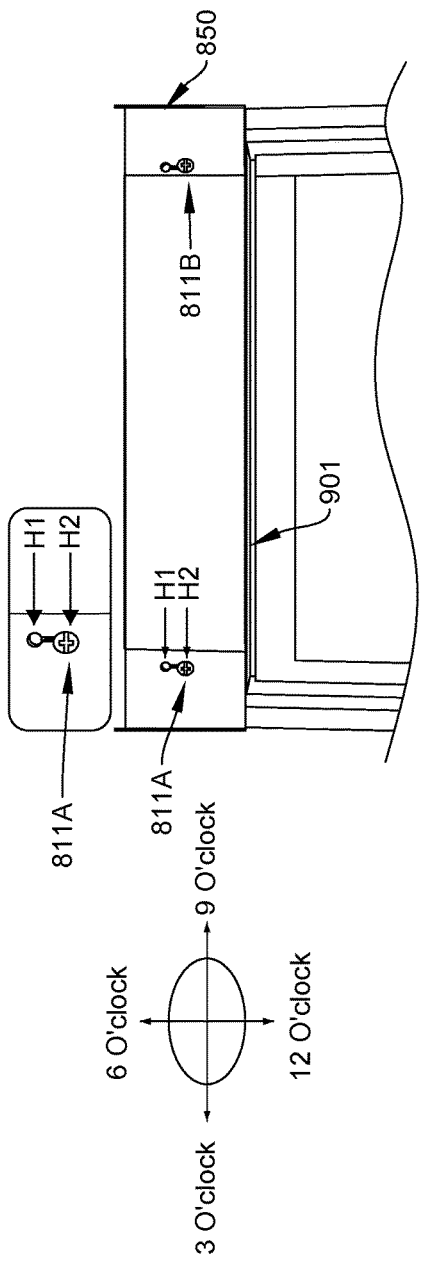
FIGS. 151 through 154 are exemplary views illustrating configuration of the SIM tray with through holes, according to the embodiments herein.
Figure 152:
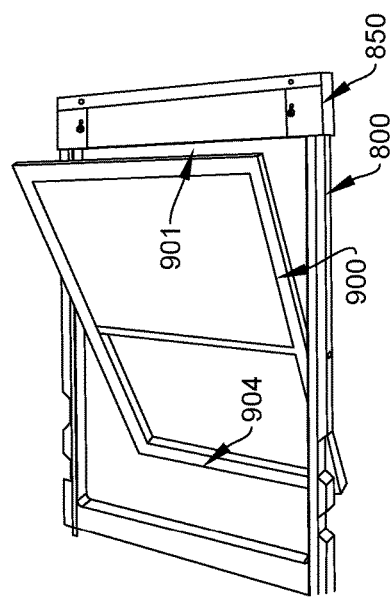
Figure 153:
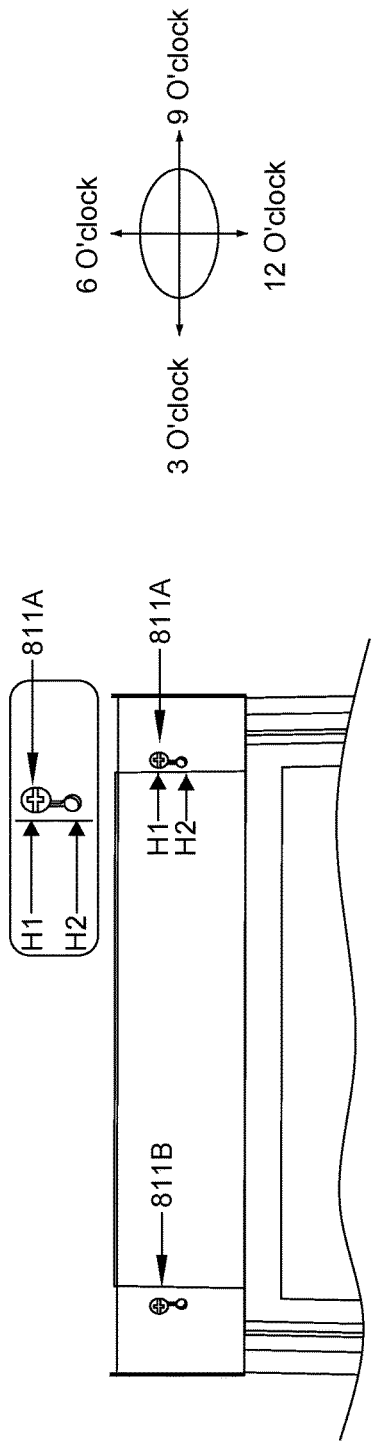
Figure 154:
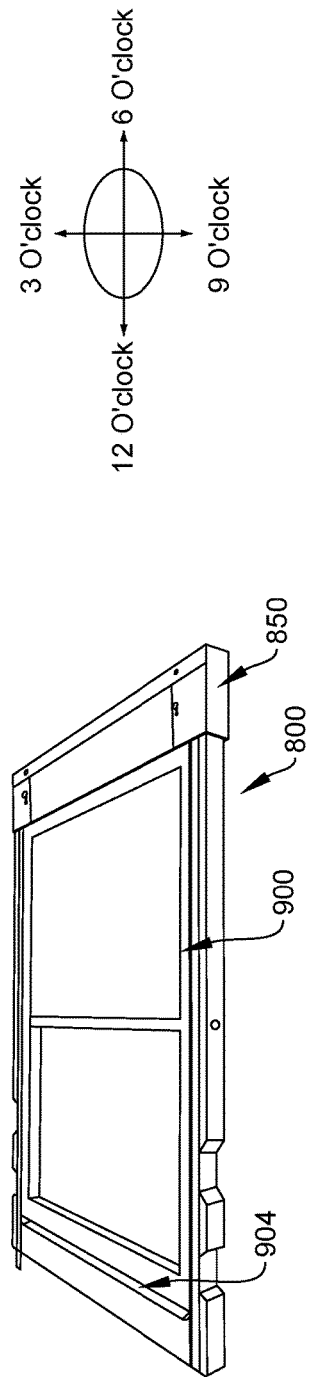

FIGS. 151 through 154, with reference to FIGS. 1A through 150E, are exemplary views illustrating configuration of a tray holder 800 with the through holes H1, H2, according to the embodiments herein. Referring to FIG. 151, when the user holds the connector housing 850 and pulls out the tray holder 800 along with the SIM tray 900, towards the 12 o'clock direction, the tray holder 800 along with SIM tray 900, and the pins 811A, 811B may slide from hole H1 to hole H2, as shown in FIG. 151. Upon the tray holder 800 being pulled away from the connector housing 850, the front side 901 of the SIM tray 900 may get exposed, as shown in FIG. 152, enabling rotation of the SIM tray 900 in a clockwise or counterclockwise direction thus providing an open position that enables rotation of the SIM tray 900. However, if after aligning the SIM tray 900 with the tray holder 800, the user pushes back the tray holder 800 towards the 6 o'clock direction, the tray holder 800 along with the SIM tray 900 and the pins 811A may slide back to the hole H1, as shown in FIG. 153 and FIG. 154, resulting in the front side 901 of the SIM tray 900 getting inside the front end 857A of the recessed window 857 in the connector housing 850. This provides a closed position as the SIM tray 900 cannot be rotated now.

FIGS. 155 through 158, with reference to FIGS. 1A through 154, are exemplary views of complete assembly of the stem ejectable component assembly 1000 and the tray holder 800, according to the embodiments herein. The SIM tray 900 may be coupled to the tray holder 800 of the stem ejectable component assembly 1000 such that at least a portion of the SIM tray 900 may rotate pivotally about an axis of the partition 999 so as to enable swapping/switching of SIM cards 45, 55. In an aspect, rotation of the SIM tray 900 may allow switching of an inactive SIM to an active SIM and vice versa.

Figure 158:
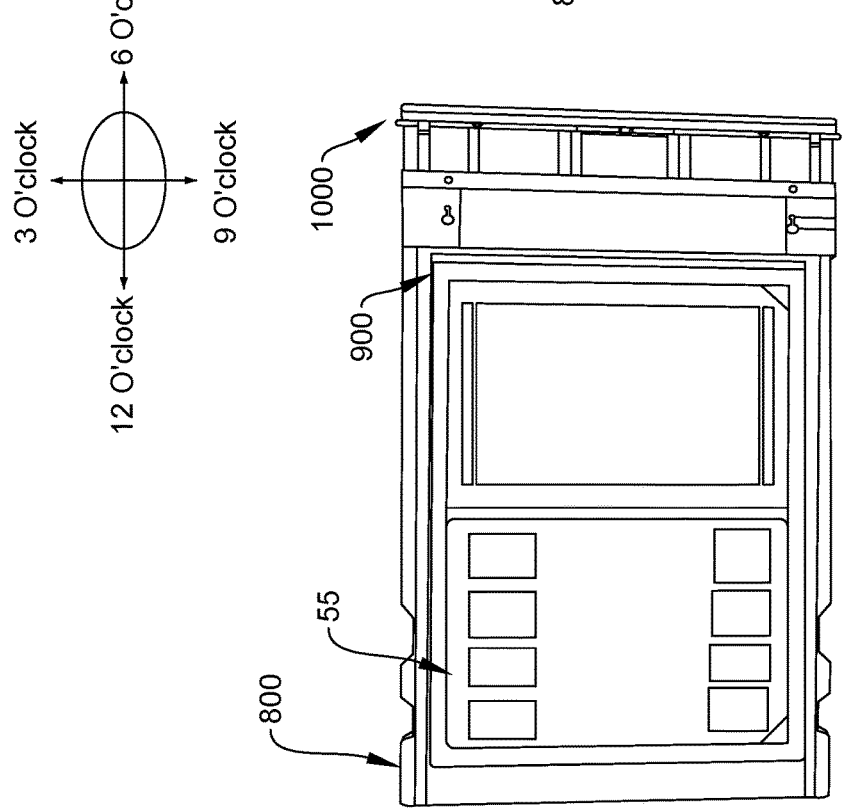
Figure 160:
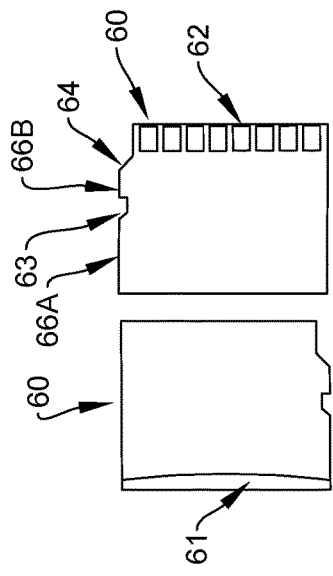
FIGS. 159 through 162 are exemplary views of a rotary MMC tray, according to the embodiments herein.
Figure 161:
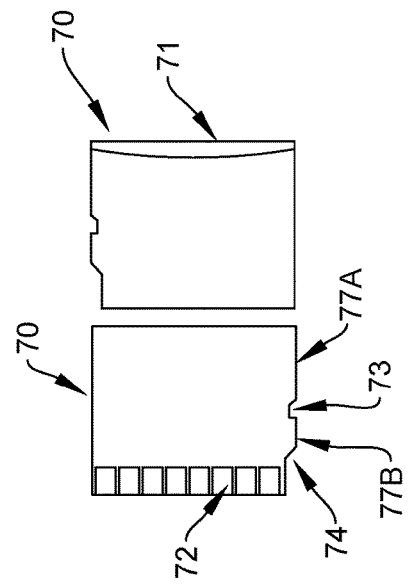
Figure 163:
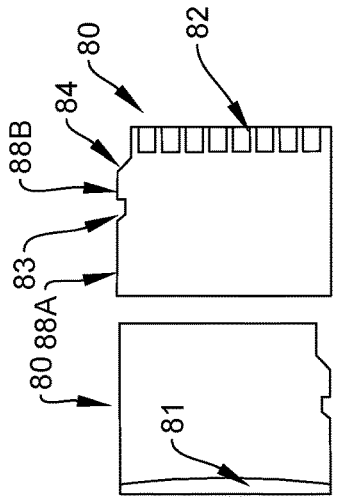
FIGS. 163 and 164 are exemplary views illustrating MMC cards, according to the embodiments herein.
Figure 164:
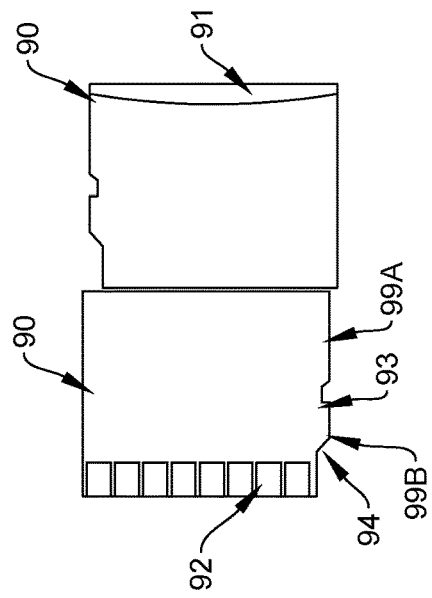

FIGS. 159 through 162, with reference to FIGS. 1A through 158, are exemplary views of an MMC card tray 1200, according to the embodiments herein. The MMC card tray (also referred to as "MMC tray" hereinafter) 1200 may load/hold four MMC cards such as a first MMC card 60, a second MMC card 70, a third MMC card 80, and a fourth MMC card 90, wherein the MMC tray 1200 is configured to hold the MMC cards 60-80 such that conductive pads 62 of the first MMC card 60 and conductive pads 82 of the third MMC card 80 may be facing inward so that they face each other; and conductive pads 72 of the second MMC card 70 and conductive pads 92 of the fourth MMC card 90 may face upward so that their back side faces each other. The MMC tray 1200 comprises a top side C and an opposite side D. The top side C may include a first receiving slot 3 and a second receiving slot 4 matching the shapes of the first and second MMC cards 60, 70 respectively in order to receive the first and the second MMC cards 60, 70 respectively, as shown in FIG. 160 and FIG. 161. The opposite side D may include a third receiving slot 5 and a fourth receiving slot 6 in order to receive the third and the fourth MMC cards 80, 90 respectively, as shown in FIG. 163 and FIG. 164.

Figure 159:
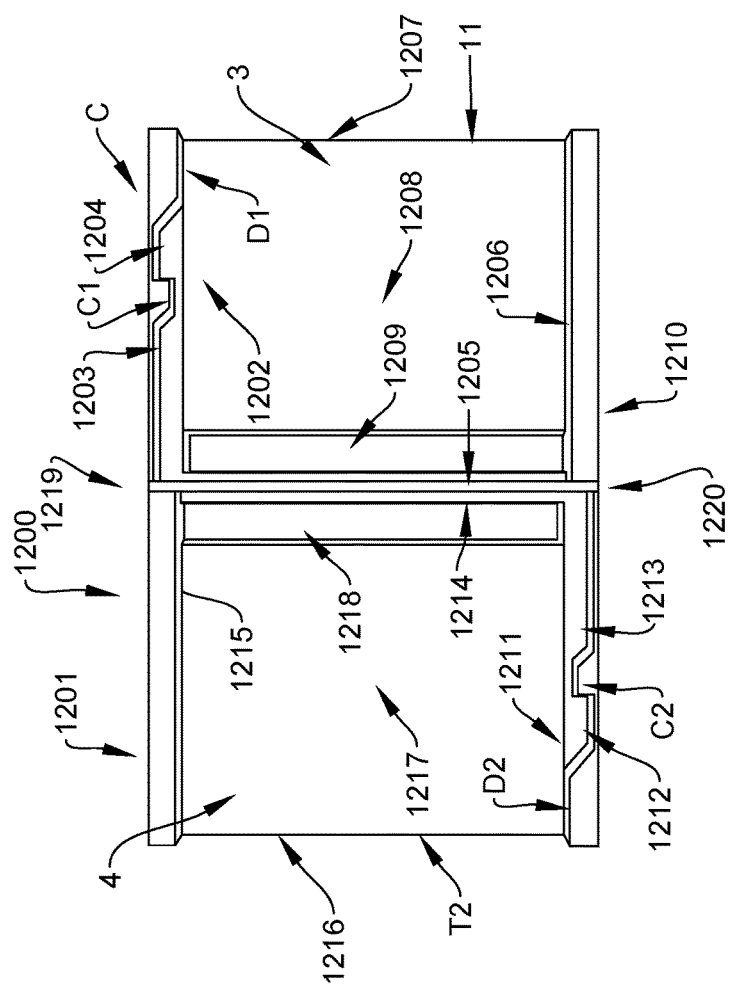
Figure 162:
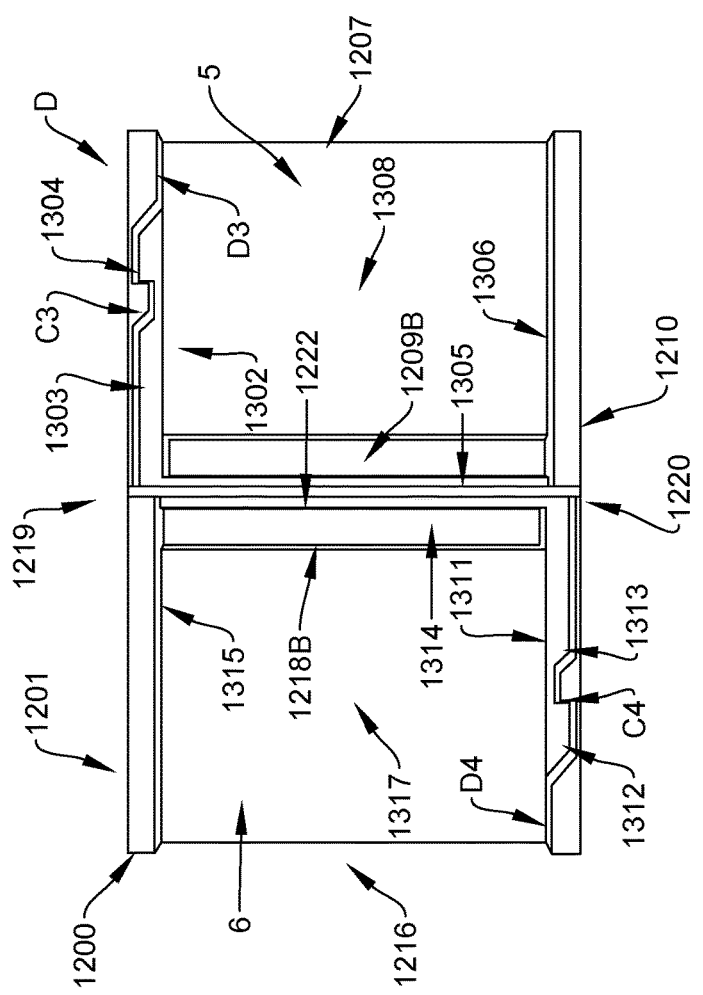

The MMC tray 1200 has a right side 1201, a left side 1210, a front side 1207, a back side 1216, and a middle partition 1222 that divides the entire MMC tray 1200 into two windows. The first receiving slot 3 is made by recessing the top side C and limited by a partition T1 to create the third receiving slot 5 at the opposite side D as shown in FIG. 159 and FIG. 162. The first receiving slot 3 has a right inner side 1202 having a groove 1203 and a notch 1204 that extend inwardly towards the right side 1201, wherein the groove 1203 and the notch 1204 create supporting male protrusions C1, D1 that engage with the female guiding notch 63 and second guiding curve edge 64, and parts 66A, 66B of the right side of the first MMC card 60 to hold the first MMC card 60 from getting out of the first receiving slot 3 The MMC tray 1200 has a first middle inner side 1205 that is the front side of the middle partition 1222 positioned towards the front side 1207 to support the back edge of the first MMC card 60. The left inner side 1206 of the MMC tray 1200 is positioned in the right inner side 1202 to support the left edge of the first MMC card 60, where the front side 1207 is an open side.

The first receiving slot 3 incorporates a window 1209 formed by recessing and penetrating through the top side C in the direction through the opposite side D positioned between the first middle inner side 1205 and the partition T1 and extending from the right inner side 1202 in the direction of the inner left side 1206 to receive hand gripping portion 61 of the first MMC card 60 and hand gripping portion 81 of the third MMC card 80 at the opposite side D. The partition T1 has a top side 1208 to support the back side of the first MMC card 60 and has a top side 1308 at the opposite side D to support the back side of the third MMC card 80. Referring to FIG. 159, the second receiving slot 4 is formed by recessing through the top side C and is limited by the partition T2 to create a fourth receiving slot 6 at the opposite side D. The second receiving slot 4 has a right inner side 1215 to support the right edge of the second MMC card 70 and has a second middle inner side 1214 that is the back side of the middle partition 1222 positioned towards the back side 1216 to support the back edge of the second MMC card 70.

The second receiving slot 4 of the MMC tray 1200 has a left inner side 1211 having a groove 1212 and a notch 1213 extending inwardly towards the left side 1210, where the groove 1212 and a notch 1213 create supporting male protrusions C2, D2 to receive the female guiding notch 73 and second guiding curve edge 74, and parts 77A, 77B of the left side of the second MMC card 70 to hold the second MMC card 70 from getting out of its receiving slot 4 and includes an open back side 1216. Furthermore, the second receiving slot 4 has a window 1218 formed by recessing and penetrating through the top side C in the direction through the opposite side D positioned between the second middle inner side 1214 and the partition T2, and extending from the right inner side 1215 in the direction to the left inner side 1211 to receive the hand gripping portion 71 of the second MMC card 70 and the hand gripping portion 91 of the fourth MMC card 90.

The partition T2 of the second receiving slot 4 has a top side 1217 to support the back side of the second MMC card 70 and has a top side 1317 of the opposite side D to support the back side of the fourth MMC card 90. The right side 1201 includes through hole 1219 that penetrate through center of the middle partition 1222 in the direction to the opposite side aligned through hole 1220 at the left side 1210 of the MMC tray 1200, as shown in FIG. 171A, to receive the rod 997 and to be secured by the snap ring 998 to allow the MMC tray 1200 to engage with the tray holder 800 and to allow the MMC tray 1200 to rotate in clockwise and counterclockwise direction up to 360°.

Referring to FIG. 162, the opposite side D of the MMC tray 1200 may have similar arrangements as the top side C. The opposite side D may include the third receiving slot 5 positioned below the first receiving slot 3 and a fourth receiving slot 6 positioned below the second receiving slot 4 to receive the third and the fourth MMC cards 80, 90 respectively, as shown in FIG. 163 and FIG. 164. The third receiving slot 5 is formed by recessing the opposite side D limited by the partition T1, as shown in FIG. 162. The third receiving slot 5 has a right inner side 1302 having a groove 1303 and a notch 1304 extending inwardly towards the right side 1201, wherein the groove 1303 and the notch 1304 create supporting male protrusions C3, D3 that are used to receive a female guiding notch 83 and second guiding curve edge 84, and parts 88A, 88B of the right side of the third MMC card 80, and to hold the third MMC card 80 from getting out of the third receiving slot 5.

The MMC tray 1200 has a third middle inner side 1305 that is the back side of the middle partition 1222 positioned towards the front side 1207 to support the back edge of the third MMC card 80. The left inner side 1306 is positioned in front the right inner side 1302 to support the left edge of the third MMC card 80, where the front side 1207 is an open side. Furthermore, the third receiving slot 5 includes an opposite window 1209B formed by recessing through the top side C positioned between the third middle inner side 1305 and the partition T1, and extending from the right inner side 1302 in the direction to the left inner side 1306 to receive hand gripping portion 81 of the third MMC card 80, and to receive hand gripping portion 61 of the first MMC card 60 of the top side C. The partition T1 has a top side 1308 to support the back side of the third MMC card 80.

Referring to FIG. 162, the fourth receiving slot 6 is formed by recessing the opposite side D limited by the partition T2 at the opposite side D. The fourth receiving slot 6 has a right inner side 1315 to support the right edge of the fourth MMC card 90 and has a fourth middle inner side 1314 that is the back side of the middle partition 1222 positioned towards the back side 1216 to support the back edge of the fourth MMC card 90. The fourth receiving slot 6 has a left inner side 1311 including a groove 1312 and a notch 1313 extending inwardly towards the left side 1210, where the groove 1312 and the notch 1313 create supporting male protrusions C4, D4 to receive the female guiding notch 93 and second guiding curve edge 94, and parts 99A, 99B of the left side of the fourth MMC card 90 to hold the fourth MMC card 90 from getting out of the fourth receiving slot 6 and has an open back side 1216. The fourth receiving slot 6 includes a window 1218B formed by recessing through the top side C positioned between the fourth middle inner side 1314 and the partition T2 and extending from the right inner side 1315 in the direction to the left inner side 1311 to receive hand gripping portion 91 of the fourth MMC card 90 and the hand gripping portion 71 of the second MMC card 70 of the top side C. The partition T2 has a top side 1317 to support the back side of the fourth MMC card 90.

FIGS. 165 through 171B, with reference to FIGS. 1A through 164, are exemplary views illustrating engagement of four MMC cards with the receiving slots at top side C and opposite side D of the MMC tray 1200, according to the embodiments herein. The first and the second MMC cards 60, 70 respectively may be engaged with the first and the second receiving slots 3, 4 respectively at the top side C of the MMC tray 1200. When the first MMC card 60 is inserted into the first receiving slot 3. The conductive pads 62 may face upward and back side of the first MMC card 60 may face downward, wherein the right side of the first MMC card 60 having a female guiding notch 63 may engage with male protrusion C1 of the MMC tray 1200, and a second guiding curve edge 64 may engage with male protrusion D1 of the MMC tray 1200. However, the two parts 66A, 66B of the right side of the first MMC card 60 may engaged with the groove 1203 and the notch 1204 of the right inner side 1202 of the MMC tray 1200, as shown in FIG. 167. The hand gripping portion 61 of the first MMC card 60 may be inserted into window 1209, as shown in FIG. 168, and the back side of the first MMC card 60 may face the top side 1208 of the partition T1. The front side of the first MMC card 60 may be exposed out of the front side 1207 of the MMC tray 1200, as shown in FIG. 182 to allow a user to withdraw the first MMC card 60.

Figure 165:
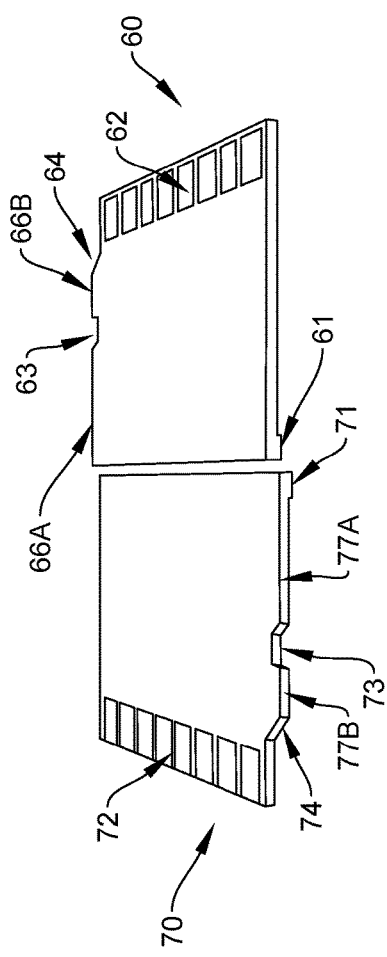
Figure 166:
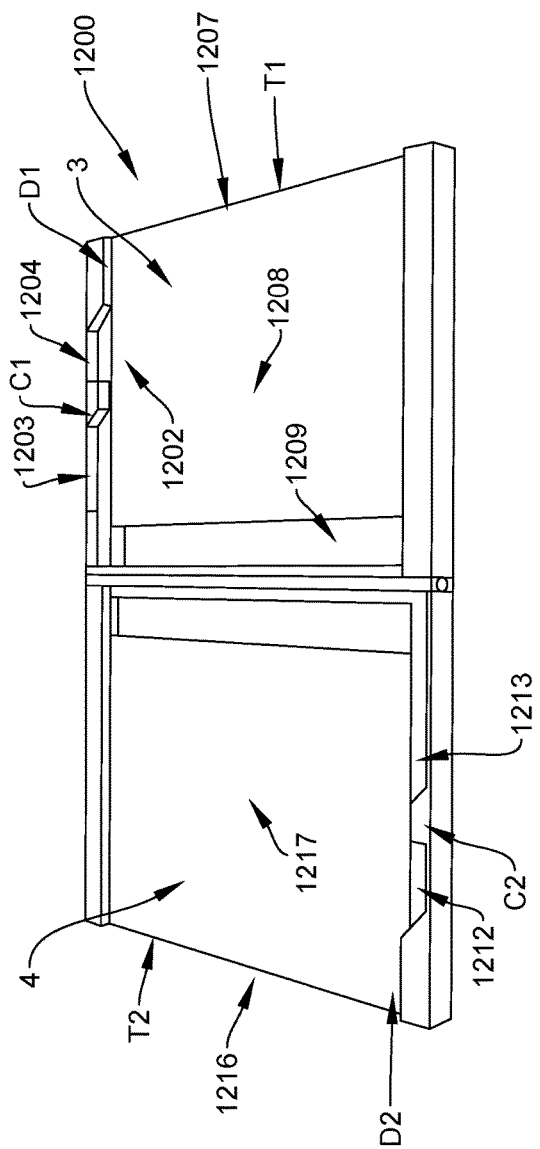

Referring to FIGS. 165, 166, and 167, engagement of a second MMC card 70 with a second receiving slot 4 of the MMC tray 1200 is shown. The second MMC card 70 may have a similar arrangement as that of the first MMC card 60, in which, when the second MMC card 70 is inserted into the second receiving slot 4 the conductive pads 72 of the second MMC card 70 may face upward and the back side of the second MMC card 70 may face downward. The left side of the second MMC card 70 having a female guiding notch 73 may engage with the male protrusion C2 and a second guiding curve edge 74 may engage with the male protrusion D2. However, two parts 77A, 77B of the second MMC card 70 may engage with the receiving groove 1212 and the notch 1213 of the left inner side 1211, as shown in FIG. 167. The hand gripping portion 71 may be inserted into window 1218.

FIG. 168 illustrates a turnover position of the MMC tray 1200. The back side of the second MMC card 70 may face the top side 1217 of the partition T2 and the front side of the second MMC card 70 may expose out of the back side 1216 of the MMC tray 1200 to allow the user to withdraw the second MMC card 70. Referring to FIGS. 169 through 171B, the illustration of the engagement of the third and the fourth MMC cards 80, 90 with the third and the fourth receiving slots 5, 6 respectively at the opposite side D of the MMC tray 1200 is shown.

When the third MMC card 80 is inserted into the third receiving slot 5, the conductive pads 82 may face upwards and the back side of the third MMC card 80 may face downwards, where the right side of the third MMC card 80 having a female guiding notch 83 may engage with male protrusion C3, and a second guiding curve edge 84 may engage with male protrusion D3. However, parts 88A, 88B of the right side of the third MMC card 80 may engage with groove 1303 and notch 1304 of the right inner side 1302 and hand gripping portion 81 may be inserted into window 1209B to face the hand gripping portion 61 of the first MMC card 60, as shown in FIG. 171A. The back side of the third MMC card 80 may face the top side 1308 of the partition T1 and the front side of the third MMC card 80 may be exposed out of the front side 1207 of the MMC tray 1200, as shown in FIG. 183 to allow the user to withdraw the third MMC card 80. The height of the partition T1 may be similar to the height of the hand gripping portion 61 of the first MMC card 60 and to height of the hand gripping portion 81 of the third MMC card 80 to keep the first and the third MMC cards 60, 80 respectively in level with the partition T1.

Figure 169:
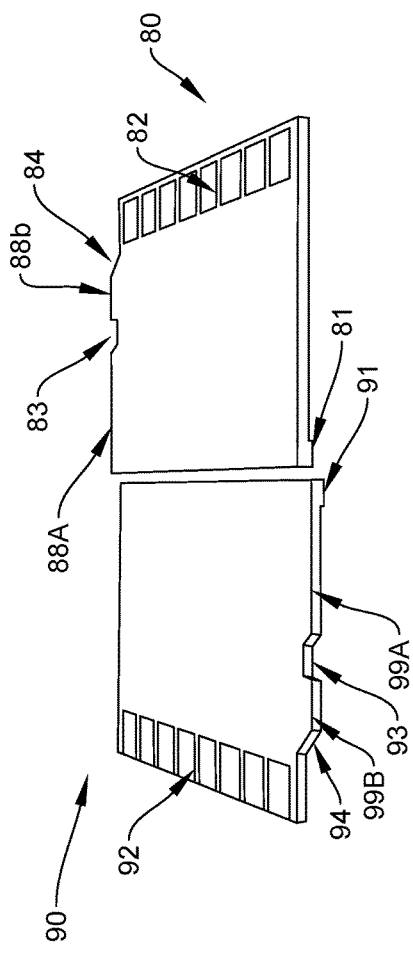
Figure 170:
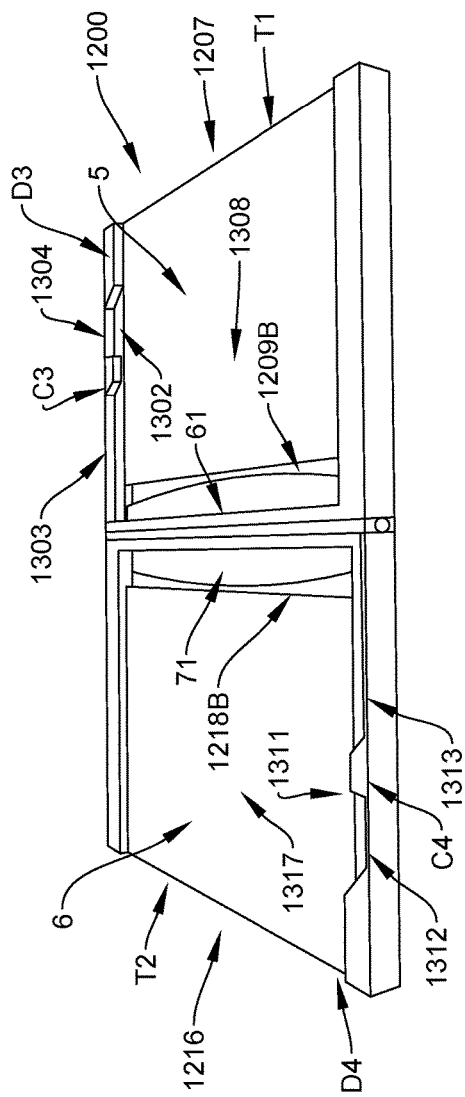

Referring to FIG. 169 and FIG. 170, engagement of the fourth MMC card 90 with the fourth receiving slot 6 having similar arrangements as the third MMC card 80 is shown. When the fourth MMC card 90 is inserted into the fourth receiving slot 6 the conductive pads 92 may face upwards and back side of the fourth MMC card 90 may face downwards. The left side of the fourth MMC card 90 having a female guiding notch 93 may engage with male protrusion C4, and second guiding curve edge 94 may engage with male protrusion D4. However, parts 99A, 99B of the fourth MMC card 90 may engage with grooves 1312 and notch 1313 of the left inner side 1311 and hand gripping portion 91 may be inserted into window 1218B to face the hand gripping portion 71 of the second MMC card 70, as shown in FIG. 171A. The back side of the fourth MMC card 90 may face the top side 1317 of the partition T2 and the front side of the fourth MMC card 90 may be exposed out of the back side 1216 of the MMC tray 1200, as shown in FIG. 183, to allow the user to withdraw the fourth MMC card 90. The heights of the partition T2 may be similar to the heights of the hand gripping portion 71 of the second MMC card 70 and the hand gripping portion 91 of the fourth MMC card 90 to keep the second and the fourth MMC cards 70, 90 respectively level with the partition T2 where the partition T1 has similar configuration as the partition T2.

FIGS. 172 through 175, with reference to FIGS. 1A through 171B, are exemplary views illustrating engagement of the rod 997 with the two through holes 805, 806 of the tray holder 800, with the two through holes 1219, 1220 of the MMC tray 1200, and fitting of the snap ring 998, according to the embodiments herein. The end 333B of the rod 997 may be inserted through the through hole 805 of the tray holder 800 in the direction of through hole 1219 of the MMC tray 1200 in the direction of the middle partition 1222 and through hole 1220 of the MMC tray 1200, and in the direction of the through hole 806 of the tray holder 800, and may appear out of the left side 803. Then, the snap ring 998 may be inserted into the groove 333 to lock the rod 997 to secure it and allow the MMC tray 1200 to securely rotate.

FIGS. 176 through 183, with reference to FIGS. 1A through 175, are exemplary views illustrating the relationship between the rotary MMC tray 1200 and the tray holder 800 with the through holes H1, H2 of the connector housing 850 through the pins 811A, 811B, according to the embodiments herein. Referring to FIG. 176, when the user holds the connector housing 850 and pulls out the tray holder 800 along with the MMC tray 1200, towards the 12 o'clock direction, the tray holder 800 along with the MMC tray 1200 may move away from the connector housing 850 with the pins 811A, 811B sliding from hole H1 to hole H2, as shown in FIG. 176. Then, the front side 1207 of the MMC tray 1200 shall be out of the recess in the connector housing 850, as shown in FIG. 176 and FIG. 177, thereby allowing the MMC tray 1200 to be rotated in a backward or in a frontward direction. The position corresponds to an open position. However, if after properly aligning the MMC tray 1200 with the recess in the connector housing 850, the user pushes back the tray holder 800 along with the MMC tray 1200, towards the 6 o'clock direction, the pins 811A, 811B may slide back to the hole H1, as shown in FIG. 178 and FIG. 179. This will cause the front side 1207 of the MMC tray 1200 to engage with the recess inside the front end 857A of the recessed window 857 of the connector housing 850, thereby providing a closed position to the MMC cards 60-90.

It is to be appreciated that the embodiments of the SIM tray 900 or MMC tray 1200 have been described herein with the rotating axes of the SIM tray 900 and MMC tray 1200 positioned between the left side and the right side of the tray holder 800; i.e., in a transverse direction to the direction of sliding of the stem ejectable component assembly 1000, however, it would be apparent that it is possible to have the rotating axes along the direction of sliding of the stem 400; i.e., between the front side and back side of the tray holder 800 without affecting the functioning of the SIM tray 900 and MMC tray 1200. The open position and closed position by pulling and pushing of the main receiving housing 500 and the connector housing 850 between holes H1, H2 would still be applicable.

In an aspect, the MMC tray 1200 as described above, is configured to allow a user to double the data storage capacity, for example, if the first MMC card 60 has a capacity storage of 100 GB, then the second MMC card 70 may have a storage capacity of 100 GB, or less then 100 GB, then the total capacity will be 200 GB, or less than 200 GB, where the reader of the MMC cards 60, 70 may be configured to read the first MMC card 60 and the second MMC card 70, such that when the first MMC card 60 becomes full, the reader will automatically switch to store the data in the second MMC card 70.

While the disclosure provided herein describes features in terms of preferred and exemplary embodiments, thereof numerous other embodiments, modifications, and variations within the scope and the spirit of the appending claims, will occur of persons of ordinary skill in art from a review of this disclosure, it is to be understood that the invention is not limited thereto. Other modifications, such as changing the direction of the SIM cards, or the direction of the shaft with snap ring, or the shape of the shaft and the snap ring into spherical or flatten shape or simplifying the rotational direction, are also within the scope of the invention, also not limited thereto. On the contrary, it is intended to cover various modifications, and similar arrangements and procedures, therefore should be accorded the broadest interpretation, so as to encompass all such modifications and similar arrangements and procedures. It is to be understood that many changes may be made therein without departing from the spirit and scope of the claims. It will also to be understood that various directional and orientational terms such as "twelve o'clock" and "six o'clock", "nine o'clock", and "three o'clock" and the like are used herein only for convenience, and that no fixed or absolute directional or orientational limitations are intended by the use of these words.

What is claimed is:

1. A stem ejectable component assembly for an electronic device, the stem ejectable component assembly comprising:
    a receiving housing comprising a front side and a back side, wherein the back side of the receiving housing is configured to be coupled to a SIM tray or a MMC tray, the receiving housing, along with the coupled SIM tray or the coupled MMC tray configured to slidably fit within the electronic device through a window in a support frame of the electronic device;
    a front plate coupled at the front side of the receiving housing through a pair of connector pins, the connector pins slidably arranged within a pair of holes in the receiving housing, wherein the front plate is biased to move away from the front side of the receiving housing by a pair of connector pin springs provided along with the pair of connector pins, and wherein the front plate incorporates a pair of slider pins that are configured to slide between a first position that corresponds to outer ends of the slider pins engaging with the frame of the electronic device through a pair of recesses in the frame, and a second position that corresponds to the slider pins being free from engagement with the frame electronic device; and
    a stem slidably coupled to the receiving housing from the front side of the receiving housing through a window in the front plate, and accommodated in a recess in the receiving housing, wherein the stem is biased to move out of the recess to project out of the front plate,
    wherein the slider pins are biased by a pair of slider springs to permit inner ends of the slider pins to abut the stem and hold the stem in a pushed-in position within the front plate, and
    wherein the slider pins incorporate a profiled protrusion that engage with a pair of ball pins fixed to the front side of the receiving housing.

2. The stem ejectable component assembly of claim 1, wherein when the front plate is pushed inward towards the support frame, engagement of the profiled protrusion of the slider pins with the ball pins causes the slider pins to move outward and release the stem to allow the stem to project out of the front plate, and wherein when the stem is pulled out, engagement of the inner ends of the slider pins with the stem causes the slider pins to take the second position to disengage outer ends of the slider pins from the electronic device to enable withdrawal of the stem ejectable component assembly along with the coupled SIM tray or the coupled MMC tray out of the electronic device.

3. The stem ejectable component assembly of claim 2, wherein when the stem ejectable component assembly is pushed inward from a withdrawn condition through the stem, the slider pins through their engagement with the stem remain in the second position thereby enabling the front plate to take a position fully within a support frame of the electronic device, and further pushing of the stem causes the slider pins to move to the first position thereby locking the stem ejectable component assembly within the support frame.

4. The stem ejectable component assembly of claim 2, wherein the stem incorporates a rod to engage a hole in the receiving housing such that the rod projects out of the back side of the receiving housing.

5. The stem ejectable component assembly of claim 4, wherein the rod is configured to make a first contact in a circuit when the stem projects out of the front plate.

6. The stem ejectable component assembly of claim 5, wherein upon the front plate being pushed inwards, the connector pins project out of the back side of the receiving housing to make a pair of second contacts of the circuit.

7. The stem ejectable component assembly of claim 6, wherein the circuit is configured to provide a display of a slide out status of the stem ejectable component assembly on a screen of the electronic device.

8. The stem ejectable component assembly of claim 2, comprising a tray holder, wherein the back side of the receiving housing is configured to be coupled to the SIM tray or the MMC tray through the tray holder, wherein the tray holder is fixed to the receiving housing through a connector housing.

9. The stem ejectable component assembly of claim 8, wherein a front side of the connector housing is fixed to the back side of the receiving housing, and wherein a back side of the connector housing is configured to hold the tray holder.

10. The stem ejectable component assembly of claim 9, wherein the tray holder is configured to hold the SIM tray or the MMC tray such that the SIM tray or the MMC tray is rotatable.

11. The stem ejectable component assembly of claim 10, wherein rotation of the SIM tray or the MMC tray enables positioning of any of a pair of sides of the SIM tray or the MMC tray in an upward facing position for one or more SIM cards or one or more MMC cards positioned on the upward facing side to take an active position.

12. The stem ejectable component assembly of claim 11, wherein an axis of rotation of the SIM tray or the MMC tray lies within a plane of the tray holder and is implemented by a pin passing through holes in the tray holder, and a hole in the SIM tray or the MMC tray.

13. The stem ejectable component assembly of claim 12, wherein the axis of rotation of the SIM tray or the MMC tray is oriented in any of a direction along a sliding direction of the stem ejectable component assembly, or a direction transverse to the sliding direction of the stem ejectable component assembly.

14. The stem ejectable component assembly of claim 9, wherein the tray holder is slidably fixed to the connector housing, wherein the sliding of the tray holder towards the connector housing causes the SIM tray or the MMC tray to engage with a recess on the back side of the connector housing thereby locking the SIM tray or the MMC tray preventing the SIM tray or the MMC tray from rotating.

15. The stem ejectable component assembly of claim 14, wherein the sliding of the tray holder away from the connector housing causes the SIM tray or the MMC tray to disengage from the recess thereby unlocking the SIM tray or the MMC tray to enable rotation of the SIM tray or the MMC tray.

16. The stem ejectable component assembly of claim 15, wherein the sliding movement of the tray holder towards or away from the connector housing is controlled by a plurality of connected holes, wherein a pair of the holes are connected to each other by a notch.

17. The stem ejectable component assembly of claim 16, comprising a plurality of pins, wherein the pins are positioned between the plurality of holes, and wherein sliding of the pins through the notch controls the sliding movement of the tray holder towards or away from the connector housing.

18. The stem ejectable component assembly of claim 11, wherein the SIM tray is configured to hold a pair of SIM cards, one on each side of the SIM tray, and wherein rotation of the SIM tray enables swapping active and standby positions of the pair of SIM cards.

19. The stem ejectable component assembly of claim 11, wherein the MMC tray is configured to hold four MMC cards, two on each side of the MMC tray such that conductive pads of two MMC cards held on the opposite sides of the MMC tray in a mutually opposite position face each other, and wherein conductive pads of the remaining two MMC cards held on the opposite sides of the MMC tray in a mutually opposite position face an outward direction.

20. The stem ejectable component assembly of claim 19, wherein the MMC tray is configured to hold all four MMC cards, with their conductive pads facing outward, and wherein two MMC cards positioned on a same side with their conductive pads facing outward doubles a storage capacity of the electronic device.

\* \* \* \* \*